(12) United States Patent
Miyauchi et al.

(10) Patent No.: US 6,210,847 B1
(45) Date of Patent: Apr. 3, 2001

(54) CRYSTALLINE OXOTITANYLPHTHALOCYANINE AND ELECTROPHOTOGRAPHIC PHOTORECEPTOR USING THE SAME

(75) Inventors: Masato Miyauchi, Nara; Kaori Fujii, Gose; Takahiro Teramoto; Yuko Takeda, both of Tenri; Takatsugu Obata; Akihiro Kondo, both of Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/428,061

(22) Filed: Oct. 27, 1999

(30) Foreign Application Priority Data

| Oct. 28, 1998 | (JP) | 10-306547 |
| Dec. 16, 1998 | (JP) | 10-358097 |
| Jan. 20, 1999 | (JP) | 11-011946 |
| Feb. 2, 1999 | (JP) | 11-025438 |
| Apr. 27, 1999 | (JP) | 11-120061 |
| Apr. 27, 1999 | (JP) | 11-120076 |

(51) Int. Cl.[7] .................................. G03G 5/047
(52) U.S. Cl. ............... 430/58.4; 430/58.85; 430/59.5; 430/59.6
(58) Field of Search ................. 430/58.4, 58.85, 430/59.5, 59.6

(56) References Cited

U.S. PATENT DOCUMENTS

| 3,357,989 | 12/1967 | Byrne et al. | 540/122 |
| 4,150,987 | 4/1979 | Anderson et al. | 96/1.5 |
| 4,214,907 | 7/1980 | Nakazawa et al. | 430/82 |
| 4,387,149 | 6/1983 | Emoto et al. | 430/83 |
| 4,725,519 | 2/1988 | Suzuki et al. | 430/58 |
| 4,732,832 | 3/1988 | Nogami et al. | 430/58 |
| 4,898,799 | 2/1990 | Fujimaki et al. | 430/59 |
| 5,132,197 | 7/1992 | Iuchi et al. | 430/76 |
| 5,194,354 | 3/1993 | Takai et al. | 430/58 |
| 5,736,282 | 4/1998 | Tamura et al. | 430/59 |
| 5,874,570 | * 2/1999 | Tamura et al. | 540/141 |
| 5,972,551 | * 10/1999 | Miyauchi et al. | 430/78 |

FOREIGN PATENT DOCUMENTS

| 0 715 216 A1 | 6/1996 | (EP) . |
| 1268422 | 3/1972 | (GB) . |
| 49-11136 | 1/1974 | (JP) . |
| 54-59143 | 5/1979 | (JP) . |
| 58-32373 B2 | 7/1983 | (JP) . |
| 58-198043 | 11/1983 | (JP) . |
| 59-49544 | 3/1984 | (JP) . |
| 60-86551 | 5/1985 | (JP) . |
| 61-217050 | 9/1986 | (JP) . |
| 61-239248 | 10/1986 | (JP) . |
| 62-67094 | 3/1987 | (JP) . |
| 62-133462 | 6/1987 | (JP) . |
| 63-20365 | 1/1988 | (JP) . |
| 63-366 | 1/1988 | (JP) . |
| 63-198067 | 8/1988 | (JP) . |
| 1-17066 | 1/1989 | (JP) . |
| 2-8256 | 1/1990 | (JP) . |
| 3-54264 | 3/1991 | (JP) . |
| 3-54265 | 3/1991 | (JP) . |
| 3-128973 | 5/1991 | (JP) . |
| 5-55860 B2 | 8/1993 | (JP) . |
| 7-271073 | 10/1995 | (JP) . |
| 8-209023 | 8/1996 | (JP) . |
| 10-142819 | 5/1998 | (JP) . |

OTHER PUBLICATIONS

Sawada, "Phthalocyanine Pigments as Electrophotographic Photoreceptive Material", Dyes and Chemicals, vol. 24, No. 6, 1979, pp. 122–128.

Miyazaki, "Photoreceptors for Digital Electrophography", The Society Journal, Society of Electrophotography of Japan, vol. 32, No. 3, 1993, pp. 282–289.

Oka et al., "Study of the Relationship Between Crystal Structure and Phtosensitivity of Phthalocyanine Pigments"" Journal of Imaging Science and Technology, vol. 37, No. 6, Nov./Dec. 1993, pp. 607–609.

Moser et al., Phthalocyanine Compounds, "Chapter 3 Preparation", © Reinhold Publishing Corporation, 1963, pp. 104–141.

* cited by examiner

*Primary Examiner*—John Goodrow
(74) *Attorney, Agent, or Firm*—Nixon & Vanderhye, P.C.

(57) ABSTRACT

An object of the invention is to improve the photosensitivity characteristics, characteristics on repeated use and stability of a photoreceptor. A photosensitive layer formed on a conductive support of a photoreceptor contains crystalline oxotitanylphthalocyanine having major peaks in an X-ray diffraction spectrum at Bragg angles ($2\theta \pm 0.2°$) of 7.3°, 9.4°, 9.6°, 11.6°, 13.3°, 17,9°, 24.1° and 27.2°, wherein a peak bundle formed by overlapping the peaks at 9.4° and 9.6° is the largest peak, and the peak at 27.2° is the secondary largest peak as a charge generating substance. Furthermore, it contains a bisamine compound, an N,N'-bisenamine compound, a styryl compound, an amine-hydrazone compound, a benzofuran-bishydrazone compound, a bisenamine compound, a benzofuran-bishydrazone compound or a benzofuran-bis-cyclic hydrazone compound represented by the particular structural formulae as a charge transporting substance.

21 Claims, 25 Drawing Sheets

1H-NMR SPECTRUM OF EXAMPLE COMPOUND BE62 IN HEAVY CHLOROFORM

FIG.12 13C-NMR SPECTRUM OF EXAMPLE COMPOUND BE62 IN HEAVY CHLOROFORM

¹H-NMR SPECTRUM OF BISHYDRAZONE COMPOUND (EXAMPLE COMPOUND BB63) IN HEAVY CHLOROFORM

13C-NMR SPECTRUM OF BISHYDRAZONE COMPOUND (EXAMPLE COMPOUND BB63) IN HEAVY CHLOROFORM

DEPT135 13C-NMR SPECTRUM OF BISHYDRAZONE COMPOUND (EXAMPLE COMPOUND BB63) IN HEAVY CHLOROFORM

1H-NMR SPECTRUM OF BISHYDRAZONE COMPOUND (EXAMPLE COMPOUND BB62) IN HEAVY CHLOROFORM

DEPT135 13C-NMR SPECTRUM OF BISHYDRAZONE COMPOUND (EXAMPLE COMPOUND BB62) IN HEAVY CHLOROFORM $^1$H-NMR SPECTRUM OF BISHYDRAZONE COMPOUND (EXAMPLE COMPOUND BB61) IN HEAVY CHLOROFORM

DEPT135 13C-NMR SPECTRUM OF BISHYDRAZONE COMPOUND (EXAMPLE COMPOUND BB61) IN HEAVY CHLOROFORM

DEPT135 13C-NMR SPECTRUM OF BISHYDRAZONE COMPOUND (EXAMPLE COMPOUND BB64) IN HEAVY CHLOROFORM

13C-NMR SPECTRUM OF EXAMPLE COMPOUND BB111

DEPT135 13C-NMR SPECTRUM OF EXAMPLE COMPOUND BB111

CRYSTALLINE OXOTITANYLPHTHALOCYANINE AND ELECTROPHOTOGRAPHIC PHOTORECEPTOR USING THE SAME

BACKGROUND OF THE INVENTION

1. Field of the Invention

The present invention relates to crystalline oxotitanylphthalocyanine having a particular crystal form and an electrophotographic photoreceptor using a composition containing the crystalline oxotitanylphthalocyanine in a charge generating layer.

2. Description of Related Art

Electrophotographic photoreceptors (hereinafter sometimes simply referred to as "photoreceptor") currently subjected into practical use are classified into an inorganic photoreceptor using an inorganic photoconductive material excellent in sensitivity and durability, and an organic photoreceptor using an organic photoconductive material. The inorganic photoconductive material include a ZnO (zinc oxide) series material, a CdS (cadmium sulfide) series material, an Se series material, such as a—Se (amorphous selenium) and a—AsSe (amorphous arsenic selenide), and a—Si (amorphous silicon) series material.

However, the ZnO series material cannot stably form an image for a long period of time because the charging property of a sensitizing material added is deteriorated due to corona discharge, and photobrowning occurs due to exposure. Furthermore, a photoreceptor equipped with a photosensitive layer formed by dispersing ZnO in a binder resin is of low sensitivity and low durability. The CdS series material cannot provide stable sensitivity under a high-humidity environment, and the Se series material has a strong toxicity, and its crystallization easily proceeds by an external factor, such as temperature and humidity, to lower the charging property or to form whitedotson an image. A photoreceptor equipped with a photosensitive layer using the CdS series material and the Se series material is low in heat resistance and storage stability, and since it has a toxicity, a problem is involved in its disposal and environmental pollution may be caused. Although the a—Si series material, which is receiving attention as a pollution free material, has high sensitivity and durability, since the photosensitive layer is formed by a plasma CVD (chemical vapor deposition) method, image defects are formed and its productivity is low due to the production process, so as to increase the production cost.

On the other hand, the organic photoconductive material is generally easy in formation of a thin film by coating, and has a low production cost and high mass-productivity. Because the organic material itself includes various kinds, a photosensitive layer having a high storage stability and a low toxicity can be produced by appropriate selection thereof, and it can be easily disposed. Furthermore, the setting of the wavelength range of light absorption can be easily changed, and the electrophotographic characteristics can be easily controlled by the combination of the materials. Therefore, in recent years, improvement in sensitivity and durability has been extensively studied, and the organic materials are frequently employed. A photoreceptor includes a function separated type, in which a photosensitive layer having a laminated structure comprising a charge generating layer containing a charge generating substance and a charge transporting layer containing a charge transporting substance is formed on a conductive support, and a single-layer type, in which a photosensitive layer containing a charge generating substance and a charge transporting substance is formed on a conductive support. In the photoreceptor using the organic material, the function separated type is mainly subjected to studies and developments.

As the charge transporting substance, many substances having various molecular structures are developed, and for example, Japanese Unexamined Patent Publication JP-A-54-59143 discloses a hydrazone series charge transporting substance, Japanese Unexamined Patent Publication JP-A-58-198043 discloses a stilbene and styryl series charge transporting substance, and Japanese Examined Patent Publication JP-B2-58-32373 discloses a triarylamine series charge transfer substance. In addition, a phenothiazine series compound, a triazole series compound, a quinoxaline series compound, an oxadiazole series compound, an oxazole series compound, a pyrazoline series compound, a triphenylmethane series compound, a dihydronicotinamide series compound, an indoline series compound and a semicarbazone series compound are developed.

In recent years, an image forming apparatus is widely spread, such as a laser printer, in which a laser light source is used instead of a white light source to realize a high speed printing, a high quality image and a non-impact operation. In particular, various modes using a semiconductor laser, which has been extensively developed in recent years, as a light source are attempted, and a photoreceptor having high sensitivity to a long wavelength region of about 800 nm, which is a wavelength range of laser light, is highly demanded.

An organic material that satisfies the demand includes, for example, a squalic acid methine series dye, an indoline series dye, a cyanine series dye, a pyrylium series dye, a polyazo series dye, a phthalocyanine series dye and a naphthoquinone series dye. However, the squalic acid methine series dye, the indoline series dye and the cyanine series dye are poor in stability, particularly characteristics for repeated use, although they can be sensitive to the long wavelength region, and the polyazo series dye is difficult to make sensitive to the long wavelength region, and is poor in productivity. The naphthoquinone series dye is poor in sensitivity.

On the other hand, the phthalocyanine dye has a high sensitivity to light of the long wavelength region and excellent in stability in comparison with the other dyes. It is disclosed in Manabu Sawada, Dyes and Chemicals, Vol. 24, No. 6, pp. 122–128, (1979) that phthalocyanine series compounds are different in sensitivity peaks and physical properties depending on the presence and absence and the kind of the central metal, and further the physical properties are changed depending on the crystal form thereof. Furthermore, it is apparent from U.S. Pat. No. 3,357,989, Japanese Unexamined Patent Publication JP-A-49-11136, U.S. Pat. No. 4,214,907 and British Patent 1,268,422 that while the sensitivity peak of a photoreceptor using a metallic phthalocyanine compound changes depending on the central metal, it is in the side of a relatively long wavelength of from 700 to 750 nm. Therefore, it is important to study and develop a photoreceptor with taking the crystal form of phthalocyanine into consideration.

Techniques of an electrophotographic photoreceptor, in which a phthalocyanine compound having a particular crystal form is selected, have been reported. For example, Japanese Unexamined Patent Publication JP-A-60-86551 discloses an example using a metal-free phthalocyanine, Japanese Unexamined Patent Publication JP-A-62-133462 discloses an example using phthalocyanine containing aluminum, and Japanese Unexamined Patent Publication JP-A-59-49544 discloses an example using phthalocyanine containing titanium as the central metal. Japanese Examined Patent Publication JP-B2-5-55860 discloses a photoreceptor comprising a charge generating layer containing a titanium phthalocyanine compound and a binder resin having accumulated thereon a charge transporting layer containing a hydrozone series compound and a binder resin. Furthermore, Japanese Unexamined Patent Publication JP-A-10-142819 discloses a photoreceptor containing a phthalocyanine series compound as a charge generating substance and a specific styryl compound as a charge transporting substance. As the central metal of a phthalocyanine compound, various metals, such as indium and gallium, have been known.

Among the phthalocyanine compounds, oxotitanylphthalocyanine has a high sensitivity, and it has been disclosed that it is classified into many crystal forms depending on a diffraction angle of an X-ray diffraction spectrum in Electrophotography (The Society Journal, Society of Electrophotography of Japan), Vol. 32, No. 3, pp. 282–289. As the crystal form of oxotitanylphthalocyanine, Japanese Unexamined Patent Publications JP-A-61-217050 and JP-A-61-239248 disclose a type, Japanese Unexamined Patent Publication JP-A-62-67094 discloses A type, Japanese Unexamined Patent Publications JP-A-63-366 and JP-A-63-198067 disclose C type, Japanese Unexamined Patent Publications JP-A-63-20365, JP-A-2-8256, JP-A-1-17066 and JP-A-7-271073 disclose Y type, Japanese Unexamined Patent Publication JP-A-3-54265 discloses M type, Japanese Unexamined Patent Publication JP-A-3-54264 discloses M-α type, Japanese Unexamined Patent Publication JP-A-3-128973 discloses I type, and Japanese Unexamined Patent Publication JP-A-62-6 7094 discloses I and II types.

The crystal forms of oxotitanylphthalocyanine, the lattice constant of which is known from structural analysis, are C type, Phase I type and Phase II type. Phase II type belongs to a triclinic system, and Phase I type and C type belong to a monoclinic system. When the crystal forms described in the publications are analyzed from these known crystal lattice constants, A type and I type belong to Phase I type, α type and B type belong to Phase II type, and M type belongs to C type. These explanations are found in, for example, Journal of Imaging Science and Technology, Vol. 37, No. 6, p. 607 to 609 (1993).

Japanese Unexamined Patent Publication JP-A-59-49544 specifically discloses a photoreceptor comprising a support having formed thereon a charge generating layer by vapor deposition of oxotitanylphthalocyanine, and further formed thereon a charge transporting layer containing 2,6-dimethoxy-9,10-dihydroxyanthracene as a main component. However, the photoreceptor is of a high residual potential to make restrictions on the usage thereof, and is poor in reproducibility of electric characteristics due to unevenness in film thickness obtained by a vapor deposition method. Furthermore, the photoreceptor is low in mass productivity in an industrial scale. Japanese Unexamined Patent Publication JP-A-61-109056 discloses a photoreceptor comprising a charge generating layer containing an oxotitanylphthalocyanine compound and a binder resin having accumulated thereon a charge transporting layer containing a hydrozone compound and a binder resin. While the photoreceptor disclosed in the publication has a sensitivity in a wavelength region of about 800 nm, it does not satisfy a high quality image and a high speed operation that are demanded in practical use. As described in the foregoing, oxotitanylphthalocyanine is low in sensitivity and is poor in potential stability on repeated use.

In an electrophotographic photoreceptor, it is general that a charge transporting substance that is effective to a particular charge generating substance is not necessarily effective to the other charge generating substance, and a charge generating substance that is effective to a particular charge transporting substance is not necessarily effective to the other charge transporting substance. In other words, it is necessary that a charge generating substance and a charge transporting substance are suitably combined to use in a photoreceptor, and when the combination is not suitable, not only the sensitivity is decreased, but also the residual potential becomes high, and the charge is accumulated by repeated use to adhere a toner on a non-image area. As a result, a clear image cannot be obtained due to fogging in the background. While the combination of a charge generating substance and a charge transporting substance is important, there is no general rule to select the combination, and it is difficult to find out a charge transporting substance that is suitable to a specific charge generating substance.

As described in the foregoing, there has been no photoreceptor using a phthalocyanine series compound, which is an organic photoconductive material having a sensitivity in a long wavelength range, particularly oxotitanylphthalocyanine having a high sensitivity, that satisfies practical demands in photosensitivity characteristics, characteristics on repeated use, and stability.

SUMMARY OF THE INVENTION

An object of the invention is to provide novel crystalline oxotitanylphthalocyanine excellent in photosensitivity characteristics, characteristics on repeated use and solvent stability, and an electrophotographic photoreceptor using the same.

The invention relates to crystalline oxotitanylphthalocyanine having major peaks in an X-ray diffraction spectrum at Bragg angles (2θ±0.2°) of 7.30°, 9.4°, 9.6°, 11.6°, 13.3°, 17,9°, 24.1° and 27.2°, wherein a peak bundle formed by overlapping the peaks at 9.4° and 9.6° is the largest peak, and the peak at 27.2° is the second largest peak.

In the invention it is preferable that the peak intensity of the peak at 27.2° is 80% or less of the peak intensity of the peak bundle formed by overlapping the peaks at 9.4° and 9.6°.

In the invention it is preferable that a peak bundle having a trapezoidal shape is exhibited at a Bragg angle (2θ±0.2°) of from 14.1° to 14.9° in an X-ray diffraction spectrum.

In the invention it is preferable that a shoulder peak having a peak intensity about half the peak intensity of the peak bundle formed by overlapping the peaks at 9.4° and 9.6° is exhibited at a Bragg angle (2θ±0.2°) of 9.0° in an X-ray diffraction spectrum.

The invention also relates to an electrophotographic photoreceptor comprising a photosensitive layer containing, as a charge generating substance, the crystalline oxotitanylphthalocyanine described above.

In the invention it is preferable that the photosensitive layer contains, as a charge transporting substance, a bisamine compound represented by formula (I—I):

(I-I)

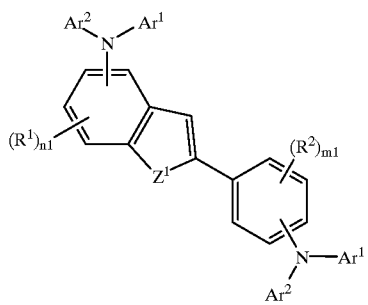

In formula (I—I), $Ar^1$ and $Ar^2$ each represent an aryl group, which may have a substituent, a heterocyclic group, which may have a substituent, an aralkyl group, which may have a substituent or a heterocyclic-group-substituted alkyl group, which may have a substituent; $Z^1$ is an oxygen atom, an sulfur atom or a selenium atom; $R^1$ and $R^2$ each represent an alkyl group which may have a substituent, an alkoxy group, which may have a substituent, a dialkylamino group, which may have a substituent, a halogen atom or a hydrogen atom; m1 is an integer of from 1 to 4; and n1 is an integer of from 1 to 3, provided that when m1 or n1 is 2 or more, groups represented by $R^1$ or $R^2$ may be the same or different and may form a ring.

In the invention it is preferable that the photosensitive layer contains, as a charge transporting substance, an N,N'-bisenamine compound represented by one formula selected from formulae (II-I), (II—II), (II-III) and (II-IV):

(II-I)

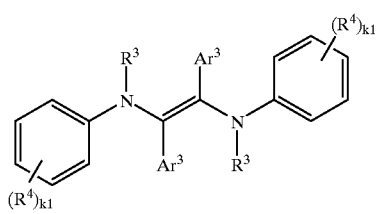

(II-II)

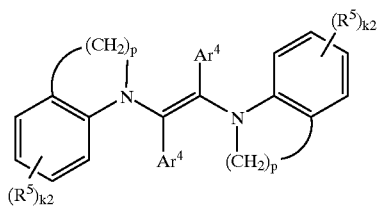

(II-III)

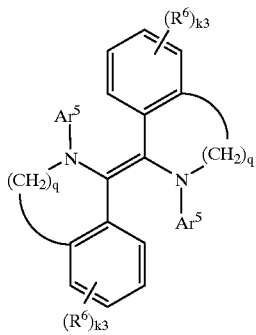

(II-IV)

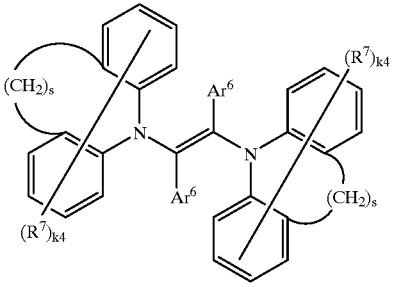

In formulae (II-I), (II—II), (II-III) and (II-IV), $Ar^3$ to $Ar^6$ each represent an aryl group, which may have a substituent, a heterocyclic group, which may have a substituent, or an aralkyl group, which may have a substituent; $R^3$ represents an aryl group, which may have a substituent, a heterocyclic group, which may have a substituent, an aralkyl group, which may have a substituent, or an alkyl group having from 1 to 4 carbon atoms, which may have a substituent; $R^4$ to $R^7$ each represent an alkyl group having from 1 to 3 carbon atoms, an alkoxy group having from 1 to 3 carbon atoms, a dialkylamino group having from 1 to 3 carbon atoms, a halogen atom or a hydrogen atom; k1 is an integer of from 1 to 5; k2 and k3 each are an integer of from 1 to 4; p is an integer of from 2 to 4; q is an integer of from 1 to 3; k4 is an integer of from 1 to 8; and s is an integer of from 0 to 2, provided that when k1 is 2 or more, plural groups represented by $R^4$ may be the same or different; when k2 is 2 or more, plural groups represented by $R^5$ may be the same or different; when k3 is 2 or more, plural groups represented by $R^6$ may be the same or different; and when k4 is 2 or more, plural groups represented by $R^7$ may be the same or different.

In the invention it is preferable that the photosensitive layer contains, as a charge transporting substance, a styryl compound represented by formula (III):

(III)

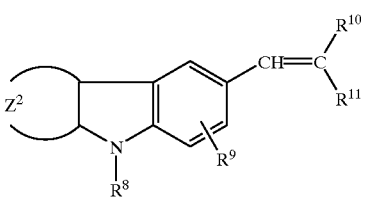

In formula (III), $R^8$ to $R^{11}$ each represent a hydrogen atom, and an alkyl group, which may have a substituent, an aralkyl group, which may have a substituent or an aryl group, which may have a substituent provided that $R^{10}$ and $R^{11}$ may be combined to form a ring; and $Z^2$ represents an atomic group necessary for forming a saturated 5- to 8-membered ring with the two carbon atoms from the indoline ring.

In the invention it is preferable that the photosensitive layer contains, as a charge transporting substance, an amine-hydrazone compound represented by formula (IV-I):

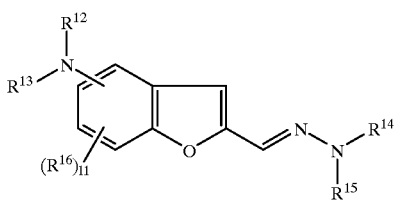

(IV-I)

In formula (IV-I), $R^{12}$ to $R^{15}$ may be the same or different, and each represent a lower alkyl group, an aromatic hydrocarbon residual group, which may have a substituent, a heterocyclic ring residual group, which may have a substituent, or an aralkyl group, which may have a substituent; $R^{16}$ represents a hydrogen atom, a halogen atom, a lower alkyl group, a lower alkoxy group, a lower dialkylamino group, a trifluoromethyl group, or an aralkyl group, which may have a substituent; 11 is an integer of from 1 to 3.

In the invention it is preferable that the photosensitive layer contains, as a charge transporting substance, a benzofuranbishydrazone compound represented by formula (V):

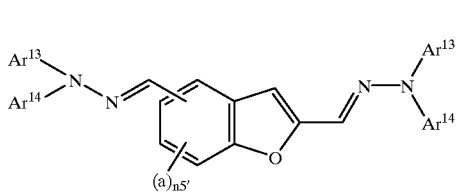

(V)

In formula (V), $Ar^{13}$ and $Ar^{14}$ each represent an aryl group, which may have a substituent, an aralkyl group, which may have a substituent, a heterocyclic group, which may have a substituent, or an alkyl group having from 1 to 5 carbon atoms, which may have a substituent; a represents an alkyl group having from 1 to 3 carbon atoms, an alkoxy group having from 1 to 3 carbon atoms, a dialkylamino group having from 1 to 3 carbon atoms, a fluoroalkylgroup, a halogen atom or a hydrogen atom; and n5 is an integer of from 1 to 3, provided that when n5 is 2 or more, plural groups represented by a may be the same or different.

In the invention it is preferable that the photosensitive layer contains, as a charge transporting substance, a bisenamine compound represented by a formula selected from formulae (VI-I) and (VI-II):

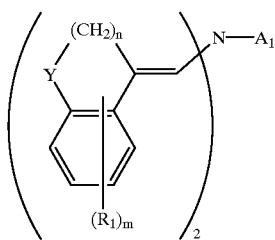

(VI-I)

In formula (VI-I), $A_1$ represents an aryl group, which may have a substituent, an aralkyl group, which may have a substituent, a heterocyclic group, which may have a substituent, or a lower alkyl group, which may have a substituent; $R_1$ represents a lower alkyl group, which may have a substituent, a lower alkoxy group, which may have a substituent, a di-lower alkylamino group, which may have a substituent, a halogen atom or a hydrogen atom; Y represents an oxygen atom, a sulfur atom or a mono-substituted nitrogen atom; m is an integer of from 1 to 8; and n is an integer of from 1 to 3, provided that when m is 2 or more, plural groups represented by $R_1$ may be the same or different.

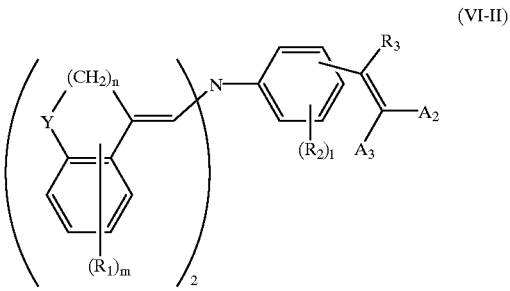

(VI-II)

In formula (VI-II), $Au_2$ and $A_3$ may be the same or different, and each represent an aryl group, which may have a substituent, an aralkyl group, which may have a substituent, a heterocyclic group, which may have a substituent, a lower alkyl group, which may have a substituent or a hydrogen atom (provided that at least one of $A_2$ and $A_3$ represents an aryl group, which may have a substituent, an aralkyl group, which may have a substituent, a heterocyclic-group, which may have a substituent, or a lower alkyl group, which may have a substituent); $R_2$ has the same meaning as $R_1$ in formula (VI-I); 1 is an integer of from 1 to 4 (provided that when 1 is 2 or more, plural groups represented by $R_2$ may be the same or different); $R_3$ represents an aryl group, which may have a substituent, an aralkyl group, which may have a substituent, a heterocyclic group, which may have a substituent, a lower alkyl group, which may have a substituent or a hydrogen atom; and $R_1$, m, n and Y have the same meanings as in formula (VI-I)

In the invention it is preferable that the photosensitive layer contains, as a charge transporting substance, a benzofuranbishydrazone compound represented by formula (VII):

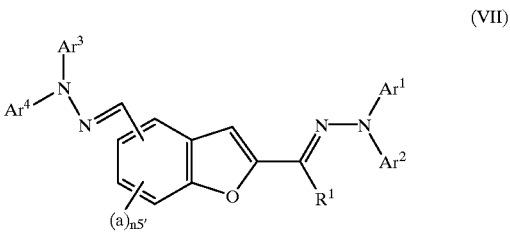

(VII)

In formula (VII), $Ar^1$, $Ar^{2,}$ $Ar^3$ and $Ar^4$ may be the same or different, and each represent an aryl group, which may have a substituent, a heterocyclic group, which may have a substituent, an aralkyl group, which may have a substituent, an alkyl group having from 1 to 5 carbon atoms, which may have a substituent, or a fluoroalkyl group having from 1 to 5 carbon atoms, which may have a substituent; $R^1$ represents an aryl group, which may have a substituent, a heterocyclic group, which may have a substituent, an aralkyl group, which may have a substituent, an alkyl group having from 1 to 5 carbon atoms, which may have a substituent, or a fluoroalkyl group having from 1 to 5 carbon atoms, which may have a substituent; a represents an alkyl group having from 1 to 3 carbon atoms, which may have a substituent, a fluoroalkyl group having from 1 to 5 carbon atoms, which may have a substituent, an alkoxy group having from 1 to 3 carbon atoms, which may have a substituent, a dialkylamino group having from 1 to 3 carbon atoms, which may have a substituent, a halogen atom or a hydrogen atom; and n is an integer of from 1 to 3, provided that when n is 2 or 3, plural groups represented by a may be the same or different.

In the invention it is preferable that the photosensitive layer contains, as a charge transporting substance, a benzofuran-bis-cyclic hydrazone compound represented by formula (VIII):

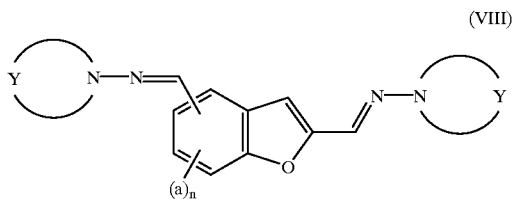

(VIII)

In formula (VIII), Y represents an atomic group forming a heterocyclic group along with the nitrogen atom connected thereto, which may have a substituent and/or may be condensed; a represents an alkyl group having from 1 to 3 carbon atoms, which may have a substituent, a fluoroalkyl group having from 1 to 3 carbon atoms, which may have a substituent, an alkoxy group, having from 1 to 3 carbon atoms, which may have a substituent, a dialkylamino group having from 1 to 3 carbon atoms, which may have a substituent, a halogen atom or a hydrogen atom; and n is an integer of from 1 to 3, provided that when n is 2 or 3, plural groups represented by a may be the same or different.

In the invention it is preferable that the photosensitive layer has a laminated structure comprising a charge generating layer containing a charge generating substance, and a charge transporting layer containing a charge transporting substance.

In the invention it is preferable that the photosensitive layer has a single-layer structure containing a charge generating substance and a charge transporting substance.

In the invention it is preferable that the electrophotographic photoreceptor further comprises an interlayer arranged between a conductive support and the photosensitive layer.

In the invention it is preferable that the photosensitive layer contains, as a binder resin, polycarbonate represented by formula (IX), or contains, as a binder resin, polyester represented by formula (X), in an amount of from 0.05 to 0.5 part by weight based on the total binder resin:

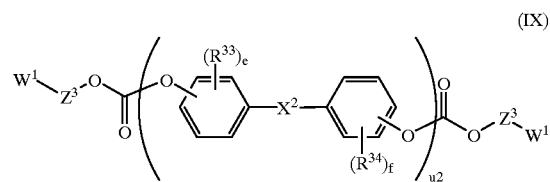

(IX)

In formula (IX), $R^{33}$ and $R^{34}$ each represent an alkyl group having from 1 to 5 carbon atoms, which may have a substituent, an aryl group having from 6 to 12 carbon atoms, which may have a substituent, an aralkyl group having from 7 to 17 carbon atoms, which may have a substituent, an alkenyl group having from 2 to 5 carbon atoms, which may have a substituent, an alkoxy group having from 1 to 5 carbon atoms, which may have a substituent, a halogen atom or a hydrogen atom; $X^2$ is directly bonded or represents an alkylene group having from 1 to 10 carbon atoms, which may have a substituent, a cyclic alkylidene group having from 1 to 10 carbon atoms, which may have a substituent, an arylene group having from 6 to 1 2 carbon atoms, which may have a substituent, a sulfonyl group or a carbonyl group; $Z^3$ represents an alkylene group having from 1 to 5 carbon atoms, which may have a substituent, an arylene group having from 6 to 12 carbon atoms, which may have a substituent, an arylenealkyl group having from 7 to 17 carbon atoms, which may have a substituent or a halogen atom; $W^1$ represents an alkyl group having from 1 to 5 carbon atoms, which may have a substituent, an alkenyl group having from 2 to 5 carbon atoms, which may have a substituent, an alkoxy group having from 1 to 5 carbon atoms, which may have a substituent, an alkylester group having from to 1 to 5 carbon atoms, which may have a substituent, an arylester group having from 6 to 12 carbon atoms, which may have a substituent, a carboxyl group, an aldehyde group, a hydroxyl group, a halogen atom or a hydrogen atom; e and f each are an integer of from 1 to 4; and u2 is an integer of from 10 to 200.

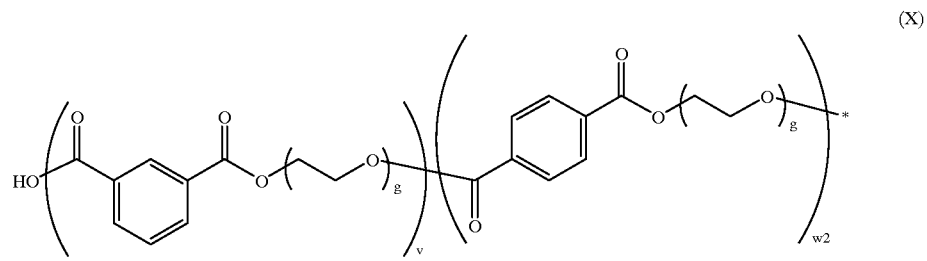

(X)

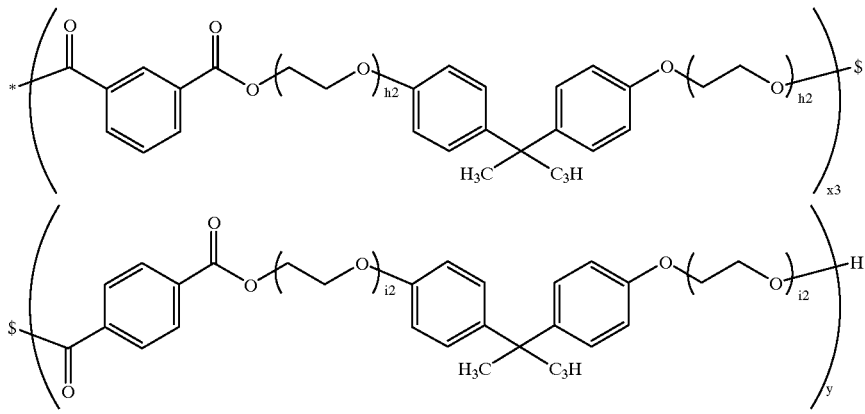

In formula (X), g, h2 and i2 each are an integer of from 1 to 10; and v, w2, x3 and y each are an integer of from 10 to 1,000.

In the invention it is preferable that the photosensitive layer comprises a laminated layer comprising a conductive support having thereon at least two layers comprising a charge generating layer and a charge transporting layer, and the charge transporting layer contains at least one binder resin a polymer of a vinyl compound, a copolymer thereof, polyester, polycarbonate, polyarylate, polysulfone, polyvinyl butyral, a phenoxy resin, a cellulose resin, an urethane resin or an epoxy resin.

In the invention it is preferable that the photosensitive layer comprises a laminated layer comprising a conductive support having thereon at least two layers comprising a charge generating layer and a charge transporting layer, and the charge transporting layer contains, as a binder resin, at least one polycarbonate resin represented by formula (IX), or contains, as a binder resin, a polyester resin represented by formula (X), in an amount of from 5 to 50% by weight based on the total binder resin:

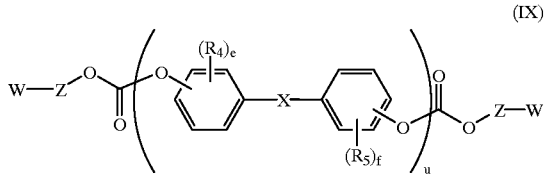

In formula (IX), $R_4$ and $R_5$ may be the same or different, and each represent a lower alkyl group, which may have a substituent, an aryl group, which may have a substituent, an aralkyl group, which may have a substituent, a lower alkenyl group, which may have a substituent, a lower alkoxy group, which may have a substituent, a halogen atom or a hydrogen atom; X is directly bonded or represents an alkylene group having from 1 to 10 carbon atoms, which may have a substituent, a cyclic alkylidene group having from 1 to 10 carbon atoms, which may have a substituent, an arylene group, which may have a substituent, a sulfonyl group, and a carbonyl group; Z represents a lower alkylene group, which may have a substituent, an arylene group, which may have a substituent, a alkylarylene group, which may have a substituent or a halogen atom; W represents a lower alkyl group, which may have a substituent, a lower alkenyl group, which may have a substituent, a lower alkoxy group, which may have a substituent, a lower alkylester group, which may have a substituent, an arylester group, which may have a substituent, a carboxyl group, an aldehyde group, a hydroxyl group, a halogen atom or a hydrogen atom; e and f each are an integer of from 1 to 4; and u is an integer of from 10 to 200.

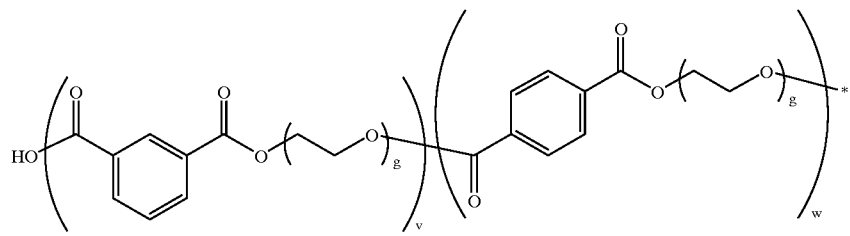

-continued

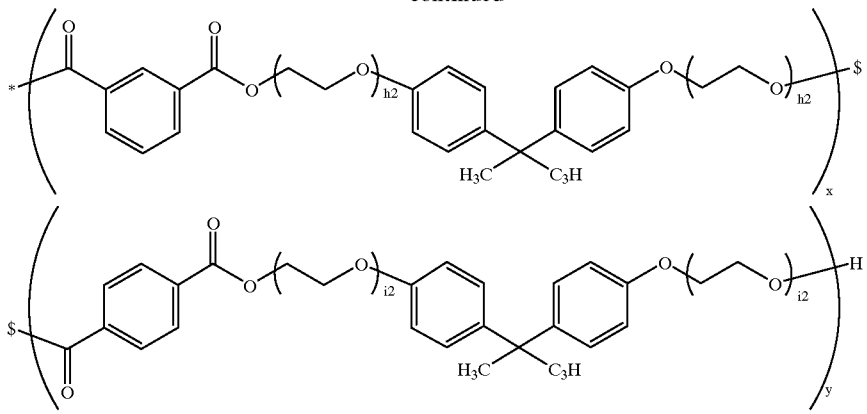

In formula (X), g, h and i each are an integer of from 1 to 10; and v, w, x and y each are an integer of from 10 to 1000.

In the invention it is preferable that the photosensitive layer contains, as a antioxidant, α-tocopherol in an amount of from 0.1 to 5% by weight based on the charge transporting substance, or 2,6-di-t-butyl-4-methylphenol in an amount of from 0.1 to 10% by weight based on the charge transporting substance.

In the invention it is preferable that a surface layer of the photosensitive layer contains dimethylpolysiloxane, and a weight ratio of the dimethylpolysiloxane to the binder resin is from 0.001/100 to 5/100.

According to the invention, crystalline oxotitanylphthalocyanine and an electrophotographic photoreceptor having an extremely high sensitivity in a long wavelength region and high durability can be provided. In comparison with the conventional photoreceptor, the photoreceptor using the crystalline oxotitanylphthalocyanine of the invention has a stable crystal form, excellent in crystal stability to a solvent and heat, i.e., excellent in solvent storage characteristics, and excellent in photosensitivity characteristics and characteristics on its repeated use.

Therefore, the invention can provide an optimum photoreceptor for improving the performance of an optical printer and a digital duplicator using a semiconductor laser or an LED array as a light source, which have been extensively developed in recent years.

According to the invention, the photosensitive layer contains the oxotitanylphthalocyanine having the crystal form particular in the invention, and further contains, as a charge transporting substance, one of a bisamine compound represented by formula (I—I), an N,N'-bisenamine compound represented by formula (II-I), (II—II), (II-III) or (II-IV), a styryl compound represented by formula (III), an amine-hydrazone compound represented by formula (IV-I), a benzofuran-bishydrazone compound represented by formula (V), a bisenamine compound represented by formula (VI-I) or (VI-II), a benzofuran-bishydrazone compound represented by formula (VII), and a benzofuran-biscyclic hydrazone compound represented by formula (VIII). The photoreceptor having such a photosensitive layer provides excellent photosensitivity characteristics and characteristics on repeated use, and in particular, and is excellent in effect of suppressing increase in residual potential and deterioration of sensitivity. Therefore, the photoreceptor may preferably be used in an image forming apparatus of high sensitivity.

According to the invention, a photoreceptor, which provides the effects described above, having a laminated structure or a single-layer structure can be provided.

According to the invention, an interlayer having a protective function and an adhesion function provided between the conductive support and the photosensitive layer improves the coating property, and thus charge implantation from the conductive support to the photosensitive layer can be improved.

According to the invention, in the case where the N,N'-bisenamine compound or the benzofuran-bishydrazone compound is used as the charge transporting substance, by using the polycarbonate represented by formula (IX) as the binder resin, or in alternative, according to the invention, by using the polyester represented by formula (X) in a prescribed ratio based on the total binder resin, excellent photosensitivity characteristics and characteristics on repeated use can be obtained, and an excellent effect of suppressing decrease in surface potential, increase in residual potential and deterioration in sensitivity can be obtained.

According to the invention, in the case where the photosensitive layer has a laminated structure comprising at least two layers, a charge generating layer and a charge transporting layer laminated on a conductive support, and the charge transporting layer contains at least one binder resin selected from among a polymer of a vinyl compound, a copolymer thereof, polyester, polycarbonate, polyarylate, polysulfone, polyvinyl butyral, a phenoxy resin, a cellulose resin, an urethane resin, and an epoxy resin, the binding property is good, and particularly in the case where the binder resin is the polycarbonate resin represented by formula (IX) and/or the polyester resin represented by formula (X), the binding property is good, and furthermore the wear resistance of the charge transporting layer is improved, so as to obtain an electrophotographic photoreceptor having a long service life.

According to the invention, in the case where the photosensitive layer contains, as an antioxidant, α-tocopherol or 2,6-di-t-butyl-4-methylphenol, and the weight ratio of the antioxidant to the charge transporting substance is from 0.1/100 to 5/100, an electrophotographic photoreceptor exhibiting stable electric characteristics (such as charging property and characteristics of residual potential) on repeated use for a long period of time can be obtained.

According to the invention, in the case where the photosensitive layer contains dimethylpolysiloxane, and the weight ratio of the dimethylpolysiloxane to the binder resin is from 0.001/100 to 5/100, an electrophotographic photoreceptor having a coated film of extremely uniform quality with no defect on the surface of the photoreceptor can be obtained.

BRIEF DESCRIPTION OF THE DRAWINGS

Other and further objects, features, and advantages of the invention will be more explicit from the following detailed description taken with reference to the drawings wherein:

FIG. 2 is a cross sectional view showing a function separated type photoreceptor 8b comprising three layers, an interlayer 7, and a charge generating layer 5 and a charge transporting layer 6, which constitute a photosensitive layer 4a;

DETAILED DESCRIPTION OF THE PREFERRED EMBODIMENTS

Figure 1:
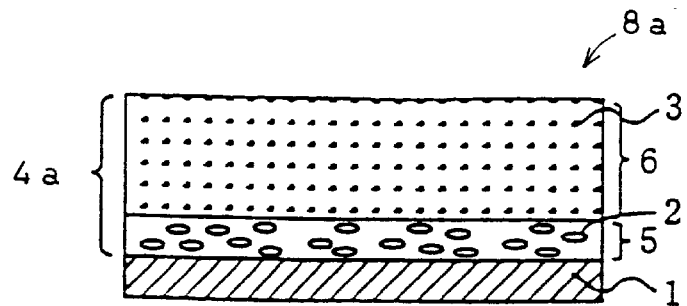
FIG. 1 is a cross sectional view showing a function separated type photoreceptor 8a having a photosensitive layer 4a comprising two layers, a charge generating layer 5 and a charge transporting layer 6.

Now referring to the drawings, preferred embodiments of the invention are described below.

The basic structure of the oxotitanylphthalocyanine of the invention is represented by formula (XI):

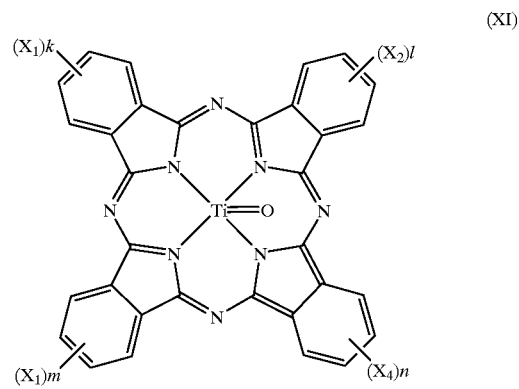

In formula (XI), $X_1$ to $X_4$ each represent a hydrogen atom, a halogen atom, an alkyl group, or an alkoxygroup; and k, 1, m and n each represent an integer of from 0 to 4.

The synthesis method of the oxotitanylphthalocyanine may be any method such as a known method described in Moser and Thomas, "Phthalocyanine Compounds." For example, dichlorotitanium phthalocyanine can be obtained in a good yield by, for example, a method, in which o-phthalonitrile and titanium tetrachloride are heated and melted, or heated in the presence of an organic solvent, such as α-chloronaphthalene. Oxotitanylphthalocyanine can be obtained by hydrolyzing the dichlorotitanium phthalocyanine with a base or water. It can also be synthesized by heating 1,3-diiminoisoindoline and tetrabutoxytitanium in an organic solvent, such as N-methylpyrrolidone. The resulting oxotitanylphthalocyanine may contain a phthalocyanine derivative, in which a hydrogen atom on the benzene ring is substituted with a chlorine atom, a fluorine atom, a nitro group, a cyano group, or a sulfone group.

The oxotitanylphthalocyanine composition is treated with a water-immiscible organic solvent, such as dichloroethane, in the presence of water, to obtain the crystal form of the invention.

The method for treating the oxotitanylphthalocyanine with the water-immiscible organic solvent in the presence of water includes a method, in which the oxotitanylphthalocyanine is swollen with water, and treated with the organic solvent, and a method, in which without the swelling treatment, water is added to the organic solvent, and powder of the oxotitanylphthalocyanine is added thereto, but is not limited to these methods.

The method for swelling the oxotitanylphthalocyanine with water includes, for example, a method, in which the oxotitanylphthalocyanine is dissolved in sulfuric acid and deposited in water, to make into the form of a wet paste, and a method, in which the oxotitanylphthalocyanine is swollen with water by using a stirring and dispersing apparatus, such as a homomixer, a paint mixer, a ball mill and a sand mill, to make into the form of a wet paste, but is not limited to these methods.

Furthermore, the oxotitanylphthalocyanine composition obtained by hydrolysis is stirred for a sufficient period of time or is milling with a mechanical distortion force, in a solution or a solution having a binder resin dissolved therein, so as to obtain the crystal form of the invention.

As the apparatus for use in the treatment, a homomixer, a paint mixer, a disperser, an agitator, a ball mill, a sand mill, a paint shaker, a dyno mill, an attritor and an ultrasonic dispersing apparatus may be used, as well as a general mixing apparatus. After the treatment, the composition may be filtrated and washed with methanol, ethanol or water, followed by separating, or a binder resin is added thereto to make a coating composition. A binder resin may be added on the treatment, so as to use as a coating composition.

The phthalocyanine composition of the invention is not limited to those produced by the production process described above, and those produced by any production process are encompassed by the invention as far as they exhibit the particular peaks of the invention.

The resulting oxotitanylphthalocyanine exhibits excellent characteristics as a charge generating material of an electrophotographic photoreceptor. In the invention, other charge generating materials than the oxotitanylphthalocyanine may be used in combination. Examples of such a charge generating material include α type, β type, Y type or amorphous oxotitanylphthalocyanine, which has a different crystal form from the invention, other phthalocyanines, an azo pigment, an anthraquinone pigment, a perylene pigment, a polycyclic quinone pigment and a squarium pigment.

Figure 2:
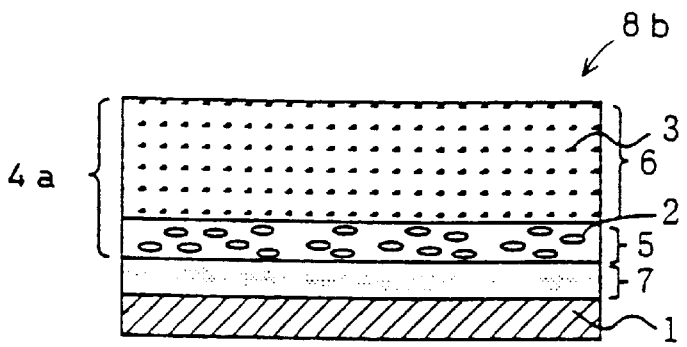
Figure 3:
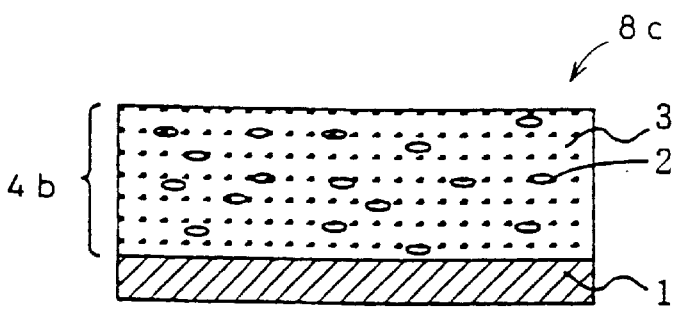
FIG. 3 is a cross sectional view showing a single-layer type photoreceptor 8c having a photosensitive layer 4b having a charge transporting substance 3 and a charge generating substance 2 dispersed therein.
Figure 4:
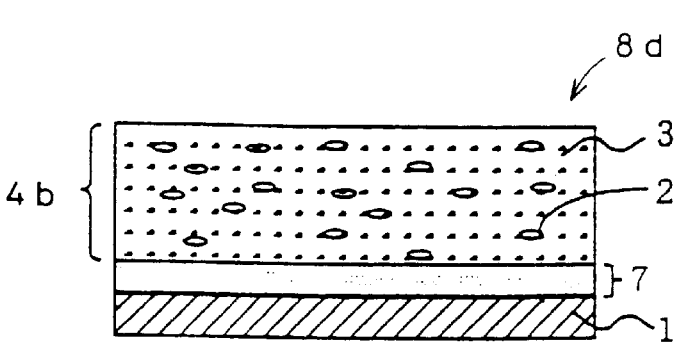
FIG. 4 is a cross sectional view showing a single-layer type photoreceptor 8d having an interlayer 7 and a photosensitive layer 4b having a charge transporting substance 3 and a charge generating substance 2 dispersed therein.

The constitution of the electrophotographic photoreceptor of the invention may be a function separated type photoreceptor 8a shown in FIG. 1, in which a photosensitive layer 4a is accumulated on a conductive support 1, and the photosensitive layer 4a comprises two layers, i.e., a charge generating layer 5 containing a charge generating substance 2 and a charge transporting layer 6 containing a charge transporting substance 3, or a single-layer type photosensitive layer 4b, in which a charge generating substance 2 is dispersed in a charge transporting layer 6 containing a charge transporting substance 3, and it is preferred from the standpoint of production to provide a known interlayer 7 that is generally used between the conductive support 1 and the photosensitive layer 4 as shown in FIG. 2 and FIG. 4. While a dispersion for forming the charge generating layer containing the crystalline oxotitanylphthalocyanine as the main component is liable to be influenced by the thermal capacity of the support on production of the photosensitive layer by a dip coating method due to the latent heat of vaporization of the dispersion solvent, the influence can be relaxed by using the interlayer.

As the conductive support used in the invention, a support having conductivity by itself, such as aluminum, an aluminum alloy, copper, zinc, stainless steel, nickel and titanium, can be used, and plastics or paper having vapor deposited thereon aluminum, gold, silver, copper, zinc, palladium, nickel, titanium, indium oxide or tin oxide, plastics or paper containing conductive particles, and plastics containing a conductive polymer can also be used. The form thereof may be a drum form, a sheet form, and a seamless belt form.

In the case of the function separated type, the oxotitanylphthalocyanine of the invention is used as the charge generating substance in the charge generating layer, and the other charge generating substances may be contained.

The forming method of the charge generating layer may be a vacuum deposition method, a sputtering method, or a gas phase accumulation method, such as a CVD method. Alternatively, a binder resin and a solvent are added to the oxotitanylphthalocyanine as the charge generating substance depending on necessity, followed by pulverization and dispersion by a dyno mill, a ball mill, a sand grinder, a paint shaker or an ultrasonic dispersing apparatus, to form a coating composition, and the charge generating layer may be formed with a Baker applicator, a per coater, or by casting or spin coating in the case of a sheet, or by a spray method, a vertical ring method or a dip coating method in the case of a drum.

As the binder resin, a butyral-modified polymer and a polymer having a hydroxyl group are preferred from the standpoint of stability of the coating composition and stability of the crystal form. A polyester resin, polyvinyl acetate, a polyacrylic ester, a polymethacrylic ester polyester, polycarbonate, polyvinyl chloride, polyvinyl acetate, polyvinyl acetoacetal, polyvinyl propional, polyvinyl butyral, a phenoxy resin, an epoxy resin, an urethane resin, a cellulose ester, a cellulose ether, or a copolymer thereof may also be used singly or as a mixture of two or more of them.

As the solvent, a ketone, such as acetone, methyl ethyl ketone, methyl isobutyl ketone and cyclohexanone, is preferred from the standpoint of stability of the coating composition and stability of the crystal form, and these may be used as a mixture with an ester, such as ethyl acetate and butyl acetate, an ether, such as 1,2-dimethoxyethane, tetrahydrofuran and dioxane, an aromatic hydrocarbon, such as benzene, toluene and xylene, and a non-protonic polar solvent, such as N,N-dimethylformamide and dimethylsulfoxide.

The film thickness of the charge generating layer thus formed is from 0.05 to 5 μm, and preferably from 0.08 to 1 μm.

Examples of the charge transporting substance in the charge transporting layer include a high molecular weight compound, such as polyvinyl carbazole and polysilane, and a low molecular weight compound, such as a hydrazone compound, a pyrazoline compound, an oxadiazole compound, a stilbene compound, a triphenylmethane compound, a triphenylamine compound and an enamine compound, and the charge transporting substances described later are particularly preferred.

As the forming method of the charge transporting layer, the charge transporting substance is dissolved in a solvent, and a binder resin is added thereto to prepare a coating composition. The charge transporting layer is formed with a Baker applicator, a per coater, or by casting or spin coating in the case of a sheet, or by a spray method, a vertical ring method or a dip coating method in the case of a drum.

Examples of the binder resin include a vinyl polymer and a copolymer thereof, such as polymethyl methacrylate, polystyrene and polyvinyl chloride, and other polymers, such as polycarbonate, polyester, polyarylate, polyester carbonate, polysulfone, polyvinyl butyral, phenoxy, a cellulose resin, an urethane resin, epoxy and a silicon resin, and these may be used singly or by mixing two or more of them. A copolymer of monomers that is necessary for forming these resins, and a thermosetting resin, a part of which is crosslinked, may also be used.

Examples of the solvent include a halogen series solvent, such as dichloromethane and 1,2-dichloroethane, a ketone, such as acetone, methyl ethyl ketone and cyclohexanone, an ester, such as ethyl acetate and butyl acetate, an ether, such as tetrahydrofuran and dioxane, an aromatic hydrocarbon, such as benzene, toluene and xylene, and a non-protonic polar solvent, such as N,N-dimethylformamide and dimethylsulfoxide.

The film thickness of the charge transporting layer thus formed is from 5 to 60 µm, and preferably from 10 to 40 µm.

In the charge generating layer or the charge transporting layer, various additives, such as a leveling agent, an antioxidant and a sensitizer, may be added depending on necessity. Examples of the antioxidant include vitamin E, hydroquinone, hindered amine, hindered phenol, paraphenylene diamine, arylalkane, derivatives thereof, an organic sulfur compound and an organic phosphorous compound.

Examples of the interlayer provided between the conductive support and the photosensitive layer include an inorganic layer, such as an anodic oxidized film of aluminum, aluminum oxide, aluminum hydroxide and titanium oxide, as well as polyvinyl alcohol, polyvinyl butyral, polyvinyl pyrrolidone, polyacrylic acid, cellulose, gelatin, starch, polyurethane, polyimide, polyamide, casein and N-methoxymethylated nylon. Furthermore, particles of titanium oxide, tin oxide or aluminum oxide may be dispersed thereto. In particular, an interlayer comprising titanium oxide having a rutile structure and a polyamide resin as the main components is preferably used.

An overcoat layer comprising a known thermoplastic or thermosetting polymer as the main component may be provided as the outermost layer. In general, the charge transporting layer is formed on the charge generating layer, the reverse constitution is possible. As the method for forming the respective layers, a known method can be applied, such as a method, in which the substances to be contained in the layer are dissolved or dispersed in a solvent to form a coating composition, and the resulting coating compositions are coated one after another.

In the case where the single-layer type, in which the charge generating material is dispersed in the charge transporting layer, the oxotitanylphthalocyanine of the invention is dispersed in the charge transporting layer having the compositional ratio described in the foregoing. It is necessary at this time that the particle diameter thereof is sufficiently small, preferably 1 µm or less. When the amount of the charge generating substance dispersed in the photosensitive layer is too small, the sensitivity is insufficient, and when it is too large, decrease in charging property and sensitivity is induced to cause problems. Accordingly, the amount of the charge generating substance in the photosensitive layer is from 0.5 to 50% by weight, preferably from 1 to 20% by weight. The thickness of the photosensitive layer is from 5 to 50 µm, preferably from 10 to 40 µm. In this case, in order to improve the film forming property, the flexibility and the mechanical strength of the photosensitive layer, a known plasticizer, an additive for suppressing the residual potential, a dispersing aid for improving the dispersion stability, a leveling agent for improving the coating property, a surface active agent, such as a silicone oil and a fluorine series oil, and other additives may be added.

Comparisons between the oxotitanylphthalocyanine of the invention and the known crystalline oxotitanylphthalocyanine will be made below. Among the known crystal forms, Y type and M-α type are relatively good in photosensitivity characteristics. (While there are I type and M type, because they are crystals obtained by treating M-α type as described in Electrophotography (The Society Journal, Society of Electrophotography of Japan), Vol. 32, No. 3, pp. 282–289, and their crystal systems and characteristics are similar to those of M type, they are included in M-α type.) However, the novel crystal form of the invention does not agree with them, and exhibits excellent characteristics. That is, while M-α type has major peaks at Bragg angles (2θ±0.2°) of 7.2°, 14.2°, 24.0° and 27.1°, the crystal form of the invention has major peaks at 7.3°, 9.4°, 9.6°, 11.6°, 13.3°, 17.9°, 24.1° and 27.2°, which is different from M-α type. While Y type has major peaks at 9.6°, 11.7°, 15.0°, 24.1° and 27.1°, the positions of the peaks of which are similar to the invention, the relative intensity of the spectrum is different from the invention. That is, the position exhibiting the maximum peak intensity in Y type is 27.3°, whereas the position of the maximum peak in the invention is the peak bundle formed by overlapping the peaks at 9.4° and 9.6°. (The position of the maximum peak in M-α type is 27.3°.) Furthermore, the crystal form of the invention is largely different from Y type due to the fact that although Y type has two clear peaks at Bragg angles (2θ±0.2°) near 18° and 24° as shown in FIG. 1 of Japanese Unexamined Patent Publication JP-A-7-271073, only one peak appears at Bragg angles (2θ±0.2°) 17.9° and 24.1° in the invention.

Japanese Unexamined Patent Publication JP-A-8-209023 discloses oxotitanylphthalocyanine having the maximum peak at Bragg angle (2θ±0.2°) of 9.6°. The oxotitanylphthalocyanine has a novel crystal form that is not reported in Electrophotography (The Society Journal, Society of Electrophotography of Japan), Vol. 32, No. 3, pp. 282–289. While the inventors have tried to produce the oxotitanylphthalocyanine having the novel crystal form, the crystal cannot be synthesized, and therefore comparison of the photosensitivity characteristics cannot be conducted. However, while the positions of the major peaks in Bragg angle disclosed in JP-A-8-209023 are 7.22°, 9.60°, 11.60°, 13.40°, 14.88°, 18.34°, 23.62°, 24.14° and 27.32°, the crystal form of the invention does not have any peak at 18.34°±0.2° and 23.62°±0.2°. Therefore, the crystal form of JP-A-8-209023 is different from the novel crystal form of the invention.

Because the oxotitanylphthalocyanine of the invention exhibits a large sensitivity in a long wavelength region, a photoreceptor having a sensitive wavelength in a long wavelength region, particularly, that optimum for a semiconductor laser and an LED, can be obtained. Furthermore, the oxotitanylphthalocyanine has characteristic features in that the crystal form is stable, the crystal stability to solvents and heat is excellent, and the photosensitivity characteristics and characteristics on repeated use as a photoreceptor are also excellent. These characteristics features can be considerable advantages not only in production and properties of the oxotitanylphthalocyanine of the invention, but also in production of the electrophotographic photoreceptor, as well as use thereof.

As a bisamine compound used as the charge transporting substance, a bisamine compound represented by formula (I—I) can be used. In particular, bisamine compounds represented by formulae (I-II) and (I-III) are preferably used from the standpoint of synthesis cost. Specific examples of the bisamine compound are shown in Tables 1 to 5, but the compound of the invention is not construed as being limited thereto.

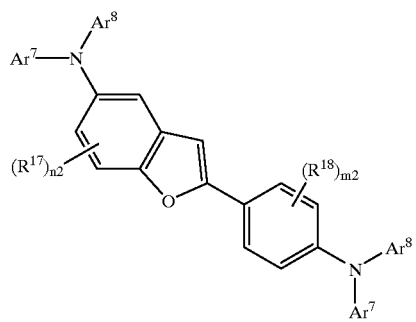
(I-II)

In formula (I-II), $Ar^7$ and $Ar^8$ each represent an aryl group, which may have a substituent, a heterocyclic group, which may have a substituent, an aralkyl group, which may have a substituent, or a heterocyclic-group-substituted alkyl group, which may have a substituent; $R^{17}$ and $R^{18}$ each represent an alkyl group, an alkoxy group, a dialkylamino group, each of which may have a substituent, a halogen atom, or a hydrogen atom; m2 is an integer of from 1 to 4; and n2 is an integer of from 1 to 3, provided that when m2 and n2 are 2 or more, plural groups represented by $R^{17}$ and $R^{18}$ may be the same or different, and may form a ring.

(I-III)

In formula (I-III), $R^{19}$ and $R^{20}$ each represent an alkyl group, an alkoxy group, a dialkylamino group, each of which may have a substituent, or a hydrogen atom; $R^{21}$ and $R^{22}$ each represent an alkyl group, an alkoxy group, a dialkylamino group, each of which may have a substituent, a halogen atom, or a hydrogen atom; m3 is an integer of from 1 to 4; n3 is an integer of from 1 to 3, provided that when m3 and n3 are 2 or more, plural groups represented by $R^{21}$ and $R^{22}$ may be the same or different, and may form a ring; and h and i each are an integer of from 1 to 3.

TABLE 1

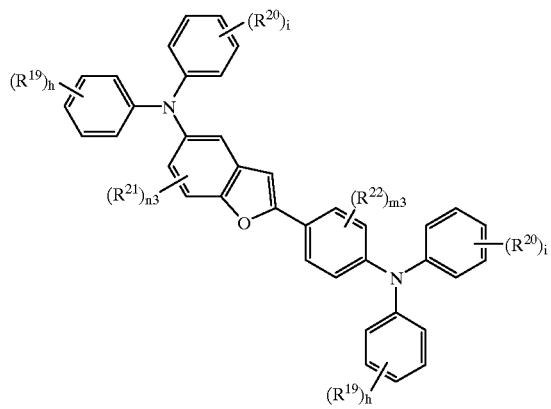

| Example Compound BA | $(R^{17})_{n2}$ | $(R^{18})_{m2}$ | $Ar^7$ | $Ar^8$ |
|---|---|---|---|---|
| 1 | H | H | phenyl | phenyl |
| 2 | H | H | 2-methylphenyl | 2-methylphenyl |
| 3 | H | H | 3-methylphenyl | 3-methylphenyl |
| 4 | H | H | 4-methylphenyl | 4-methylphenyl |
| 5 | H | H | 3-ethylphenyl | 3-ethylphenyl |
| 6 | H | H | 3-propylphenyl | 3-propylphenyl |
| 7 | H | H | 3-methyl-5-isopropylphenyl | 3-methyl-5-isopropylphenyl |
| 8 | H | H | 3-methoxyphenyl | 3-methoxyphenyl |
| 9 | H | H | 3-trifluoromethylphenyl | 3-trifluoromethylphenyl |

TABLE 1-continued

[Structure diagram showing benzofuran core with Ar⁷, Ar⁸, N substituents at positions labeled 1-13, with (R¹⁷)n2 and (R¹⁸)m2 groups]

| Example Compound BA | (R¹⁷)n2 | (R¹⁸)m2 | Ar⁷ | Ar⁸ |
|---|---|---|---|---|
| 10 | H | H | 3-N(CH₃)-phenyl | 3-N(CH₃)-phenyl |
| 11 | H | H | 4-biphenyl | 4-biphenyl |

TABLE 2

| BA | (R¹)n2 | (R¹⁸)m2 | Ar⁷ | Ar⁸ |
|---|---|---|---|---|
| 12 | H | H | 2-naphthyl | 2-naphthyl |
| 13 | H | H | 1-methylnaphthyl | 1-methylnaphthyl |
| 14 | H | H | tetrahydronaphthyl | tetrahydronaphthyl |
| 15 | H | H | phenyl | 3-methylphenyl |
| 16 | H | H | phenyl | 3-isopropylphenyl |
| 17 | H | H | phenyl | 3-methoxyphenyl |
| 18 | H | H | phenyl | 3-N(CH₃)-phenyl |

TABLE 2-continued

| BA | (R¹)n2 | (R¹⁸)m2 | Ar⁷ | Ar⁸ |
|---|---|---|---|---|
| 19 | H | H | 3-methylphenyl | 3-isopropylphenyl |
| 20 | H | H | 3-methylphenyl | 3-OC₂H₅-phenyl |
| 21 | H | H | 3-methylphenyl | 3-OCH₃-phenyl |
| 22 | H | H | 3-methylphenyl | 4-biphenyl |
| 23 | H | H | 3-methylphenyl | 2-naphthyl |
| 24 | H | H | 3-isopropylphenyl | 3-OCH₃-phenyl |
| 25 | H | H | 3-isopropylphenyl | 4-biphenyl |

TABLE 3

| BA | (R¹⁷)n2 | (R¹⁸)m2 | Ar⁷ | Ar⁸ |
|---|---|---|---|---|
| 26 | H | H | 3-isopropylphenyl | 2-naphthyl |
| 27 | 7-OCH₃ | H | 3-methylphenyl | 3-methylphenyl |

TABLE 3-continued
| BA | (R17)n2 | (R18)m2 | Ar7 | Ar8 |
|---|---|---|---|---|
| 28 | 7-OCH3 | H | | |
| 29 | 7-OCH3 | H | | |
| 30 | 7-OCH3 | H | | |
| 31 | 7-OCH3 | H | | |
| 32 | H | 10-CH3 | | |
| 33 | H | 10-CH3 | | |
| 34 | H | 10-CH3 | | |
| 35 | H | 10-CH3 | | |
| 36 | H | 10-CH3 | | |
| 37 | H | 9-CH3, 10-CH3 | | |
TABLE 4
| BA | (R17)n2 | (R18)m2 | Ar7 | Ar8 |
|---|---|---|---|---|
| 38 | H | 9-CH3, 10-CH3 | | |
| 39 | 7-OCH3 | 10-CH3 | | |
| 40 | 7-OCH3 | 10-CH3 | | |
| 41 | 7-OCH3 | 10-CH3 | | |
| 42 | 7-OCH3 | 10-CH3 | | |
| 43 | 7-OCH3 | 9-CH3, 10-CH3 | | |
TABLE 5
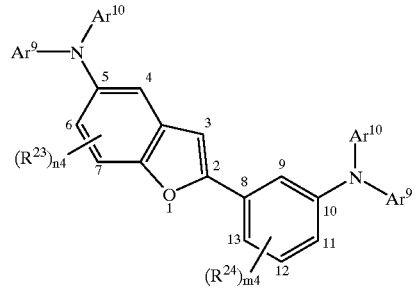
| Example Compound BA | (R23)n4 | (R24)m4 | Ar9 | Ar10 |
|---|---|---|---|---|
| 44 | H | H | | |
| 45 | H | H | | |

TABLE 5-continued

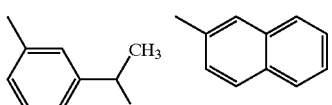

| Example Compound BA | $(R^{23})_{n4}$ | $(R^{24})_{m4}$ | $Ar^9$ | $Ar^{10}$ |
|---|---|---|---|---|
| 46 | H | H | 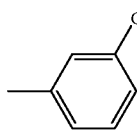 | 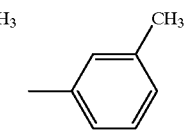 |
| 47 | 7-OCH$_3$ | H | 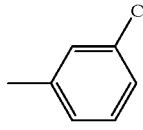 | 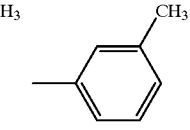 |
| 48 | H | 12-CH$_3$ | 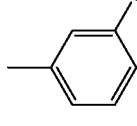 | 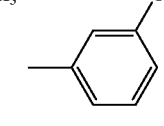 |
| 49 | 7-OCH$_3$ | 12-CH$_3$ | 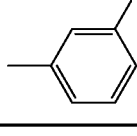 | 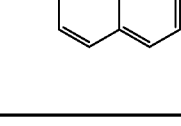 |
| 50 | 7-OCH$_3$ | 9-CH$_3$, 10-CH$_3$ |  |  |

As the charge transporting substance, one, or two or more of the bisamine compounds may be contained. Other charge transporting substance may also be contained.

As an N,N'-bisenamine compound used as the charge transporting substance, compounds represented by formulae (II-I), (II—II), (II-III) and (II-IV) arepreferablyused. In formulae (II-I), (II—II), (II-III) and (II-IV), specific examples of $Ar^3$ to $Ar^6$ include an aryl group, such as phenyl, tolyl, methoxyphenyl, naphthyl, pyrenyl and biphenyl, a heterocyclic group, such as benzofuryl, benzothiazolyl, benzoxazolyl and N-ethylcarbazolyl, and an aralkyl group, such as La methylbenzyl and methoxybenzyl.

Specific examples of $R^3$ include an aryl group, such as phenyl, tolyl, methoxyphenyl, naphthyl, pyrenyl and biphenyl, a heterocyclic group, such as benzofuryl, benzothiazolyl, benzoxazolyl and N-ethylcarbazolyl, an aralkyl group, such as methylbenzyl and methoxybenzyl, and an alkyl group, such as methyl, ethyl, n-propyl and isopropyl.

Specific examples of $R^4$ to $R^7$ include an alkyl group, such as methyl, ethyl, n-propyl and isopropyl, an alkoxy group, such as methoxy, ethoxy and propoxy, a dialkylamino group, such as dimethylamino and diethyleamino, a halogen atom, such as fluorine and chlorine, and a hydrogen atom, and an electron donating substituent is effective.

Specific examples of the N,N'-bisenamine compound are shown in Tables 6 to 9, but the compound of the invention is not construed as being limited thereto.

TABLE 6

| Example Compound BE | $Ar^3$ | $R^3$ | $R^4$ |
|---|---|---|---|
| 1 |  | —CH$_3$ | H |
| 2 |  | —C$_2$H$_5$ | H |
| 3 |  | —CH$_3$ | 4-CH$_3$ |
| 4 |  | —CH$_3$ | 4-OCH$_3$ |
| 5 |  | -n.C$_3$H$_7$ | H |
| 6 |  |  | Cl |
| 7 | —CH$_2$—  | —CH$_3$ | H |
| 8 | —CH$_2$—  | —CH$_3$ | H |
| 9 |  | -isoC$_3$H$_7$ | H |

TABLE 6-continued
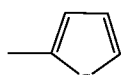
| Example Compound BE | Ar³ | R³ | R⁴ |
|---|---|---|---|
| 10 | 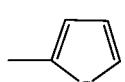 2-thienyl | —CH₃ | H |
| 11 | 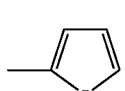 2-thienyl | —CH₃ | 4-CH₃ |
| 12 | 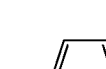 2-furyl | —CH₃ | H |
| 13 | 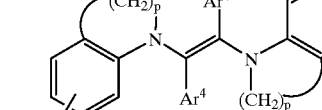 2-furyl | —CH₃ | 4-OCH₃ |
TABLE 7
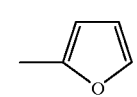
| Example Compound BE | Ar⁴ | R⁵ | p |
|---|---|---|---|
| 14 | phenyl | H | 2 |
| 15 | 4-methylphenyl | H | 2 |
| 16 | 4-methoxyphenyl | H | 2 |
| 17 | 2-thienyl | 3-CH₃ | 2 |
TABLE 7-continued
| Example Compound BE | Ar⁴ | R⁵ | p |
|---|---|---|---|
| 18 | 2-furyl | 4-CH₃ | 2 |
| 19 | 2-naphthyl | H | 2 |
| 20 | phenyl | H | 3 |
| 21 | 4-methylphenyl | H | 3 |
| 22 | 4-methoxyphenyl | H | 3 |
| 23 | 2-thienyl | H | 3 |
| 24 | 2-furyl | 4-OCH₃ | 3 |
| 25 | 2-naphthyl | H | 3 |
| 26 | phenyl | H | 4 |

TABLE 8
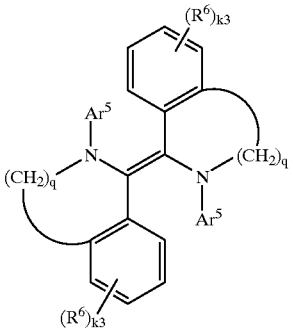
| Example Compound BE | Ar⁵ | R⁶ | q |
|---|---|---|---|
| 27 | phenyl | H | 1 |
| 28 | 4-methylphenyl | H | 1 |
| 29 | 4-methoxyphenyl | H | 1 |
| 30 | phenyl | 4-CH₃ | 1 |
| 31 | phenyl | 3-Cl | 1 |
| 32 | phenyl | H | 2 |
| 33 | 4-methylphenyl | H | 2 |
| 34 | 4-methoxyphenyl | H | 2 |
| 35 | phenyl | 4-CH₃ | 2 |
| 36 | 4-methylphenyl | 3-Cl | 2 |
TABLE 8-continued
| Example Compound BE | Ar⁵ | R⁶ | q |
|---|---|---|---|
| 37 | phenyl | H | 3 |
| 38 | 4-methylphenyl | H | 3 |
| 39 | 4-methoxyphenyl | H | 3 |
TABLE 9
| Example Compound BE | Ar⁶ | R⁷ | s |
|---|---|---|---|
| 40 | phenyl | H | 0 |
| 41 | 4-methylphenyl | H | 0 |
| 42 | 4-methoxyphenyl | H | 0 |

TABLE 9-continued

| Example Compound BE | Ar⁶ | R⁷ | s |
|---|---|---|---|
| 43 | (methylphenyl) | 3-6-diCH₃ | 0 |
| 44 | (thienyl) | H | 0 |
| 45 | (furyl) | H | 0 |
| 46 | (methylphenyl) | H | 1 |
| 47 | (4-methylphenyl) | H | 1 |
| 48 | (furyl) | H | 1 |
| 49 | (thienyl) | H | 1 |
| 50 | (methylphenyl) | H | 2 |
| 51 | (4-methylphenyl) | | 2 |
| 52 | (4-methoxyphenyl) | | 2 |

As the charge transporting substance, one, or two or more of the N,N'-bisenamine compounds may be contained. Other charge transporting substance may also be contained.

As a styryl compound used as the charge transporting substance, compound represented by formula (III) is preferably used. In formula (III), $R^8$ to $R^{11}$ each represent a hydrogen atom, an alkyl group, which may have a substituent, an aralkyl group, which may have a substituent, or an aryl group, which may have a substituent. Examples of the alkyl group, which may have a substituent, include a linear or branched alkyl group having from 1 to 4 carbon atoms, and specific examples thereof include methyl, ethyl, propyl, isopropyl, butyl, sec-butyl and tert-butyl. Examples of the aralkyl group include an alkyl group having from 1 to 3 carbon atoms and having a phenyl group attached to the end thereof, and specific examples thereof include benzyl, methylbenzyl, chlorobenzyl, β-phenylethyl and α-naphthylmethyl. Examples of the aryl group include phenyl, methoxy phenyl, tolyl, chlorophenyl and naphthyl.

$Z^2$ represents an atomic group for forming a saturated 5- to 8-membered ring along with the two carbon atoms of the indoline ring. Specific examples thereof include those shown by the example compounds described later.

Specific examples of the styryl compound are shown in Tables 10 to 13, but the compound of the invention is not construed as being limited thereto.

TABLE 10

| Example Compound ST | Structural Formula | Example Compound ST | Structural Formula |
|---|---|---|---|
| 1 | | 6 | |
| 2 | | 7 | |
| 3 | | 8 | |
| 4 | | 9 | |

TABLE 10-continued

| Example Compound ST | Structural Formula | Example Compound ST | Structural Formula |
|---|---|---|---|
| 5 | | 10 | |
| 20 | | | |
| 25 | | | |

TABLE 11

| Example Compound ST | Structural Formula | Example Compound ST | Structural Formula |
|---|---|---|---|
| 11 | | 15 | |
| 12 | | 16 | |

TABLE 11-continued

| Example Compound ST | Structural Formula | Example Compound ST | Structural Formula |
|---|---|---|---|
| 13 | | 17 | |
| 14 | | 18 | |

TABLE 12

| Example Compound ST | Structural Formula | Example Compound ST | Structural Formula |
|---|---|---|---|
| 19 | | 24 | |
| 20 | | 25 | |
| 21 | | 26 | |
| 22 | | 27 | |

TABLE 12-continued

| Example Compound ST | Structural Formula | Example Compound ST | Structural Formula |
|---|---|---|---|
| 23 | | 28 | |

TABLE 13

| Example Compound ST | Structural Formula | Example Compound ST | Structural Formula |
|---|---|---|---|
| 29 | | 31 | |
| 30 | | 32 | |

As the charge transporting substance, one, or two or more of the styryl compounds may be contained. Other charge transporting substance may also be contained.

@130 As an amine-hydrazone compound used as the charge transporting substance, an amine-hydrazone compound represented by formula (IV-I) can be used. In particular, amine-hydrazone compounds represented by formulae (IV-II) and (IV-III) are preferably used from the standpoint of synthesis cost.

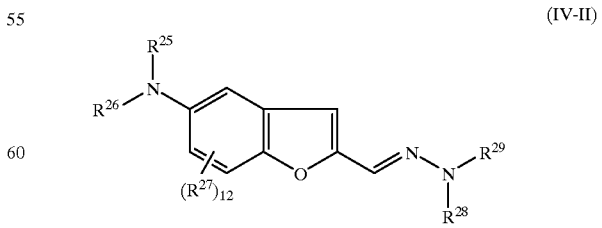

(IV-II)

In formula (IV-II), $R^{25}$ and $R^{26}$ may be the same or different, and each represent a lower alkyl group, an aromatic hydrocarbon residual group, which may have a substituent, a heterocyclic residual group, which may have a substituent, or an aralkyl group, which may have a substituent; $R^{27}$ represents a hydrogen atom, a halogen atom, a lower alkyl group, a lower alkoxy group, a lower dialkylamino group, a trifluoromethyl group, or an aralkyl group, which may have a substituent; $R^{28}$ and $R^{29}$ may be the same or different, and each represent a lower alkyl group, an aromatic hydrocarbon residual group, which may have a substituent, a heterocyclic residual group, which may have a substituent, or an aralkyl group, which may have a substituent; and 12 is an integer of from 1 to 3.

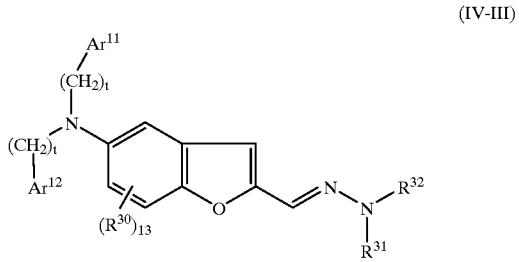

(IV-III)

In formula (IV-III), $Ar^{11}$ and $Ar^{12}$ may be the same or different, and each represent an aromatic hydrocarbon residual group, which may have a substituent, or a heterocyclic residual group, which may have a substituent; $R^{30}$ represents a hydrogen atom, a halogen atom, a lower alkyl group, a lower alkoxy group, a lower dialkylamino group, a trifluoromethyl group, or an aralkyl group, which may have a substituent; $R^{31}$ and $R^{32}$ may be the same or different, and each represent a lower alkyl group, an aromatic hydrocarbon residual group, which may have a substituent, a heterocyclic residual group, which may have a substituent, or an aralkyl group, which may have a substituent; and t, u and 13 each are an integer of from 1 to 3.

In formulae (IV-I), (IV-II) and (IV-III), $R^{12}$, $R^{13}$, $R^{14}$, $R^{15}$, $R^{25}$, $R^{26}$, $R^{28}$, $R^{29}$, $R^{31}$ and $R^{32}$ may be the same or different, and each represent a lower alkyl group, an aromatic hydrocarbon residual group, which may have a substituent, a heterocyclic residual group, which may have a substituent, or an aralkyl group, which may have a substituent. Examples of the lower alkyl group include a linear or branched alkyl group having from 1 to 4 carbon atoms, and specific examples thereof include methyl, ethyl, propyl, isopropyl, butyl, sec-butyl and tert-butyl. Examples of the aromatic hydrocarbon residual group, which may have a substituent, include a phenyl group and a 1-naphthyl group. Examples of the heterocyclic residual group, which may have a substituent, include a 1-pyridyl group. Examples of the aralkyl group, which may have a substituent, include an alkyl group having from 1 to 3 carbon atoms and having a phenyl group attached to the end thereof, and specific examples thereof include benzyl and phenethyl.

Examples of the substituent on the aromatic hydrocarbon residual group, the heterocyclic residual group and the aralkyl group include a lower alkyl group, such as methyl and ethyl, a lower alkoxy group, such as methoxy and ethoxy, an amino group, such as methylamino, dimethylamino, ethylamino, ethylmethylamino and diethylamino, and a halogen atom, such as fluorine, chlorine and bromine, and it is preferred to have one or two substituents.

$R^{16}$, $R^{27}$ and $R^{30}$ each represent a hydrogen atom, a halogen atom, a lower alkyl group, a lower alkoxy group, a lower dialkylamino group, a trifluoromethyl group, or an aralkyl group, which may have a substituent. Examples of the halogen atom include fluorine, chlorine and bromine. Examples of the lower alkyl group include the lower alkyl groups exemplified for $R^{12}$ and $R^{25}$. Examples of the lower alkoxy group include a linear or branched alkoxy group having from 1 to 4 carbon atoms. Specific examples thereof include methoxy, ethoxy, propoxy, isopropoxy, butoxy, sec-butoxy and tert-butoxy. Examples of the lower dialkylamino group include an amino group having, as a substituent, a linear or branched alkyl group having from 1 to 4 carbon atoms. Specific examples thereof include dimethylamino, diethylamino, diisopropylamino and dibutylamino. Examples of the aralkyl group include the lower aralkyl groups exemplified for $R^{12}$ and $R^{25}$.

$Ar^{11}$ and $Ar^{12}$ may be the same or different, and each represent an aromatic hydrocarbon residual group, which may have a substituent, or a heterocyclic residual group, which may have a substituent. Examples of the aromatic hydrocarbon residual group, which may have a substituent include a phenyl group and a 1-naphthyl group, and examples of the heterocyclic residual group, which may have a substituent include a 1-pyridyl group.

Specific examples of the amine-hydrazone compound are shown in Table 14, but the compound of the invention is not construed as being limited thereto.

TABLE 14

| Example Compound AH | $R^{25}$ | $R^{26}$ | $R^{27}$ | $R^{28}$ | $R^{29}$ |
|---|---|---|---|---|---|
| 1 | Ph | Ph | H | Ph | Ph |
| 2 | Ph | Ph | H | Ph | Me |
| 3 | Ph | Ph | H | Ph | Et |
| 4 | Ph | Ph | H | Ph | Bu |
| 5 | Ph | Ph | H | p-Me—Ph | Et |
| 6 | Ph | Ph | H | m-Me—Ph | Et |
| 7 | Ph | Ph | H | o-Me—Ph | Et |
| 8 | Ph | Ph | 6-Me | Ph | Ph |
| 9 | Ph | Ph | 6-Me | Ph | Me |
| 10 | p-Me—Ph | p-Me—Ph | H | Ph | Ph |
| 11 | p-Me—Ph | p-Me—Ph | H | Ph | Me |
| 12 | p-Me—Ph | p-Me—Ph | 6-Me | Ph | Ph |
| 13 | p-Me—Ph | p-Me—Ph | 6-Me | Ph | Me |
| 14 | Ph | p-Me—Ph | H | Ph | Ph |
| 15 | Ph | p-Me—Ph | H | Ph | Me |
| 16 | $PhCH_2$ | $PhCH_2$ | H | Ph | Ph |
| 17 | $PhCH_2$ | $PhCH_2$ | H | Ph | Me |
| 18 | $PhCH_2$ | $PhCH_2$ | H | Ph | Et |
| 19 | $PhCH_2$ | $PhCH_2$ | H | Ph | Bu |
| 20 | $PhCH_2$ | $PhCH_2$ | H | p-Me—Ph | Et |
| 21 | $PhCH_2$ | $PhCH_2$ | 6-Me | Ph | Ph |
| 22 | $PhCH_2$ | $PhCH_2$ | 6-Me | Ph | Me |
| 23 | Ph | Ph | H | Ph | Ph |
| 24 | Ph | Ph | H | Ph | Me |
| 25 | Ph | Ph | H | m-Me—Ph | Et |
| 26 | p-Me—Ph | p-Me—Ph | H | Ph | Ph |
| 27 | p-Me—Ph | p-Me—Ph | H | Ph | Me |
| 28 | $PhCH_2$ | $PhCH_2$ | H | Ph | Ph |
| 29 | $PhCH_2$ | $PhCH_2$ | H | Ph | Me |
| 30 | $PhCH_2$ | $PhCH_2$ | H | m-Me—Ph | Et |

As the charge transporting substance, one, or two or more of the amine-hydrazone compounds may be contained. Other charge transporting substance may also be contained.

As a benzofuran-bishydrazone compound used as the charge transporting substance, a benzofuran-bishydrazone compound represented by formula (V) can be used. In formula (V), specific examples of $Ar^{13}$ and $Ar^{14}$ include an aryl group, such as phenyl, tolyl, methoxyphenyl, naphthyl, pyrenyl and biphenyl, a heterocyclic group, such as benzofuryl, benzothiazolyl, benzoxazolyl and N-ethylcarbazolyl, and an aralkyl group, such as methylbenzyl and methoxybenzyl.

Specific examples of a include an alkyl group, such as methyl, ethyl, n-propyl and isopropyl, an alkoxygroup, suchas methoxy, ethoxy and propoxy, a dialkylamino group, such as dimethylamino and diethylamino, a halogen atom, such as fluorine and chlorine, and a hydrogen atom, and an electron donating substituent is effective.

The benzofuran-bishydrazone compound represented by formula (V) can be synthesized by various methods, and in general, it is easily produced by the following synthesis process. To 1.0 equivalent of a bisformylbenzofuran compound represented by formula (XII) and from 2.0 to 2.4 equivalents of a hydrazine reagent represented by formula (XIII) in an organic solvent, such as ethanol, methanol, tetrahydrofuran, 1,4-dioxane and acetonitrile, from 0.001 to 0.01 equivalent of a catalyst, such as acetic acid, potassium acetate, calcium acetate and sodium acetate, is added, and stirred under heating at 40 to 80° C. for 3 to 10 hours, to produce the benzofuran-bishydrazone compound.

(XII)

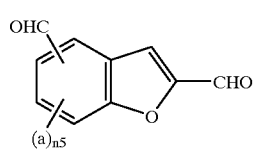

In formula (XII), a represents an alkyl group having from 1 to 3 carbon atoms, an alkoxy group having from 1 to 3 carbon atoms, a dialkylamino group having from 1 to 3 carbon atoms, a halogen atom, or a hydrogen atom; and n5 is an integer of from 1 to 3, provided that when n5 is 2 or more, plural groups represented by a may be the same or different.

(XIII)

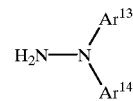

In formula (XIII), $Ar^{13}$ and $Ar^{14}$ each represent an aryl group, which may have a substituent, an aralkyl group, which may have a substituent, a heterocyclic group, which may have a substituent, or an alkyl group having from 1 to 4 carbon atoms, which may have a substituent.

Specific examples of the benzofuran-bishydrazone compound are shown in Tables 15 to 18, but the compound of the invention is not construed as being limited thereto.

TABLE 15

| Example Compound BB | $Ar^{13}$ | $Ar^{14}$ | a | n5 |
|---|---|---|---|---|
| 1 | —CH₃ | phenyl | —H | 3 |
| 2 | —C₂H₅ | phenyl | —H | 3 |
| 3 | -nC₄H₉ | phenyl | —H | 3 |
| 4 | —CH₃ | 3-methylphenyl | —H | 3 |
| 5 | —C₂H₅ | 4-methylphenyl | —H | 3 |
| 6 | —C₂H₅ | 2-methylphenyl | —H | 3 |
| 7 | phenyl | phenyl | —H | 3 |
| 8 | —CH₂-(2-thienyl) | phenyl | —H | 3 |
| 9 | —CH₃ | 1-naphthyl | —H | 3 |
| 10 | 4-methylphenyl | 4-methylphenyl | —H | 3 |
| 11 | —CH₃ | phenyl | 7-OCH₃ | 1 |

TABLE 15-continued

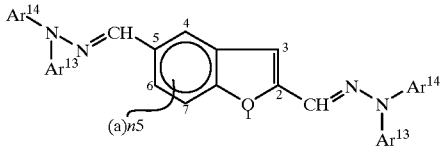

| Example Compound BB | Ar[13] | Ar[14] | a | n5 |
|---|---|---|---|---|
| 12 | phenyl | phenyl | 7-OCH₃ | 1 |
| 13 | -CH₂-(2-thienyl) | phenyl | 7-OCH₃ | 1 |

TABLE 16

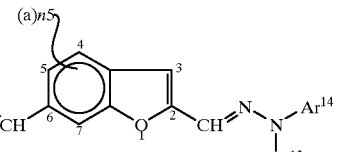

| Example Compound BB | Ar[13] | Ar[14] | a | n5 |
|---|---|---|---|---|
| 14 | —CH₃ | phenyl | —H | 3 |
| 15 | —C₂H₅ | phenyl | —H | 3 |
| 16 | -nC₄H₉ | phenyl | —H | 3 |
| 17 | —CH₃ | 3,5-dimethylphenyl | —H | 3 |
| 18 | —C₂H₅ | 3,4-dimethylphenyl | —H | 3 |
| 19 | -CH₂-(2-thienyl) | phenyl | —H | 3 |
| 20 | —CH₃ | phenyl | 5-CH₃ | 1 |

TABLE 16-continued

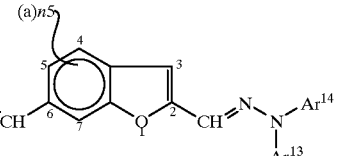

| Example Compound BB | Ar[13] | Ar[14] | a | n5 |
|---|---|---|---|---|
| 21 | phenyl | phenyl | 5-CH₃ | 1 |
| 22 | 4-methylphenyl | 4-methylphenyl | 5-CH₃ | 1 |
| 23 | —CH₃ | phenyl | 5-OCH₃ | 1 |
| 24 | phenyl | phenyl | 5-OCH₃ | 1 |
| 25 | 4-methylphenyl | 4-methylphenyl | 5-OCH₃ | 1 |
| 26 | —C₂H₅ | phenyl | 5-OCH₃ | 1 |

TABLE 17

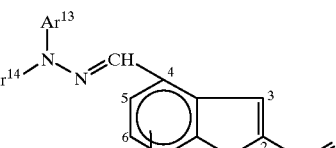

| Example Compound BB | Ar[13] | Ar[14] | a | n5 |
|---|---|---|---|---|
| 27 | —CH₃ | phenyl | —H | 3 |
| 28 | —C₂H₅ | phenyl | —H | 3 |

TABLE 17-continued

Structure: Ar13-N(Ar14)-N=CH- attached at position 4 of benzofuran; position 2 has -CH=N-N(Ar13)(Ar14); (a)n5 substituent on positions 5-7.

| Example Compound BB | Ar13 | Ar14 | a | n5 |
|---|---|---|---|---|
| 29 | -nC₄H₉ | phenyl | —H | 3 |
| 30 | —CH₃ | 3-methylphenyl | —H | 3 |
| 31 | —C₂H₅ | 4-methylphenyl | —H | 3 |
| 32 | —C₂H₅ | 2-methylphenyl | —H | 3 |
| 33 | phenyl | phenyl | —H | 3 |
| 34 | 2-thienylmethyl | phenyl | —H | 3 |
| 35 | —CH₃ | phenyl | 5-CH₃ | 1 |
| 36 | 4-methylphenyl | phenyl | 5-CH₃ | 1 |
| 37 | —C₂H₅ | phenyl | 5-CH₃ | 1 |
| 38 | 2-thienylmethyl | phenyl | 5-CH₃ | 1 |
| 39 | —CH₃ | 1-methylnaphthyl | 5-CH₃ | 1 |

TABLE 18

Structure: Ar14-N(Ar13)-N=CH- attached at position 7 of benzofuran; position 2 has -CH=N-N(Ar14)(Ar13); (a)n5 substituent on positions 4-6.

| Example Compound BB | Ar13 | Ar14 | a | n5 |
|---|---|---|---|---|
| 40 | —CH₃ | phenyl | —H | 3 |
| 41 | —C₂H₅ | phenyl | —H | 3 |
| 42 | -nC₄H₉ | phenyl | —H | 3 |
| 43 | —C₂H₅ | 3-methylphenyl | —H | 3 |
| 44 | —C₂H₅ | 4-methylphenyl | —H | 3 |
| 45 | —C₂H₅ | 2-methylphenyl | —H | 3 |
| 46 | phenyl | phenyl | —H | 3 |

TABLE 18-continued

As the charge transporting substance, one, or two or more of the benzofuran-bishydrazone compounds may be contained. Other charge transporting substance may also be contained.

In the function separated type photosensitive layer 4a, the charge transporting layer 6 preferably contains the binder resin described above, in addition to the charge transporting substance 3. Particularly, in the case where the N,N'-bisenamine compound and the benzofuran-bishydrazone compound are used as the charge transporting substance, polycarbonate represented by formula (IX) is preferably used. Polyester represented by formula (X) is also particularly preferred. Furthermore, a mixture of the polycarbonate represented by formula (IX) and the polyester represented by formula (X) is also particularly preferred.

Specific examples of the polycarbonate are shown in Table 19, but the polycarbonate of the invention is not construed as being limited thereto.

TABLE 19-continued

| Example Compound V | Structural Formula |
|---|---|
| 3 | (structure with C4H9-phenyl-O-C(=O)-O-[tetramethyl bisphenol cyclohexylidene carbonate]-O-C(=O)-O-phenyl-C4H9) |
| 4 | (structure with C4H9-O-C(=O)-phenyl-O-C(=O)-O-[bisphenol-1-methyl-1-phenyl]-O-C(=O)-O-phenyl-C(=O)-O-C4H9) |
| 5 | (structure with HO-C(=O)-phenyl-O-C(=O)-O-[bisphenol cyclohexylidene]-O-C(=O)-O-phenyl-C(=O)-OH) |
| 6 | (structure with C4H9-O-C(=O)-phenyl-O-C(=O)-O-[dimethyl bisphenol cyclohexylidene]-O-C(=O)-O-phenyl-C(=O)-O-C4H9) |
| 7 | (structure with C6H13-O-C(=O)-phenyl-O-C(=O)-O-[bisphenol A]-O-C(=O)-O-phenyl-C(=O)-O-C6H13) |
| 8 | (structure with C4H9-O-C(=O)-phenyl-O-C(=O)-O-[dimethyl bisphenol-1-methyl-1-phenyl]-O-C(=O)-O-phenyl-C(=O)-O-C4H9) |

It is preferred that the polyester represented by formula (X) is used in an amount of from 0.05 to 0.5 part by weight, more preferably from 0.2 to 0.3 part by weight, based on the total binder resin.

The bisamine compound, the N,N'-bisenamine compound, the styryl compound, the amine-hydrazone compound and the benzofuran-bishydrazone compound is preferably used in an amount of from 0.2 to 1.5 parts by weight, more preferably from 0.3 to 1.2 parts by weight, based on the total binder resin.

As a bisenamine compound used as the charge transporting substance, a bisenamine compound represented by formula (VI-I) is preferably used.

In formula (VI-I), the substitution of an aryl group, an aralkyl group and a heterocyclic group represented by $A_1$ is not limited to mono-substitution, but may be di-substitution or tri-substitution. The plural substituents may be the same or different substituents, and the position of substitution is preferably the meta-position (m-) or the para-position (p-), but not the ortho-position (o-), which brings about steric hindrance and involves a problem on synthesis.

Examples of the substituent include a hydrogen atom; a halogen atom, such as a fluorine atom, a chlorine atom and a bromine atom; an alkyl group having from 1 to 4 carbon atoms, such as a methyl group, an ethyl group, a n-propyl group, an isopropyl group, a n-butyl group and an isobutyl group; an alkoxy group having from 1 to 4 carbon atoms, such as a methoxy group, an ethoxy group, a propoxy group and a butoxy group; a phenyl group, which may have a substituent; a di-substituted amino group having the same or different substituents.

Examples of the di-substituted amino group having the same or different substituents include a dimethylamino group, a diethylamiino group, a diphenylamino group, a methylphenylamino group, an ethylphenylamino group, a di(p-tolylphenyl)amino group, a dibenzylamino group, a benzylmethylamino group, a benzylethylamino group and a benzylphenylamino group.

Examples of the aryl group represented by $A_1$ in formula (VI-I) include those having from 6 to 16 carbon atoms, such as a phenyl group, a (1- or 2-)naphthyl group, a (1-, 2- or 9-)anthryl group and a (1- or 2-)pyrenyl group.

Examples of the aryl group, which may have a substituent, include a (m- or p-)chlorophenyl group, a (m- or p-)tolyl group, a (m- or p-)ethylphenyl group, a (m- or p-)propylphenyl group, a (m- or p-)butylphenyl group, a (m- or p-)methoxyphenyl group, a (3,4- or 3,5-) dimethoxyphenyl group, a (m- or p-) ethoxyphenyl group, a (m- or p-)dimethylaminophenyl group, a (2-, 3- or 4-)biphenylyl group and an (o-, m- or p-)tolyl-(m- or p-)phenyl group.

Examples of the aralkyl group, which may have a substituent, represented by $A_1$ in formula (VI-I) include a benzyl group, a phenethyl group, a methylbenzyl group and a methoxybenzyl group.

Examples of the heterocyclic group, which may have a substituent, represented by $A_1$, in formula (VI-I) include a (2- or 3-) furyl group, a (2- or 3-)benzofuryl group, a (2-, 4-, 5-, 6- or 7-)benzothiazolyl group, a 2-, 4-, 5-, 6- or 7-)benzoxazolyl group, a (1-, 2-, 3-, 4- or 9-)carbazolyl group or an N-ethylcarbazolyl group.

Examples of the lower alkyl group represented by $A_1$ in formula (VI-I) include those having from 1 to 5 carbon atoms, and among these, an alkyl group having from 1 to 4 carbon atoms, such as a methyl group, an ethyl group, a n-propyl group, an isopropyl group, a n-butyl group and an isobutyl group, is particularly preferred.

Examples of the lower alkyl group represented by $R_1$ in formula (VI-I) include those exemplified for $A_1$, and those having from 1 to 3 carbon atoms are more preferred. Examples of the lower alkoxy group represented by $R_1$ include those having from 1 to 5 carbon atoms, and among these, an alkoxy group having from 1 to 3 carbon atoms, such as a methoxy group, an ethoxy group, a n-propoxy group and an isopropoxy group, is preferred.

Examples of the di-lower alkylamino group represented by $R_1$ in formula (VI-I) include a dimethylamino group, a diethylamino group and a diisopropylamino group.

Examples of the halogen atom represented by $R_1$ in formula (VI-I) include a fluorine atom, a chlorine atom and a bromine atom.

As the substituent, an electron donating substituent is generally preferred.

Furthermore, a bisenamine compound represented by formula (VI-II) is preferred.

Examples of the aryl group, which may have a substituent, the aralkyl group, which may have a substituent, the heterocyclic group, which may have a substituent, and the lower alkyl group, which may have a substituent represented by $A_2$, $A_3$ and $R_3$ in formula (VI-II) include those exemplified for $A_1$ in formula (VI-I).

The bisenamine compound represented by formula (VI-I) used in the invention can be synthesized by various methods, and in general, it is easily synthesized by the following synthesis process.

An aldehyde compound (from 2.0 to 2.8 equivalents) represented by formula (XIV):

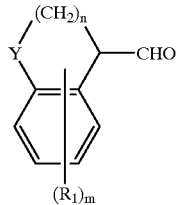

(XIV)

wherein $R_1$, m, n and Y have the same meaning as in formula (IV-I) and an amino compound (1.0 equivalent) represented by formula (XV):

$H_2NA_1$ (XV)

wherein $A_1$ has the same meaning as in formula (IV-I) are reacted by stirring under heating for 2 to 18 hours in an organic solvent, such as toluene, xylene, chlorobenzene and chloroform, in the presence of an acid catalyst, such as p-toluene sulfonic acid, camphorsulfonic acid and a pyridinium p-toluene sulfonic acid, and water by-produced is azeotropically removed, so as to easily produce the bisenamine compound represented by formula (IV-I).

The bisenamine compound represented by formula (VI-II) used in the invention can be synthesized by various methods, and in general, it is easily synthesized by the following synthesis process.

An aldehyde compound (from 2.0 to 2.8 equivalents) represented by formula (XIV):

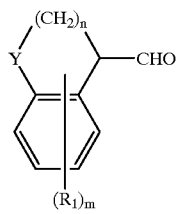

(XIV)

wherein $R_1$, m, n and Y have the same meaning as in formula (IV-I) and an amino compound (1.0 equivalent) represented by formula (XVI):

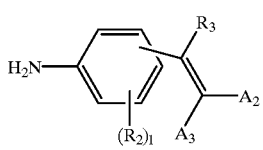

(XVI)

wherein $A_2$, $A_3$, $R_2$, $R_3$ and 1 have the same meaning as in formula (IV-II) are reacted by stirring under heating for 2 to 18 hours in an organic solvent, such as toluene, xylene, chlorobenzene and chloroform, in the presence of an acid catalyst, such as p-toluene sulfonic acid, camphorsulfonic acid and a pyridinium p-toluene sulfonic acid, and water by-produced is azeotropically removed, so as to easily produce the bisenarnine compound represented by formula (VI-II).

Specific examples of the bisenarnine compound represented by formulae (VI-I) and (VI-II) are shown below, but the scope of the invention is not construed as being limited by these examrple compounds.

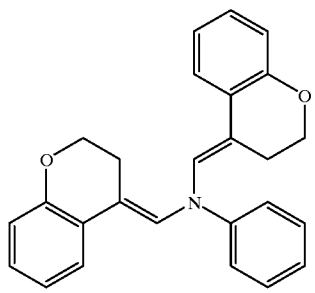

Example Compound BE 61

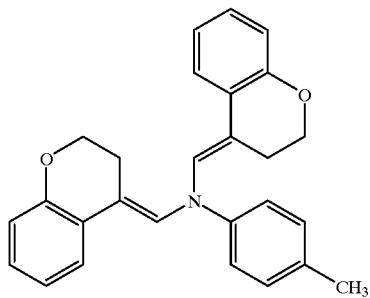

Example Compound BE 62

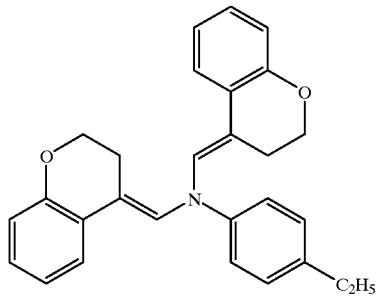

Example Compound BE 63

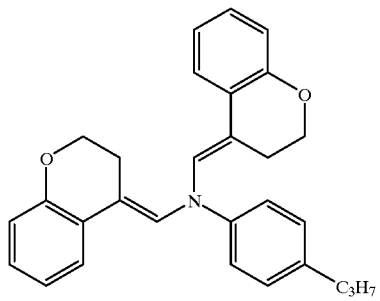

Example Compound BE 64

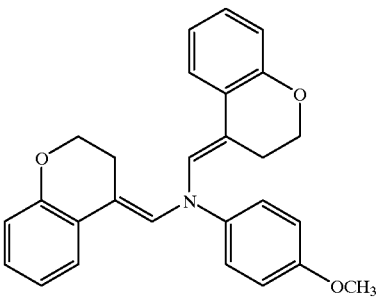

Example Compound BE 65

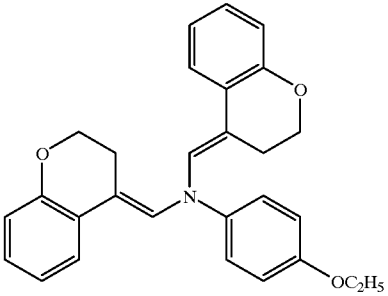

Example Compound BE 66

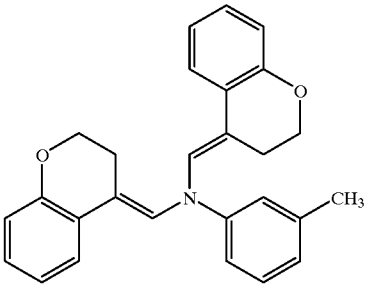

Example Compound BE 67

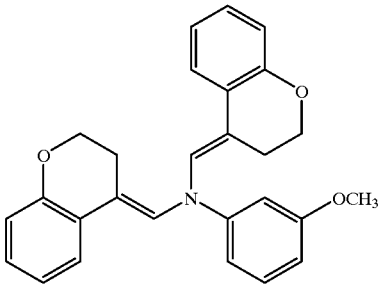

Example Compound BE 68

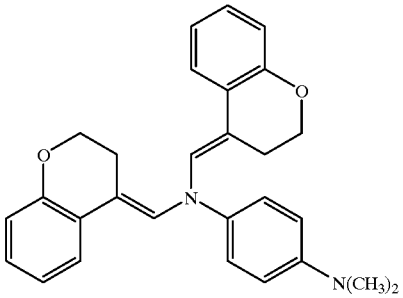

Example Compound BE 69

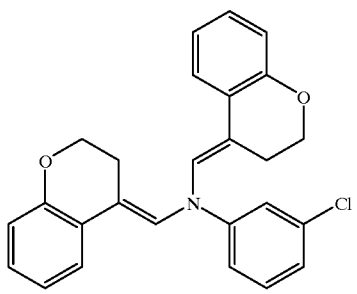
Example Compound BE 70
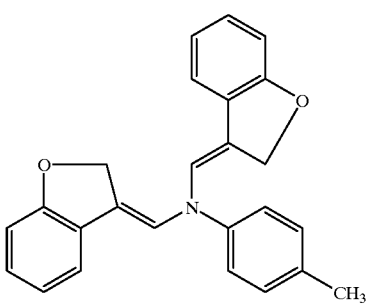
Example Compound BE 71
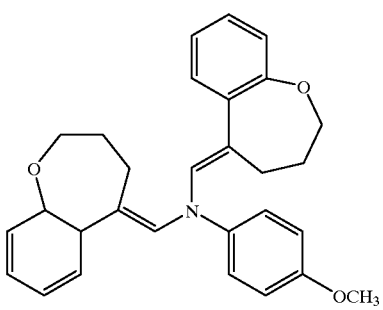
Example Compound BE 72
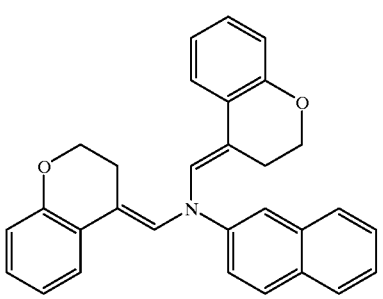
Example Compound BE 73
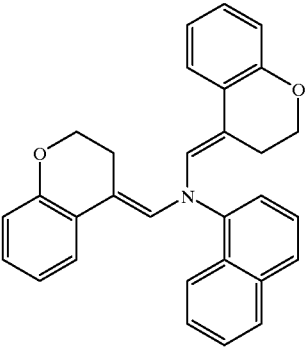
Example Compound BE 74
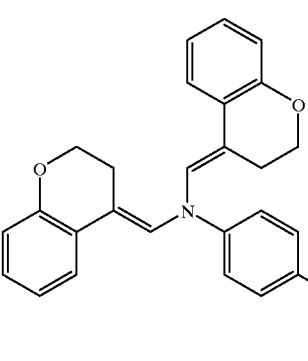
Example Compound BE 75
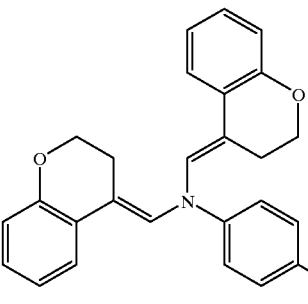
Example Compound BE 76
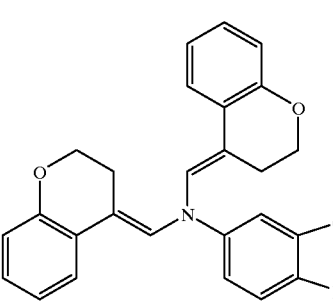
Example Compound BE 77

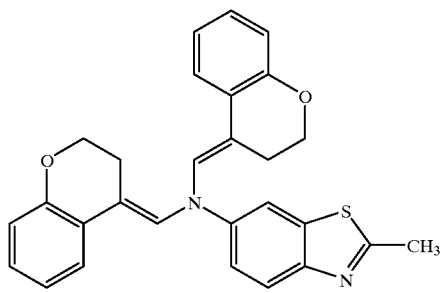
Example Compound BE 78
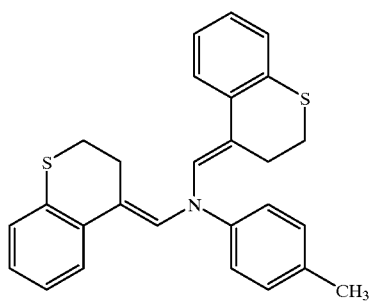
Example Compound BE 79
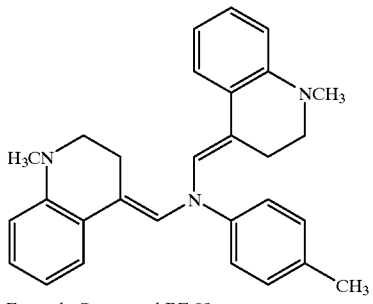
Example Compound BE 80
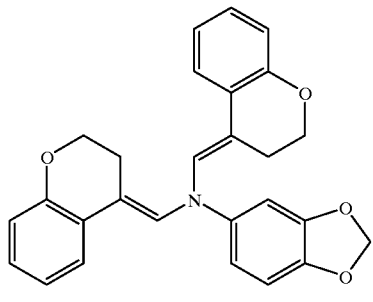
Example Compound BE 81
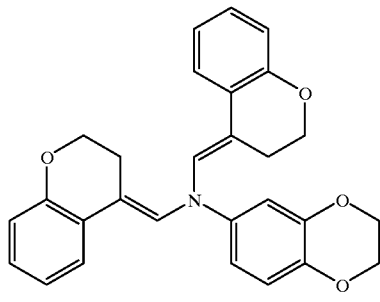
Example Compound BE 82
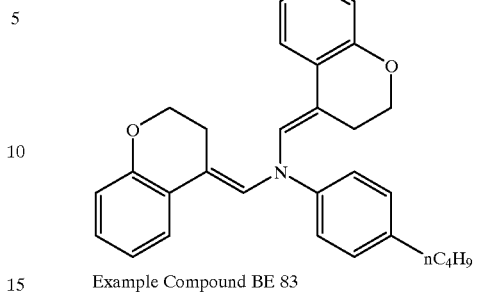
Example Compound BE 83
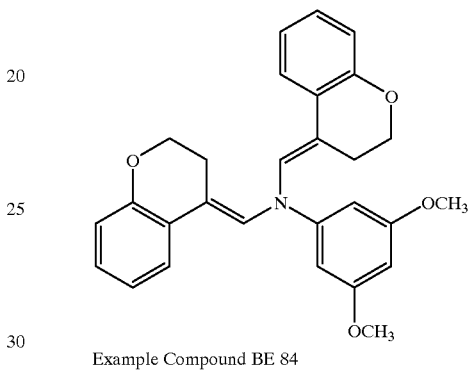
Example Compound BE 84
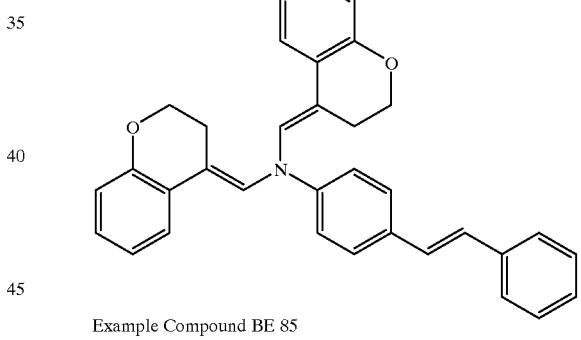
Example Compound BE 85
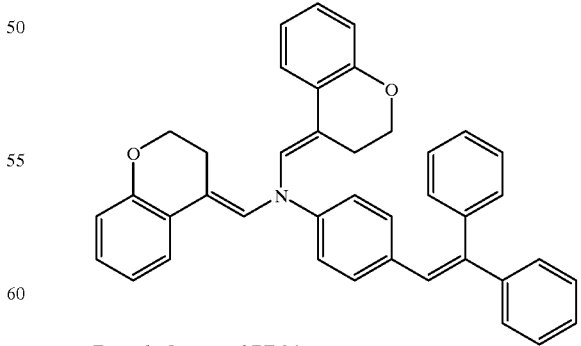
Example Compound BE 86

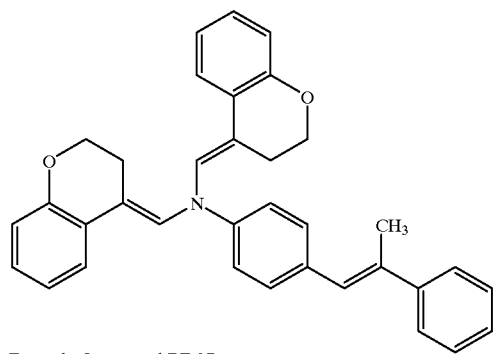
Example Compound BE 87
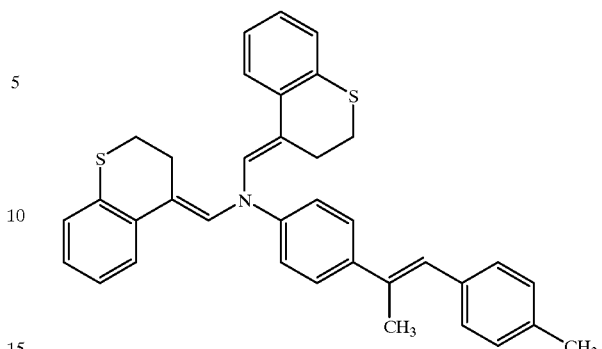
Example Compound BE 91
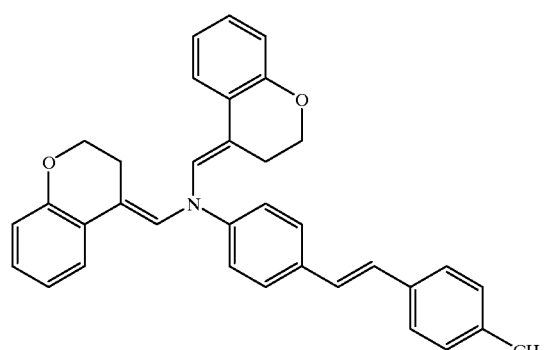
Example Compound BE 88
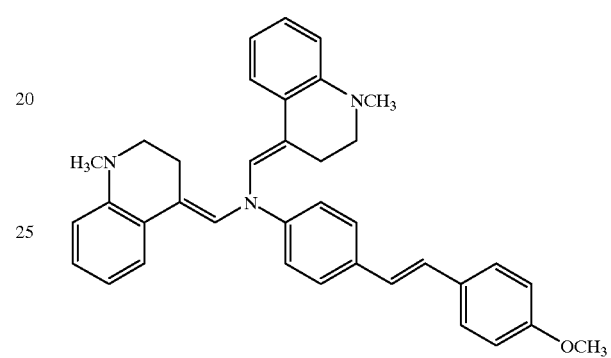
Example Compound BE 92
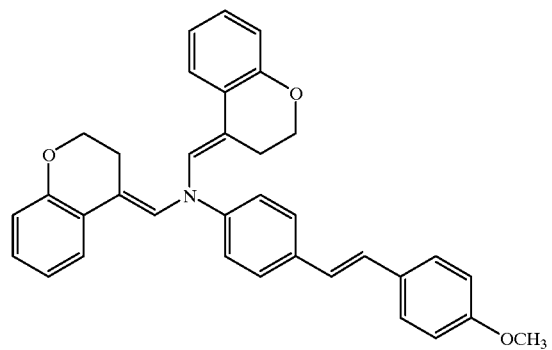
Example Compound BE 89
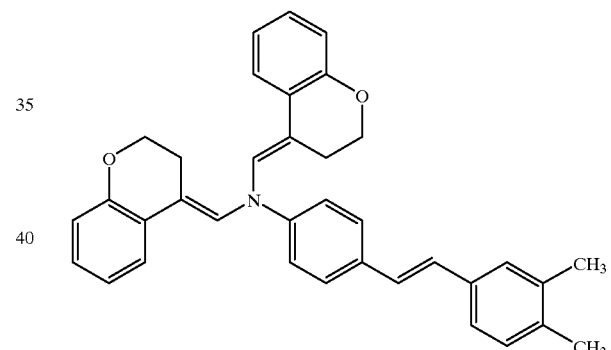
Example Compound BE 93
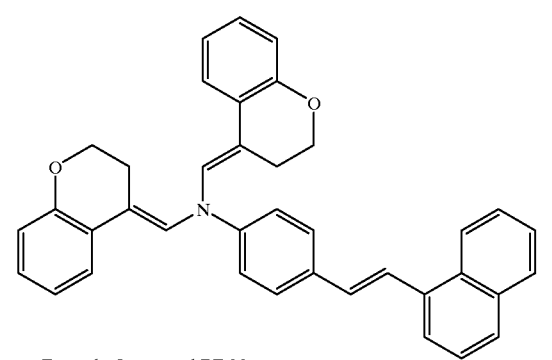
Example Compound BE 90
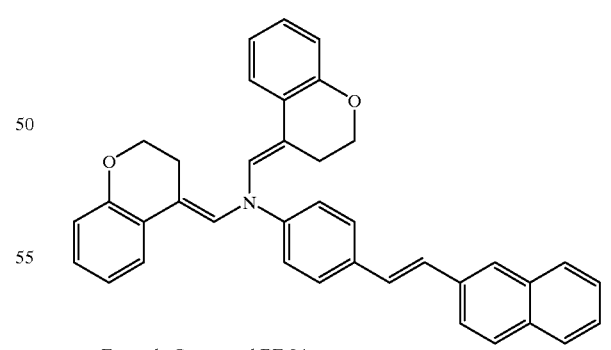
Example Compound BE 94

-continued

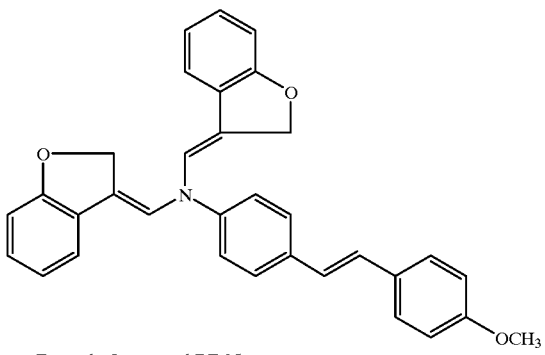

Example Compound BE 95

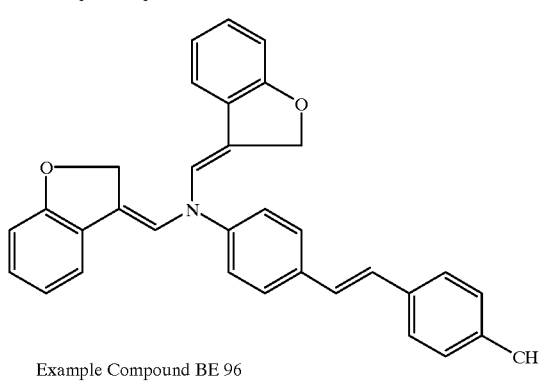

Example Compound BE 96

The amount of the bisenamine compound or the bisenamine-styrene compound as the charge transporting substance is from 0.2 to 1.5 parts by weight, and preferably from 0.3 to 1.2 parts by weight, per 1 part by weight of the binder resin.

Examples of the charge transporting substance contained in the photosensitive layer include a benzofuran-bishydrazone compound represented by formula (VII).

Examples of the aryl group represented by $Ar^1$, $Ar^2$, $Ar^3$, $Ar^4$ and $R_1$ in formula (VII) include those having from 6 to 16 carbon atoms, and specific examples thereof include a phenyl group, a (1- or 2-) naphthyl group, a (1-, 2- or 9-) anthryl group and a (1- or 2-)pyrenyl group. Examples of the aryl group, which may have a substituent, include a (m- or p-)chlorophenyl group, a (m- or p-)tolyl group, a (m- or p-)ethylphenyl group, a (m- or p-)propylphenyl group, a (m- or p-)butylphenyl group, a (m- or p-)methoxyphenyl group, a (3,4- or 3,5-)dimethoxyphenyl group, a (m- or p-) ethoxyphenyl group, a (m- or p-)dimethylaminophenyl group, a (2-, 3- or 4-)biphenylyl group and an (o-, m- or p-)tolyl-(m- or p-)phenyl group.

Examples of the heterocyclic group represented by $Ar^1$, $Ar^2$, $Ar^3$, $Ar^4$ and $R^1$ in formula (VII) include a (2- or 3-)benzofuryl group, a (2-, 4-, 5-, 6- or 7-)benzothiazolyl group, a (2-, 4-, 5-, 6- or 7-)benzoxazolyl group and a (1-, 2-, 3-, 4- or 9-)carbazolyl group. Examples of the heterocyclic group, which may have a substituent, include an N-ethylcarbazolyl group.

Examples of the aralkyl group represented by $Ar^1$, $Ar^2$, $Ar^3$, Ar4 and $R^1$ in formula (VII) include a benzyl group and a phenethyl group. Examples of the aralkyl group, which may have a substituent, include a methylbenzyl group, a methoxybenzyl group and 2-thienylmethyl group.

Examples of the alkyl group represented by $Ar^1$, $Ar^2$, $Ar^3$, $Ar^4$ and $R^1$ in formula (VII) include those having from 1 to 5 carbon atoms, and specific examples thereof include a methyl group, an ethyl group, a n-propyl group, an isopropyl group, a n-butyl group and an isobutyl group. Examples of the alkyl group, which may have a substituent, include a chloromethyl group, a dichloromethyl group, a trichloromethyl group and a chloroethyl group.

Examples of the fluoroalkyl group represented by $Ar^1$, $Ar^2$, $Ar^3$, $Ar^4$, $R^1$ and a in formula (VII) include a fluoroalkyl group having from 1 to 5 carbon atoms, and specific examples thereof include monofluoromethyl, difluoromethyl, trifluoromethyl and 1,1,1-trifluoroethyl.

Examples of the heterocyclic group formed with the nitrogen atom connected thereto represented by $Ar^1$, $Ar^2$, $Ar^3$ and $Ar^4$ in formula (VII) include pyrrolyl, pyrrolinyl, imidazolyl, pyrazolyl, pyridyl, pyrimidinyl, furadinyl, triazolyl and tetrazolyl. Examples of the condensed heterocyclic group formed with the nitrogen atom connected thereto include indolyl, indazolyl, quinolyl, isoquinolyl, quinoazolyl, carbazolyl and acridyl. Examples of the substituent include an alkyl group having from 1 to 5 carbon atoms (such as a methyl group, an ethyl group, a n-propyl group, an isopropyl group, a n-butyl group and an isobutyl group) and a halogen atom (such as fluorine, chlorine and bromine). Specific examples include 2,3-dihydroindolyl, 1,2,3,4-tetrahydroquinolyl, carbazolyl and 1,2,3,4-tetrahydrocarbazolyl.

Examples of the alkyl group represented by a in formula (VII) include an alkyl group having from 1 to 3 carbon atoms, and specific examples thereof include a methyl group, an ethyl group, a n-propyl group and an isopropyl group. Examples of the alkoxy group include an alkoxy group having from 1 to 3 carbon atoms, and specific examples thereof include a methoxy group, an ethoxy group, a n-propoxy group and an isopropoxy group. Examples of the dialkylamino group include a dialkylamino group having from 1 to 3 carbon atoms, and specific examples thereof include a dimethylamino group, a diethylamino group and diisopropxyamino group. The language "which may have a substituent" for a means that the group may be substituted with, for example, a halogen atom. Examples of the fluoroalkyl group include those exemplified for $Ar^1$. Only one group of a, or two or three groups of a may be substituted with the benzofuran, and in the case where two or three groups are substituted, the groups may be the same or different. Preferably, only one group of a is substituted.

As a substituent for the compound represented by formula (VII), an electron donating substituent is generally preferred.

Specific examples of the benzofuran-bishydrazone compound represented by formula (VII) of the invention are shown in Tables 20 to 23, but the compound of the invention is not construed as being limited thereto.

TABLE 20
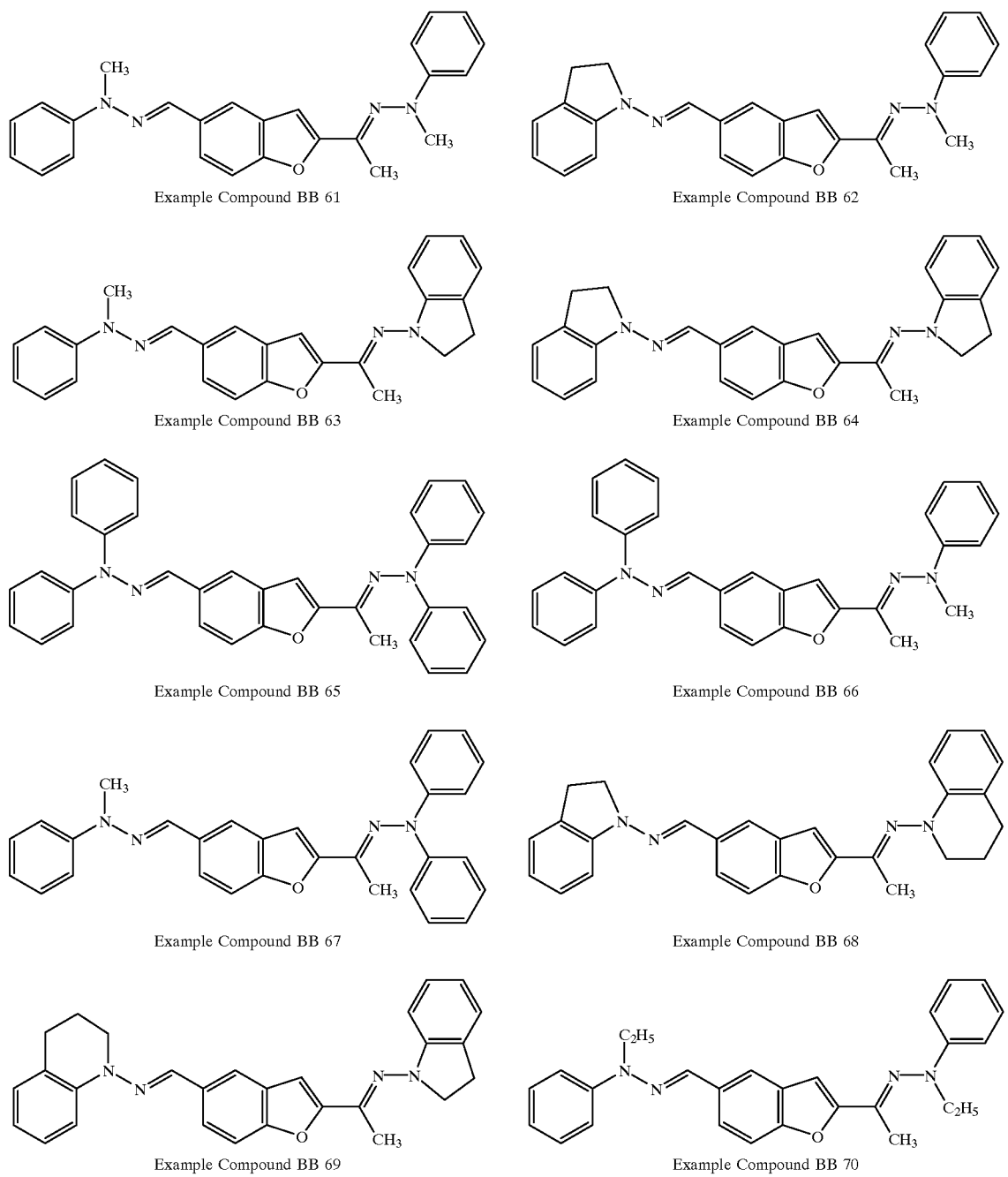

TABLE 21
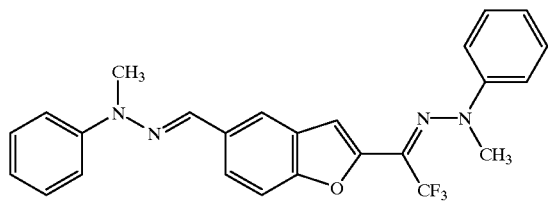
Example Compound BB 71
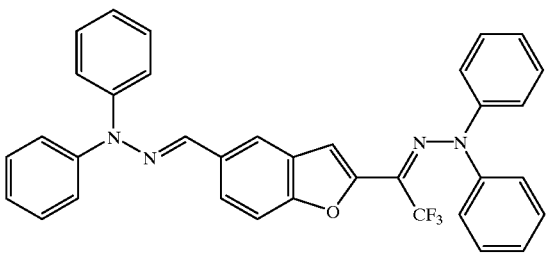
Example Compound BB 72
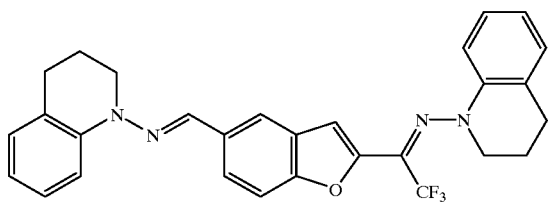
Example Compound BB 73
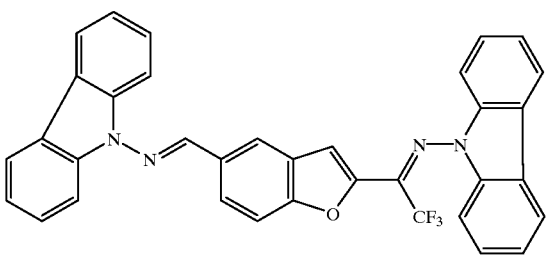
Example Compound BB 74
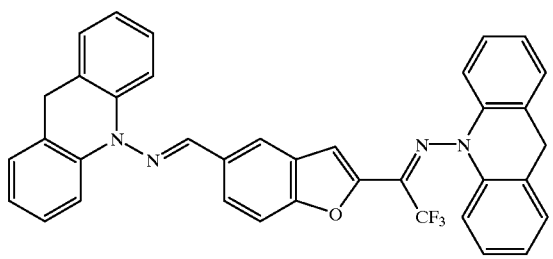
Example Compound BB 75
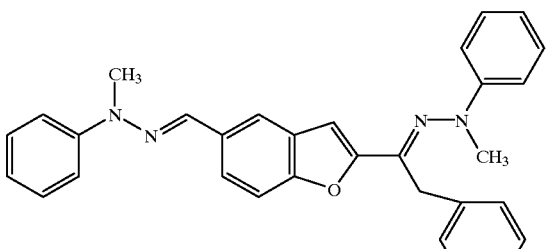
Example Compound BB 76
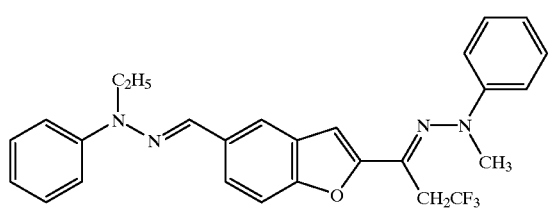
Example Compound BB 77
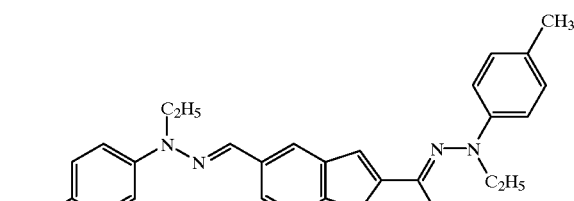
Example Compound BB 78
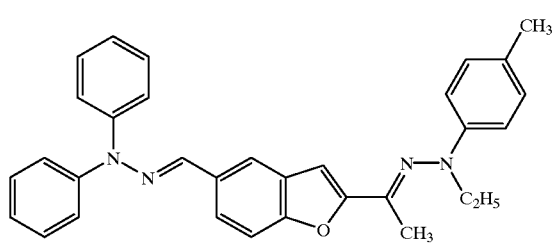
Example Compound BB 79
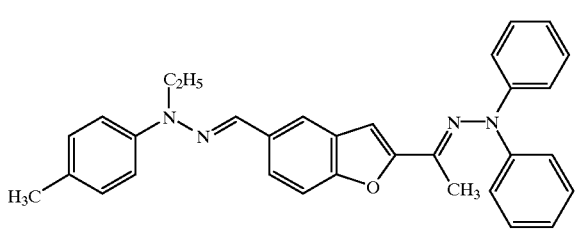
Example Compound BB 80

TABLE 22
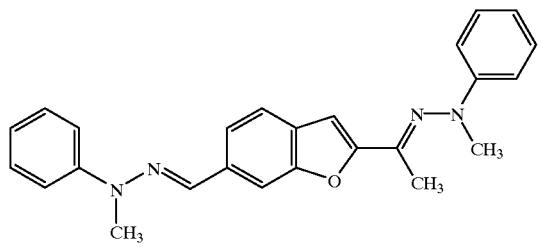
Example Compound BB 81
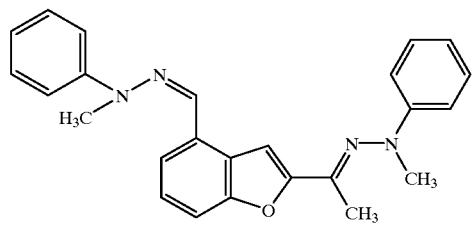
Example Compound BB 82
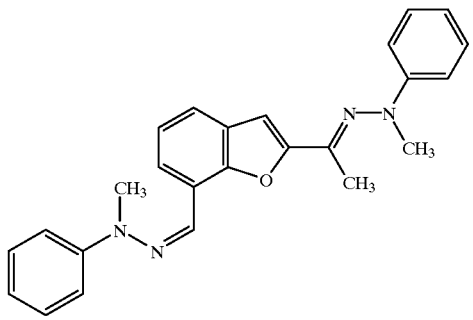
Example Compound BB 83
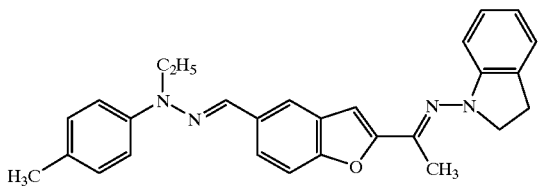
Example Compound BB 84
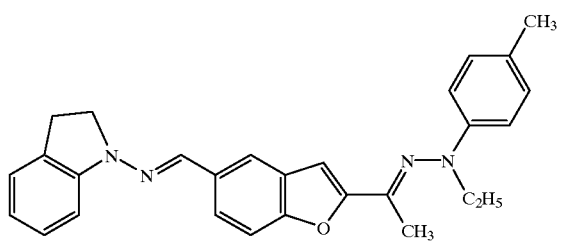
Example Compound BB 85
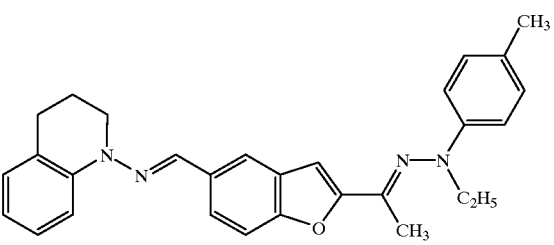
Example Compound BB 86
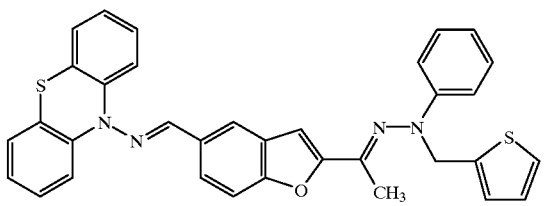
Example Compound BB 87
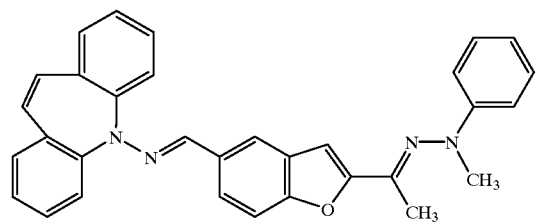
Example Compound BB 88
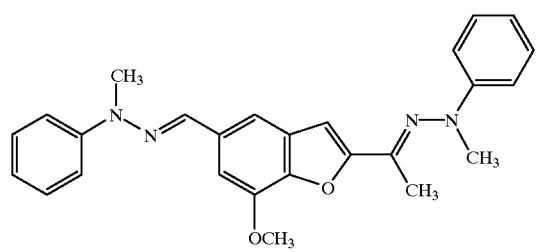
Example Compound BB 89
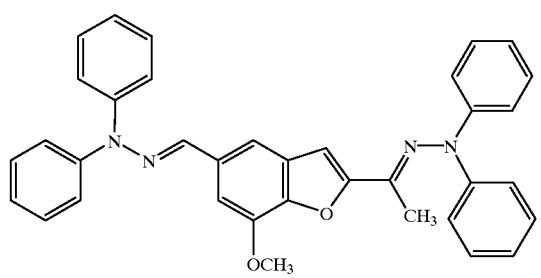
Example Compound BB 90

TABLE 23
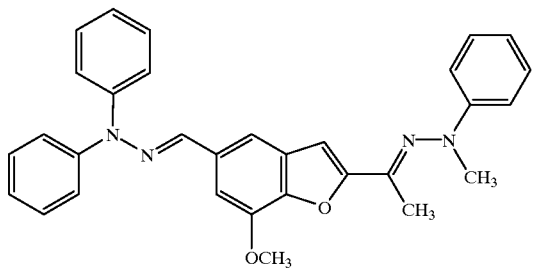
Example Compound BB 91
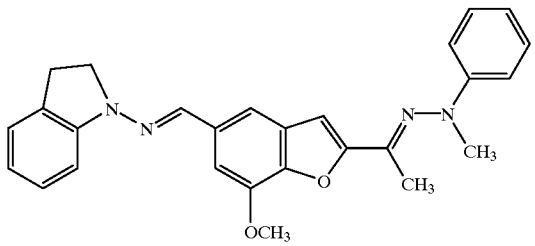
Example Compound BB 92
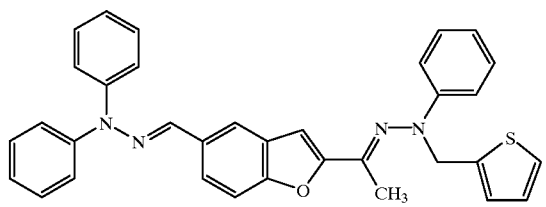
Example Compound BB 93
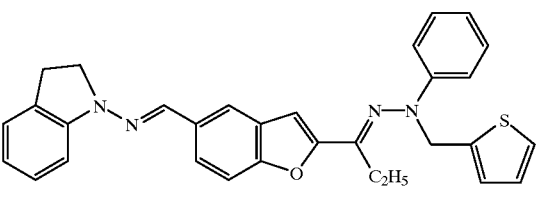
Example Compound BB 94
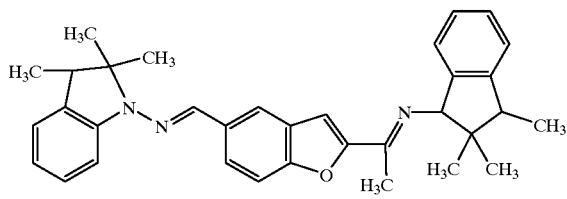
Example Compound BB 95
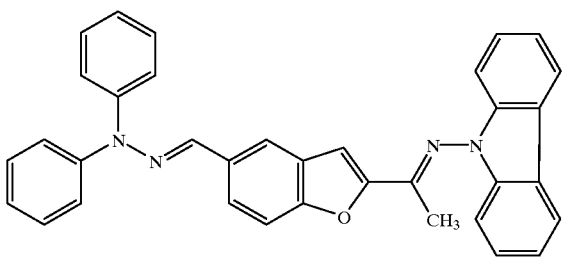
Example Compound BB 96
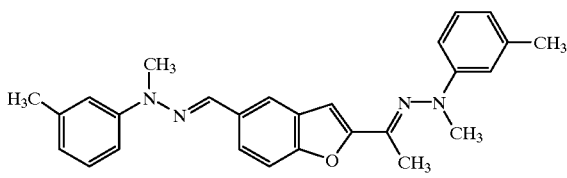
Example Compound BB 97
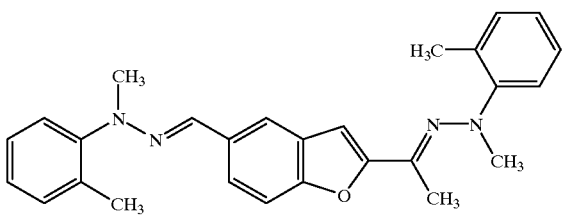
Example Compound BB 98
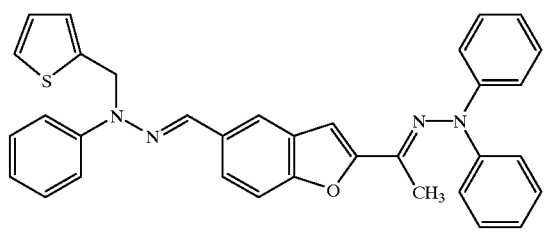
Example Compound BB 99
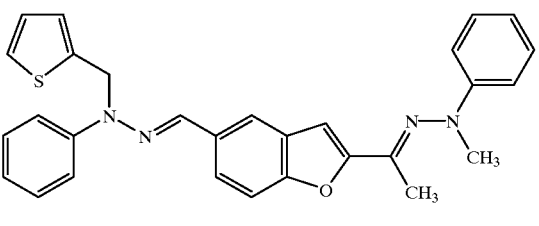
Example Compound BB 100

TABLE 23-continued

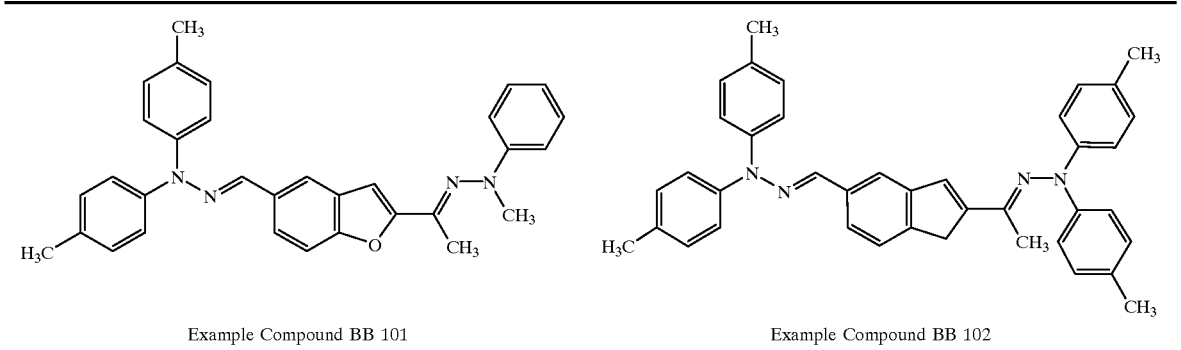

Example Compound BB 101    Example Compound BB 102

Among the benzofuran-bishydrazone compounds represented by formula (VII), those, in which one of $Ar^1$ and $Ar^2$, and $Ar^3$ and $Ar^4$ is a phenyl group, a p-methylphenyl group or a 2-thyenylmethyl group, and the other is a methyl group, an ethyl group or a phenyl group, $R^1$ is a methyl group or a trifluoromethyl group, and a is a hydrogen atom, are preferred from the standpoint of electrophotographic characteristics, cost and production.

The benzofuran-bishydrazone compound represented by formula (VII) can be synthesized by various methods. For example, it can be produced by the following method.

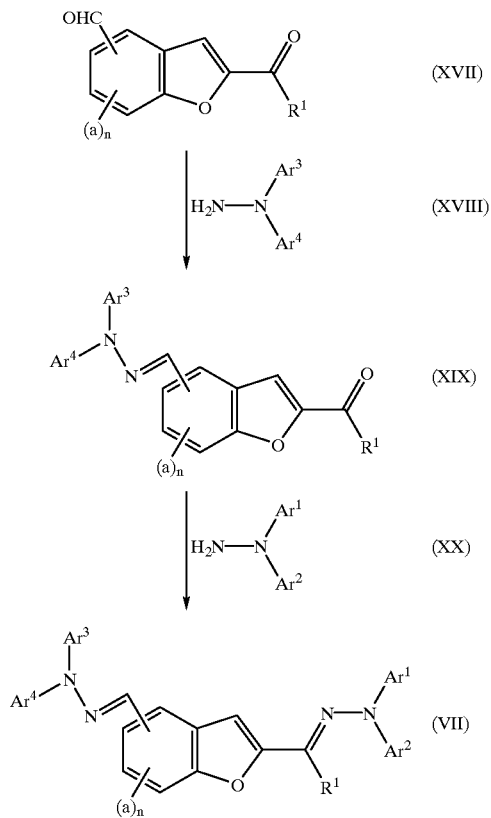

In formulae (XVII), (XVIII), (XIX), (XX) and (VII), $Ar^1$, $Ar^2$, $Ar^3$, $Ar^4$, $R^1$, a and n have the same meaning as described above. A 2-acetylformylbenzofuran compound represented by formula (XVII) (1.0 equivalent) and a hydrazine reagent represented by formula (XVIII) (0.95 to 1.00 equivalent) are heated and stirred in an organic solvent, such as ethanol, methanol, tetrahydrofuran, 1,4-dioxane and acetonitrile, to which a catalyst (0.001 to 0.01 equivalent), such as acetic acid, potassium acetate, calcium acetate and sodium acetate, is added, at about 40 to 50° C. for about 3 to 10 hours, so as to obtain a 2-acetylbenzofuran-monohydrazone compound represented by formula (XIX).

The resulting 2-acetylbenzofuran-monohydrazone compound represented by formula (XIX) (1.0 equivalent) and a hydrazine reagent represented by formula (XX) (1.00 to 1.20 equivalents) are heated and stirred in an organic solvent, such as ethanol, methanol, tetrahydrofuran, 1,4-dioxane and acetonitrile, to which a catalyst (0.001 to 0.01 equivalent), such as acetic acid, potassium acetate, calcium acetate and sodium acetate, is added, at about 40 to 80° C. for about 3 to 10 hours, so as to obtain a benzofuran-bishydrazone compound represented by formula (VII).

In the invention, the charge transporting substances other than the benzofuran-bishydrazone compound represented by formula (VII) may be used in combination in the photosensitive layer. Such other charge transporting substances are not particularly limited, and any charge transporting substance may be used as far as it can be generally used in the field of an electrophotographic photoreceptor.

The charge transporting layer contains the benzofuran-bishydrazone compound. The benzofuran-bishydrazone compound is suitably contained in an amount of from 5 to 95% by weight, preferably from 20 to 70% by weight, based on the charge transporting layer, and is suitably used in an amount of from 20 to 150% by weight, preferably from 30 to 120% by weight, based on the binder resin. In the case where a charge transporting substance other than the benzofuran-bishydrazone compound is contained in the charge transporting layer, it is sufficient that the charge transporting substances in total are contained in the amount described above. Furthermore, in the case where the binder resin is contained in the charge transporting layer, the amount of the binder resin is suitably from 5 to 95% by weight based on the charge transporting layer.

The charge transporting layer may contain various additives, such as leveling agent, e.g., dimethylpolysiloxane, an antioxidant and a sensitizer.

Examples of the charge transporting substance contained in the photosensitive layer include the benzofuran-bis-cyclic hydrazone compound represented by formula (VIII).

Examples of the heterocyclic group formed along with the nitrogen atom connected thereto represented by Y in formula (VIII) include pyrrolyl, pyrrolinyl, imidazolyl, pyrazolyl, pyridyl, pyrimidinyl, furadinyl, triazolyl and tetrazolyl. Examples of the condensed heterocyclic group formed along with the nitrogen atom connected thereto include indolyl, indazolyl, quinolyl, isoquinolyl, quinoazolyl, carbazolyl and acridyl. Examples of the substituent include an alkyl group having from 1 to 5 carbon atoms (such as a methyl group, an ethyl group, a n-propyl group, an isopropyl group, a n-butyl group and an isobutyl group) and a halogen atom (such as fluorine, chlorine, bromine and iodine). Among these, 2,3-dihydroindolyl, 1,2,3,4-tetrahydroquinolyl, carbazolyl and 1,2,3,4-tetrahydrocarbazolyl are preferred.

Examples of the alkyl group represented by a in formula (VIII) include an alkyl group having from 1 to 3 carbon atoms, and specific examples thereof include a methyl group, an ethyl group, a n-propyl group and an isopropyl group. Examples of the fluoroalkyl group include a fluoroalkyl group having from 1 to 3 carbon atoms, and specific examples thereof include monofluoromethyl, difluoromethyl, trifluoromethyl and 1,1,1-trifluoroethyl. Examples of the alkoxy group include an alkoxy group having from 1 to 3 carbon atoms, and specific examples thereof include a methoxy group, an ethoxy group, a n-propoxy group and an isopropoxy group. Examples of the dialkylamino group include a dialkylamino group having from 1 to 3 carbon atoms, and specific examples thereof include a dimethylamino group, a diethylamino group and diisopropoxyamino group. Examples of the substituent for a include a halogen atom. Only one group of a, or two or three groups of a may be substituted on the benzofuran, and in the case where two or three groups are substituted, the groups may be the same or different. Preferably, only one group of a is substituted.

As a substituent for the compound represented by formula (VIII), an electron donating substituent is generally preferred.

Specific examples of the benzofuran-bis-cyclic hydrazone compound represented by formula (VIII) of the invention are shown in Tables 24 to 27, but the compound of the invention is not construed as being limited thereto.

TABLE 24

| Example Compound | | a |
|---|---|---|
| BB | —N‿Z | |
| 111 | (indolinyl) | H |
| 112 | (1,2,3,4-tetrahydroquinolinyl) | H |

TABLE 24-continued

| Example Compound | | $(a)_n$ |
|---|---|---|
| 113 | (1,2,3,4-tetrahydrocarbazolyl) | H |
| 114 | (carbazolyl) | H |
| 115 | (2-phenylindolinyl) | H |
| 116 | (2,3,3-trimethylindolinyl, CH$_3$/CH$_3$/CH$_3$) | H |
| 117 | (2,2,3-trimethyl-1,2,3,4-tetrahydroquinolinyl, CH$_3$/CH$_3$/CH$_3$) | H |
| 118 | (3,6-dimethylcarbazolyl, CH$_3$...CH$_3$) | H |
| 119 | (indolinyl) | H |
| 120 | (indolinyl) | 7-OCH$_3$ |

TABLE 25

| Example Compound | BB —N⌒Z | a |
|---|---|---|
| 121 | indoline | 7-OCH₃ |
| 122 | indoline | 4-CH₃ |
| 123 | indoline | H |
| 124 | 1,2,3,4-tetrahydroquinoline | 5-CH₃ |
| 125 | 1,2,3,4-tetrahydroquinoline | H |
| 126 | 2,3,3-trimethylindoline | H |
| 127 | 2,2,3-trimethyl-1,2,3,4-tetrahydroquinoline | H |
| 128 | carbazole | H |
| 129 | 1,2,3,4,4a,9a-hexahydrocarbazole | H |
| 130 | 3,6-dimethylcarbazole | H |

TABLE 26

| Example Compound | BB —N⌒Z | a |
|---|---|---|
| 131 | indoline | H |
| 132 | indoline | 5-CH₃ |
| 133 | indoline | 6-OCH₃ |
| 134 | indoline | 7-OCH₃ |

TABLE 26-continued

| Example Compound | [structure] | (a)n |
|---|---|---|
| 135 | N-methyl tetrahydroquinoline | H |
| 136 | N-methyl tetrahydroquinoline | 7-OCH₃ |
| 137 | 1,2,3,3-tetramethylindoline | H |
| 138 | 1,2,2,3-tetramethyltetrahydroquinoline | H |
| 139 | 1-methyl-2-phenylindoline | H |
| 140 | N-methylcarbazole | H |

TABLE 27

| Example Compound | Z–N ring | a |
|---|---|---|
| BB | —N(ring)Z | a |

TABLE 27-continued

| Example Compound | [structure] | (a)n |
|---|---|---|
| 141 | N-methylindoline | H |
| 142 | N-methyltetrahydroquinoline | H |
| 143 | N-methylindoline | 5-CH₃ |
| 144 | N-methylindoline | 5-OCH₃ |
| 145 | N-methyltetrahydroquinoline | 5-CH₃ |
| 146 | 1,2,3,3-tetramethylindoline | H |
| 147 | 1,2,2,3-tetramethyltetrahydroquinoline | H |
| 148 | N-methylcarbazole | H |

TABLE 27-continued

| Example Compound | | |
|---|---|---|
| 149 | (carbazole-tetrahydro structure) | H |
| 150 | (carbazole structure) | H |

The benzofuran-bis-cyclic hydrazone compound represented by formula (VIII) can be synthesized by various methods. For example, it can be produced by the following method.

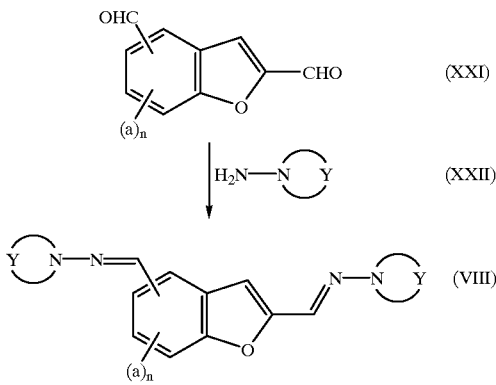

In formulae (XXI), (XXII) and (VIII), Y, a and n have the same meaning as described above.

A 2-acetylformylbenzofuran compound represented by formula (XXI) (1.0 equivalent) and a hydrazine reagent represented by formula (XXII) (2.0 to 2.3 equivalents) are heated and stirred in an organic solvent, such as ethanol, methanol, tetrahydrofuran, 1,4-dioxane and acetonitrile, to which a catalyst (0.001 to 0.01 equivalent), such as acetic acid, potassium acetate, calcium acetate and sodium acetate, is added, at about 70 to 80° C. for about 3 to 10 hours, so as to obtain a benzofuran-bis-cyclic hydrazone compound represented by formula (VIII).

In the invention, charge transporting substances other than the benzofuran-bis-cyclic bishydrazone compound represented by formula (VIII) may be used in combination in the photosensitive layer. Such other charge transporting substances are not particularly limited, and any charge transporting substance may be used as far as it can be generally used in the field of an electrophotographic photoreceptor.

The charge transporting layer contains the benzofuran-bis-cyclic hydrazone compound. The benzofuran-bis-cyclic hydrazone compound is suitably contained in an amount of from 5 to 95% by weight, and preferably from 20 to 70% by weight, based on the charge transporting layer, and is suitably used in an amount of from 20 to 150% by weight, and preferably from 30 to 120% by weight, based on the binder resin. In the case where a charge transporting substance other than the benzofuran-bis-cyclic hydrazone compound is contained in the charge transporting layer, it is sufficient that the charge transporting substances in total are contained in the amount described above. Furthermore, in the case where the binder resin is contained in the charge transporting layer, the amount of the binder resin is suitably from 5 to 95% by weight based on the charge transporting layer.

The charge transporting layer may contain various additives, such as leveling agent, e.g., polydimethylsiloxane, an antioxidant and a sensitizer.

Example

The invention will be specifically described below with reference to the examples, but the invention is not construed as being limited to the examples as far as they are not apart from the gist thereof.

Production Example 1

40 g of o-phthalodinitrile, 18 g of titanium tetrachloride and 500 ml of α-chloronaphthalene were heated and stirred under a nitrogen atmosphere at 200 to 250° C. for 3 hours to react them, and after allowed to be cooled to 100 to 130° C., the reaction product was filtrated while hot and washed with 200 ml of α-chloronaphthalene heated to 100° C., so as to obtain a crude product of dichlorotitanium phthalocyanine. The crude product was washed successively with 200 ml of α-chloronaphthalene and 200 ml of methanol at room temperature, and was washed by dispersing in 500 ml of hot methanol for 1 hour. A crude product obtained by filtration was repeatedly washed by dispersing in 500 ml of hot water until the pH becomes 6 to 7, and oxotitanylphthalocyanine crystal was obtained by drying.

Figure 5:
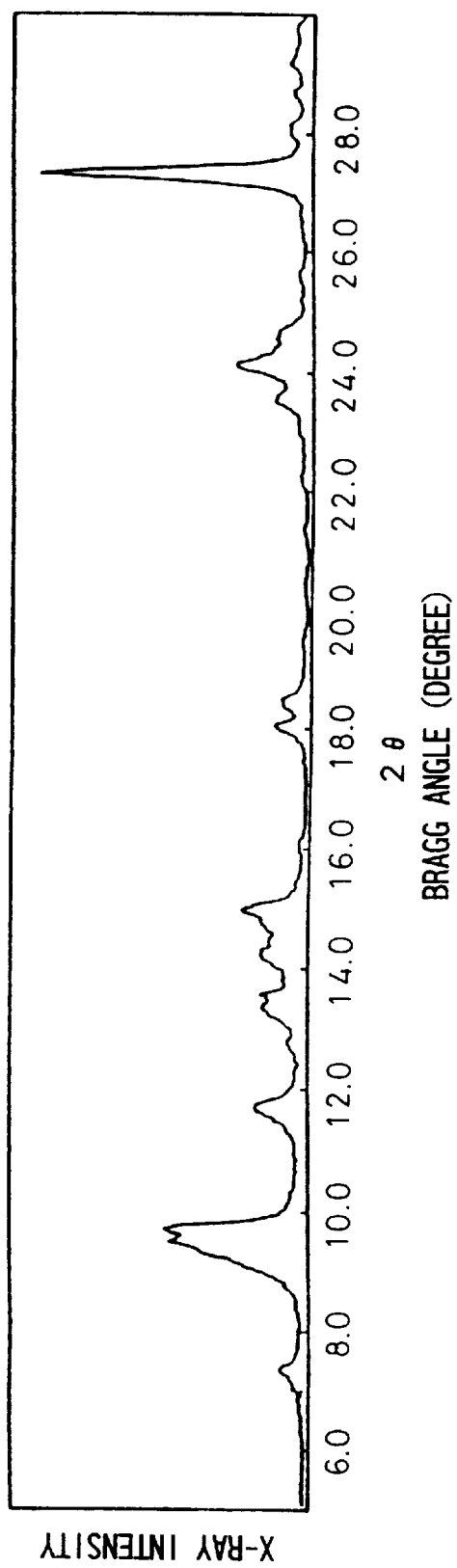
FIG. 5 is an X-ray diffraction spectrum of an intermediate crystal of oxophthalocyanine obtained during the production of Production Example 1 of the invention.

The crystal exhibited an X-ray diffraction spectrum shown in FIG. 5. It was understood that the crystal was crystalline oxotitanylphthalocyanine called Y type disclosed in Japanese Unexamined Patent Publication JP-A-2-8256 and JP-A-7-271073 having, in the X-ray diffraction spectrum of CuKα characteristics X-ray (wavelength: 1.5418 Å), the maximum peak at a Bragg angle (2θ±0.2°) of 27.3° and peaks at 7.4°, 9.6° and 27.3°.

The measurement conditions of the X-ray diffraction spectrum were as follows:

| | |
|---|---|
| X-ray source | CuKα = 1.54050 Å |
| Voltage | 30 to 40 kV |
| Electric current | 50 MÅ |
| Start angle | 5.0° |
| Stop angle | 30.0° |
| Step angle | 0.01 to 0.02° |
| Measurement time | 2.0 to 0.5° per minute |
| Measurement method | θ/2θ scanning method |

The measurement conditions of the X-ray diffraction spectra hereinafter were the same.

The crystal was mixed with methyl ethyl ketone and subjected to a milling treatment along with glass beads having a diameter of 2 mm in a paint conditioner apparatus (produced by Redlevel Corp.), followed by washing with methanol and drying, to obtain crystal of the invention.

Figure 6:
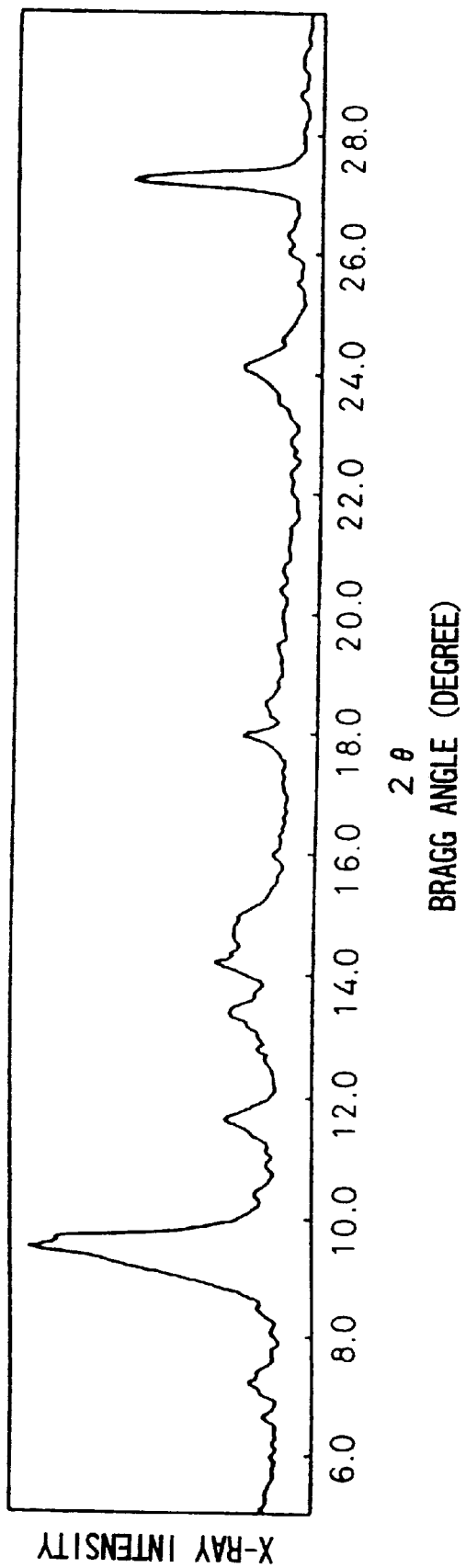
FIG. 6 is an X-ray diffraction spectrum of oxophthalocyanine obtained in Production Example 1 of the invention.

The crystal exhibited an X-ray diffraction spectrum shown in FIG. 6. It was understood that the crystal was crystalline oxotitanylphthalocyanine of the invention having, in the X-ray diffraction spectrum of CuKα characteristics X-ray (wavelength: 1.5418 Å), the maximum peak as a peak bundle formed by overlapping peaks at Bragg angles (2θ±0.2°) of 9.4° and 9.6° and peaks at 7.3°, 9.4°, 9.6°, 11.6°, 13.3°, 17.9°, 24.1° and 27.2°.

Production Example 2

The oxotitanylphthalocyanine intermediate crystal of Y type obtained during Production Example 1, polyvinyl butyral (Essrec BL-1 produced by Sekisui Chemical Co., Ltd.) and a vinyl chloride-vinyl acetate copolymer were mixed with methyl ethyl ketone, and subjected to a milling treatment along with glass beads having a diameter of 2 mm in a paint conditioner apparatus, followed by drying, to obtain crystal of the invention.

Figure 7:
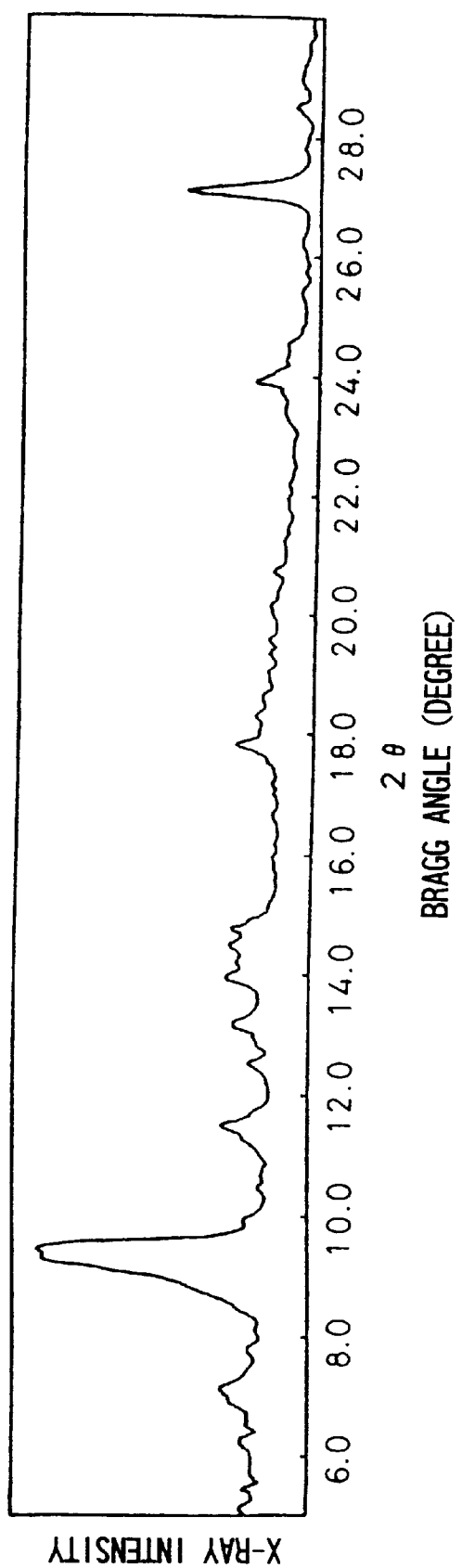
FIG. 7 is an X-ray diffraction spectrum of oxophthalocyanine obtained in Production Example 2 of the invention.

The crystal exhibited an X-ray diffraction spectrum shown in FIG. 7. It was understood that the crystal was crystalline oxotitanylphthalocyanine of the invention having, in the X-ray diffraction spectrum, the maximum peak as a peak bundle formed by overlapping peaks at Bragg angles (2θ±0.2°) of 9.4° and 9.6°, peaks at 7.3°, 9.4°, 9.6°, 11.6°, 13.3°, 17.9°, 24.1° and 27.2°, and an aggregate of peaks at from 14.1° to 14.9°, which could not be separated to individual peaks, having a trapezoidal shape by comprising plural peaks having the similar intensity.

Production Example 3

The oxotitanylphthalocyanine intermediate crystal of Y type obtained during Production Example 1, polyvinyl butyral (Essrec BL-1 produced by Sekisui Chemical Co., Ltd.) and a vinyl chloride-vinyl acetate copolymer (Essrec M-1 produced by Sekisui Chemical Co., Ltd.) were mixed with methyl ethyl ketone, and subjected to a milling treatment along with glass beads having a diameter of 2 mm in a paint conditioner apparatus, followed by drying, to obtain crystal of the invention.

Figure 8:
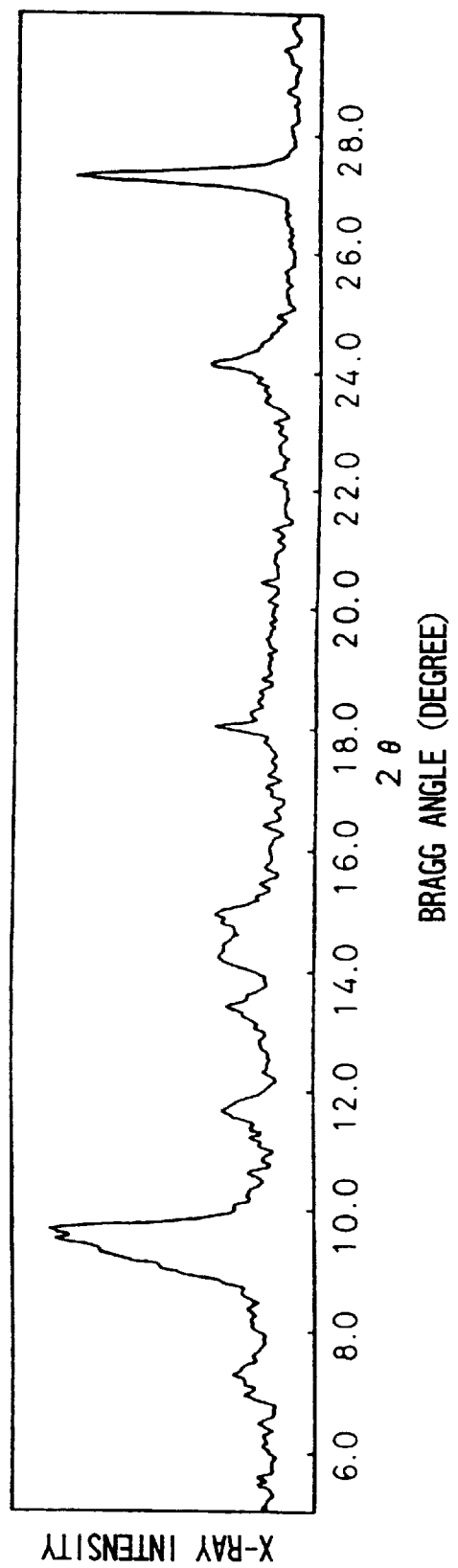
FIG. 8 is an X-ray diffraction spectrum of oxophthalocyanine obtained in Production Example 3 of the invention.

The crystal exhibited an X-ray diffraction spectrum shown in FIG. 8. It was understood that the crystal was crystalline oxotitanylphthalocyanine of the invention having, in the X-ray diffraction spectrum, the maximum peak as a peak bundle formed by overlapping peaks at Bragg angles (2θ±0.2°) of 9.4° and 9.6°, peaks at 7.3°, 9.4°, 9.6°, 11.6°, 13.3°, 17.9°, 24.1° and 27.2°, an aggregate of peaks at from 14.1° to 14.9°, which could not be separated to individual peaks, having a trapezoidal shape by comprising plural peaks having the similar intensity, and a shoulder peak at 9.0° having an intensity of about half of the intensity of the peak bundle formed by overlapping peaks at 9.4° and 9.6°.

Example 1

A polyester film having a vapor deposition aluminum film was used as a conductive support. Titanium oxide and copolymer nylon (CM8000 produced by Toray Corp.) were dissolved in a mixed solvent comprising methyl alcohol and dichloroethane to prepare a coating composition for forming an interlayer, which was then coated on the conductive support, followed by drying, to form an interlayer having a film thickness of 1 μm.

1 part by weight of the crystalline oxotitanylphthalocyanine of the invention produced in Production Example 1 and 1 part by weight of a polyvinyl butyral resin (Essrec BL-1 produced by Sekisui Chemical Co., Ltd.) were mixed with 70 parts by weight of methyl ethyl ketone, and subjected to a dispersion treatment along with glass beads having a diameter of 2 mm in the same paint conditioner apparatus (produced by Redlevel Corp.) to prepare a coating composition for a charge generating layer, which was then coated on the interlayer, followed by drying, to form a charge generating layer having a film thickness of 0.4 μm.

An enamine compound represented by formula (XXIII) and a polycarbonate resin (PCZ-200 produced by Mitsubishi Gas Chemical Co., Ltd.) were mixed in a weight ratio of 1/1, and a solution thereof of 15% by weight was prepared using tetrahydrofuran as a solvent. The solution was dip coated on the charge generating layer and dried to form a charge transporting layer having a film thickness of 20 μm. Thus, a function separated type photoreceptor sample 1 comprising the charge generating layer and the charge transporting layer was obtained.

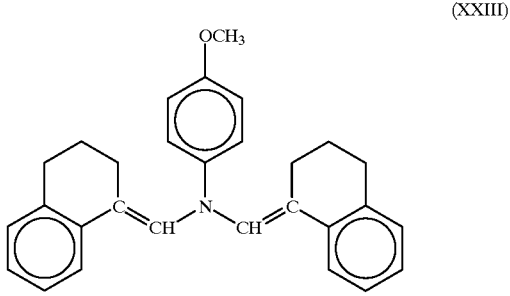

(XXIII)

Example 2

A polyester film having a vapor deposition aluminum film was used as a conductive support, and the coating composition for forming a charge generating layer produced in Example 1 was directly coated on the support, followed by drying, to form a charge generating layer having a film thickness of 0.4 μm.

A coating composition for forming a charge transporting layer using a butadiene series compound represented by formula (XXIV) as a charge transporting substance was dip coated on the charge generating layer, followed by drying, in the same manner as in Example 1, to prepare a function separated type photoreceptor sample 2.

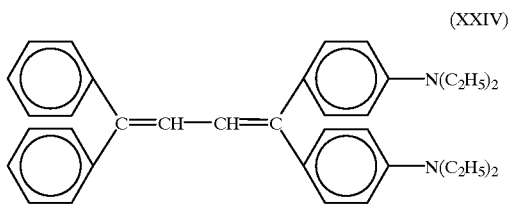

(XXIV)

Example 3

A function separated type photoreceptor sample 3 was obtained in the same manner as in Example 1 except that a copolymer resin of vinyl chloride and vinyl acetate (Essrec M-1 produced by Sekisui Chemical Co., Ltd.) was used as the resin of the charge generating layer, and hydrazone represented by formula (XXV) was used as the material of the charge transporting layer.

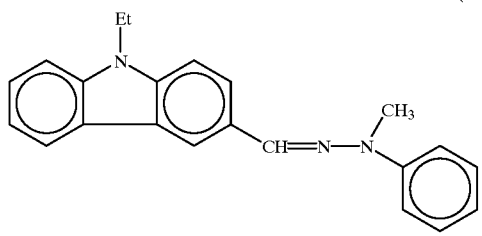

(XXV)

Example 4

A polyester film having a vapor deposition aluminum film was used as a conductive support. Titanium oxide and copolymer nylon (CM8000 produced by Toray Corp.) were dissolved in a mixed solvent comprising methyl alcohol and dichloroethane to prepare a coating composition for forming an interlayer, which was then coated on the conductive support, followed by drying, to form an interlayer having a film thickness of 1 $\mu$m.

The coating composition for forming a charge generating layer .containing crystalline oxotitanylphthalocyanine of the invention obtained in Production Example 2 was coated on the interlayer, followed by drying, to form a charge generating layer having a film thickness of 0.4 $\mu$m.

An enamine compound represented by formula (XXIII) and a polycarbonate resin (PCZ-200 produced by Mitsubishi Gas Chemical Co., Ltd.) were mixed in a ratio of 1/1, and a solution thereof of 15% by weight was prepared using dichloromethane as a solvent. The solution was dip coated on the charge generating layer and dried to form a charge transporting layer having a film thickness of 25 $\mu$m. Thus, a function separated type photoreceptor sample 4 comprising the charge generating layer and the charge transporting layer was obtained.

Example 5

A function separated type photoreceptor sample 5 having the same constitution as in Example 4 was obtained by using the butadiene series compound represented by formula (XXIV) as the material of the chargetransporting layer.

Example 6

A polyester film having a vapor deposition aluminum film was used as a conductive support. Titanium oxide and copolymer nylon (CM8000 produced by Toray Corp.) were dissolved in a mixed solvent comprising methyl alcohol and dichloroethane to prepare a coating composition for forming an interlayer, which was then coated on the conductive support, followed by drying, to form an interlayer having a film thickness of 1 $\mu$m.

The coating composition for forming a charge generating layer containing crystalline oxotitanylphthalocyanine of the invention obtained in Production Example 3 was coated on the interlayer, followed by drying, to form a charge generating layer having a film thickness of 0.4 $\mu$m.

An enamine compound represented by formula (XXIII) and a polycarbonate resin (PCZ-200 produced by Mitsubishi Gas Chemical Co., Ltd.) were mixed in a weight ratio of 1/1, and a solution thereof of 15% by weight was prepared using dichloromethane as a solvent. The solution was dip coated on the charge generating layer and dried to form a charge transporting layer having a film thickness of 25 $\mu$m. Thus, a function separated type photoreceptor sample 6 comprising the charge generating layer and the charge transporting layer was obtained.

Example 7

A function separated type photoreceptor sample 7 having the same constitution as in Example 6 was obtained by using the hydrazone series compound represented by formula (XXV) as the material of the charge transporting layer.

Example 8

A polyester film having a vapor deposition aluminum film was used as a conductive support. Titanium oxide and copolymer nylon (CM8000 produced by Toray Corp.) were dissolved in a mixed solvent comprising methyl alcohol and dichloroethane to prepare a coating composition for forming an interlayer, which was then coated on the conductive support, followed by drying, to form an interlayer having a film thickness of 1 $\mu$m.

1 part by weight of the crystalline oxotitanylphthalocyanine of the invention obtained in Production Example 1 and 10 parts by weight of the enamine compound represented by formula (XXIII) were mixed with 10 parts by weight of a polycarbonate resin (PCZ-200 produced by Mitsubishi Gas Chemical Co., Ltd.), and a solution of 15% by weight was produced, which was then subjected to a dispersion treatment along with glass beads having a diameter of 2 mm in a paint conditioner apparatus. The solution thus subjected to the dispersion treatment was coated on the interlayer, followed by drying, to form a photosensitive layer having a film thickness of 25 $\mu$m. Thus, a single-layer type photoreceptor sample 8 comprising the charge generating layer having the charge transporting material dispersed therein was obtained.

Comparative Example 1

A function separated type photoreceptor sample 9 was obtained in the same manner as in Example 1 except that the oxotitanylphthalocyanine having the X-ray diffraction pattern shown in FIG. 5 obtained in Production Example 1 was used.

Comparative Example 2

A function separated type photoreceptor sample 10 was obtained in the same manner as in Example 2 except that the oxotitanylphthalocyanine having the X-ray diffraction pattern shown in FIG. 5 obtained in Production Example 1 was used.

The photoreceptor samples produced in the foregoing Examples and Comparative Examples are summarized in Table 28 below.

TABLE 28

| | | Charge generating substance | Charge transporting substance |
|---|---|---|---|
| Sample 1 | Example 1 | Production Example 1 | Example compound XXIII |
| Sample 2 | Example 2 | Production Example 1 | Example compound XXIV |
| Sample 3 | Example 3 | Production Example 1 | Example compound XXV |
| Sample 4 | Example 4 | Production Example 2 | Example compound XXIII |

TABLE 28-continued

|  |  | Charge generating substance | Charge transporting substance |
|---|---|---|---|
| Sample 5 | Example 5 | Production Example 2 | Example compound XXIV |
| Sample 6 | Example 6 | Production Example 3 | Example compound XXIII |
| Sample 7 | Example 7 | Production Example 3 | Example compound XXV |
| Sample 8 | Example 8 | Production Example 1 | Example compound XXIII |
| Sample 9 | Comparative Example 1 | Intermediate in Production Example 1 | Example compound XXIII |
| Sample 10 | Comparative Example 2 | Intermediate in Production Example 1 | Example compound XXIV |

Evaluation

The electrophotographic photoreceptors thus produced were evaluated for electrophotographic characteristics by a testing apparatus for electrostatic recording paper (EPA-8200 produced by Kawaguchi Electric Works Co., Ltd.). The measurement conditions were an applied voltage of −6 kV and static of No. 3, and an exposure amount $E_{1/2}$ ($\mu$J/cm$^2$) of monochrome light of 780 nm (radiation intensity: 2 $\mu$W/cm$^2$) isolated with an interference filter required for attenuating from −500 V to −250 V and an initial potential $V_0$ (−V) were measured. The single-layer type electrophotographic photoreceptors were measured by using the same testing apparatus for electrostatic recording paper under the conditions where the applied voltage was +6 kV and static was No. 3, and an exposure amount $E_{1/2}$ ($\mu$J/cm$^2$) of monochrome light of 780 nm (radiation intensity: 10 $\mu$W/cm$^2$) isolated with an interference filter required for attenuating from +500 V to +250 V and an initial potential $V_0$ (+V) were measured.

A commercially available digital duplicator (AR5130 produced by Sharp Corp.) was modified, and the respective photoreceptor samples were installed therein. Continuous blank copy was conducted for 30,000 times (non-copy aging), and the charging potential and $E_{1/2}$ were measured by using the testing apparatus for electrostatic recording paper before and after the continuous blank copy. Furthermore, continuous blank copy was conducted for 30,000 times under a high temperature and high humidity condition (35° C., 85%), and the residual potential was measured before and after the continuous blank copy. The results obtained are shown in Table 29.

TABLE 29

|  | Charging potential (V) | | Half-value exposure amount ($\mu$J/cm$^2$) | | Residual potential (V) | |
|---|---|---|---|---|---|---|
|  | Initial | After 30,000 times | Initial | After repetition | Initial | After 30,000 times |
| Example 1 | −502 | −494 | 0.05 | 0.07 | −15 | −29 |
| Example 2 | −511 | −492 | 0.10 | 0.13 | −21 | −38 |
| Example 3 | −500 | −485 | 0.07 | 0.10 | −18 | −32 |
| Example 4 | −503 | −494 | 0.05 | 0.08 | −14 | −24 |
| Example 5 | −510 | −495 | 0.07 | 0.10 | −18 | −28 |
| Example 6 | −501 | −493 | 0.04 | 0.06 | −11 | −15 |
| Example 7 | −498 | −490 | 0.07 | 0.09 | −13 | −20 |
| Example 8 | +510 | +502 | 0.40 | 0.55 | +25 | +45 |
| Comparative Example 1 | −498 | −450 | 0.18 | 0.42 | −18 | −53 |
| Comparative Example 2 | −478 | −420 | 0.22 | 0.44 | −21 | −63 |

As shown in Table 29, it has been confirmed as follows: The samples of Examples 1 to 8 had potential deterioration of the charging potential after the durability test (30,000 times) that was sufficiently smaller than the conventional samples of Comparative Examples 1 and 2; had an initial sensitivity (half-value exposure amount) that was sufficiently higher than Comparative Examples; and exhibited increase in residual potential after the durability test (30,000 times) that is sufficiently smaller than the conventional samples of Comparative Examples 1 and 2. Furthermore, the characteristics of the samples of the invention have been confirmed that the increase in residual potential after the durability test (30,000 times) under a high temperature and high humidity condition was sufficiently smaller than the conventional samples of Comparative Examples 1 and 2.

The evaluation of solvent stability will be described.

Solutions obtained by subjecting the five kinds of oxotitanylphthalocyanine obtained in Examples 1, 3, 4 and 6, and Comparative Example 1 to a dispersion treatment were stored at room temperature or in a refrigerator (5° C.), and the change in crystal form was observed. The results obtained are shown in Table 30 below.

TABLE 30

Figure 9:
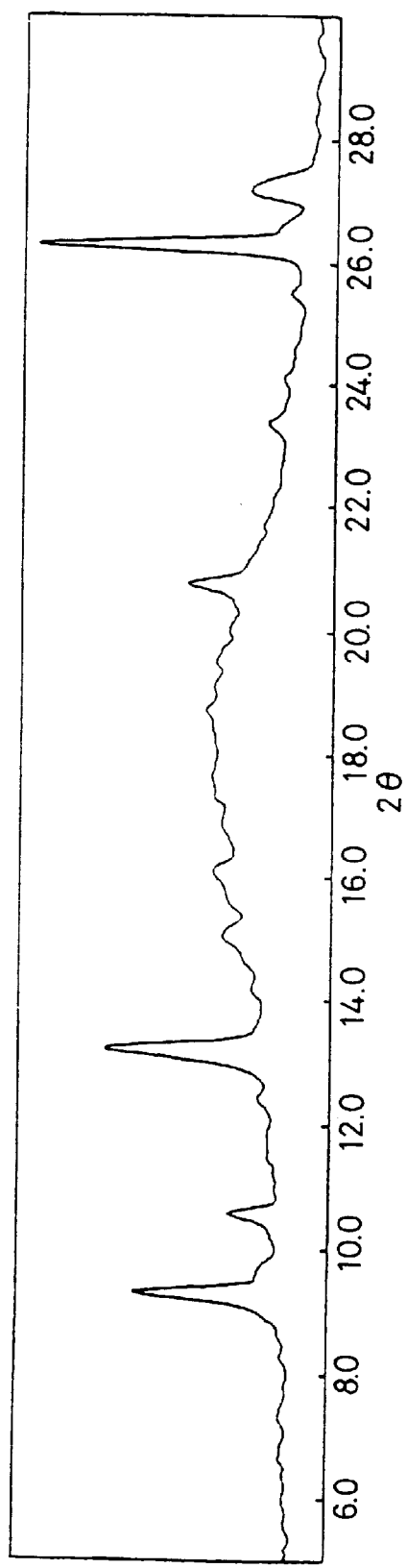
FIG. 9 is an X-ray diffraction spectrum of a solution obtained by dispersion treatment of an intermediate crystal of oxophthalocyanine obtained during the production of Production Example 1 of the invention after storage at room temperature for 1 month.
Figure 10:
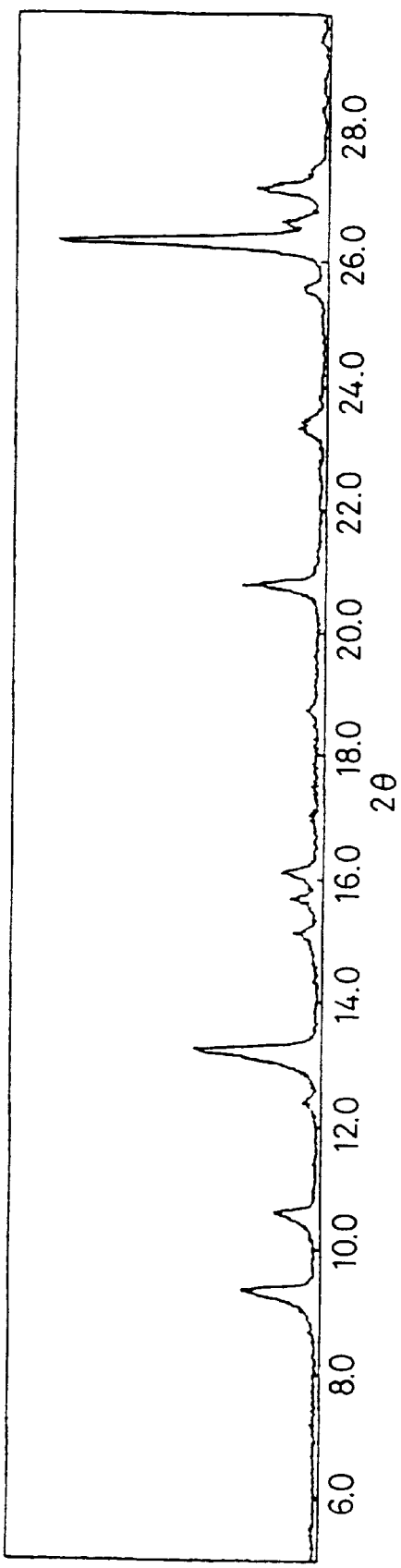
FIG. 10 is an X-ray diffraction spectrum of a solution obtained by dispersion treatment of an intermediate crystal of oxophthalocyanine obtained during the production of Production Example 1 of the invention after storage at room temperature for 2 months.

|  | Initial | After 1 month | | After 2 months | | After 3 months | |
|---|---|---|---|---|---|---|---|
|  |  | Room temperature | Refrigerator | Room temperature | Refrigerator | Room temperature | Refrigerator |
| Example 1 | FIG. 6 | FIG. 6 | FIG. 6 | FIG. 6 | FIG. 6 | FIG. 6 | FIG. 6 |
| Example 3 | FIG. 6 | FIG. 6 | FIG. 6 | FIG. 6 | FIG. 6 | FIG. 6 | FIG. 6 |
| Example 4 | FIG. 7 | FIG. 7 | FIG. 7 | FIG. 7 | FIG. 7 | FIG. 7 | FIG. 7 |
| Example 6 | FIG. 8 | FIG. 8 | FIG. 8 | FIG. 8 | FIG. 8 | FIG. 8 | FIG. 8 |
| Comparative Example 1 | FIG. 5 | FIG. 9 | FIG. 5 | FIG. 10 | FIG. 9 | FIG. 10 | FIG. 10 |

As shown in Table 30, no change in crystal form was observed in the solutions obtained by subjecting oxotitanylphthalocyanine of Examples 1, 3, 4 and 6 to a dispersion treatment stored at room temperature and in a refrigerator. However, in the conventional sample of Comparative Example 1, in the case of storage at room temperature, it was transformed into an A type crystal having the maximum peak at a Bragg angle of 26.3° after 1 month (FIG. 9), and was completely transformed into A type after 2 months (FIG. 10). In the case of storage in a refrigerator, no change was observed after 1 month (FIG. 9), but change of crystal form into A type was observed after 2 months (FIG. 10).

Examples 11 to 18 and Comparative Examples 11 and 12, in which the oxotitanylphthalocyanine and a bisamine compound are used, will be described below.

Example 11

On a conductive support 1 comprising a polyester film having aluminum vapor deposited thereon, a coating composition for an interlayer obtained by dissolving titanium oxide and a copolymer nylon (CM8000 produced by Toray Corp.) in a mixed solvent comprising methyl alcohol and dichloroethane was coated and dried to form an interlayer 7 having a film thickness of 1 μm.

1 part by weight of the oxotitanylphthalocyanine obtained in Production Example 1 (charge generating substance 2) and 1 part by weight of polybutyral (binder resin) (Essrec BL-1 produced by Sekisui Chemical Co., Ltd.) were mixed with 70 parts by weight of methyl ethyl ketone, and subjected to a dispersion treatment along with glass beads having a diameter of 2 mm in a paint conditioner apparatus (produced by Redlevel Corp.) to produce a coating composition for a charge generating layer. The coating composition was coated on the interlayer 7, followed by drying, to form a charge generating layer 5 having a film thickness of 0.4 μm.

The example compound BA1 (charge transporting substance 3) and polycarbonate (binder resin) (PCZ-200 produced by Mitsubishi Gas Chemical Co., Ltd.) were mixed in a ratio of 1/1, and a coating composition for a charge transporting layer of 15% by weight was produced by using dichloromethane as a solvent. The coating composition was coated on the charge generating layer 5, followed by drying, to form a charge transporting layer 6 having a film thickness of 20 μm. Thus, a function separated type photoreceptor 8b having a photosensitive layer 4a having a laminated structure comprising the interlayer 7, the charge generating layer 5 and the charge transporting layer 6 was obtained.

Examples 12 to 15

Function separated type photoreceptors 8b were produced in the same manner as in Example 11 except that the example compounds BA10, BA13, BA24 and BA40 were used as the charge transporting substance 3 instead of the example compound BA1.

Example 16

A function separated type photoreceptor 8b was produced in the same manner as in Example 11 except that the oxotitanylphthalocyanine obtained in Production Example 2 was used as the charge generating substance 2 instead of the oxotitanylphthalocyanine obtained in Production Example 1.

Example 17

A function separated type photoreceptor 8b was produced in the same manner as in Example 11 except that the oxotitanylphthalocyanine obtained in Production Example 3 was used as the charge generating substance 2 instead of the oxotitanylphthalocyanine obtained in Production Example 1.

Example 18

An interlayer 7 was formed on a conductive support 1 in the same manner as in Example 11. 1 part by weight of the oxotitanylphthalocyanine obtained in Production Example 1 (charge generating substance 2) and 10 parts by weight of the example compound BA4 (charge transporting substance 3) were mixed with 10 parts by weight of polycarbonate (binder resin) (PCZ-200 produced by Mitsubishi Gas Chemical Co., Ltd.), and dissolved in dichloromethane as a solvent, to prepare a coating composition of 18% by weight, which was then subjected to a dispersion treatment along with glass beads having a diameter of 2 mm in the paint conditioner apparatus. The resulting coating composition was coated on the interlayer 7, followed by drying, to form a photosensitive layer 4b having a film thickness of 20 μm. Thus, a single-layer type photoreceptor 8d having the photosensitive layer 4b containing the charge generating substance 2 and the charge transporting substance 3 was obtained.

Comparative Example 11

A function separated type photoreceptor was obtained in the same manner as in Example 11 except that the intermediate crystal of oxotitanylphthalocyanine obtained during Production Example 1 was used instead of the oxotitanylphthalocyanine used in Example 11.

Comparative Example 12

A function separated type photoreceptor was obtained in the same manner as in Example 11 except that a charge transporting substance represented by formula (XXVI) was used instead of the charge transporting substance used in Example 11.

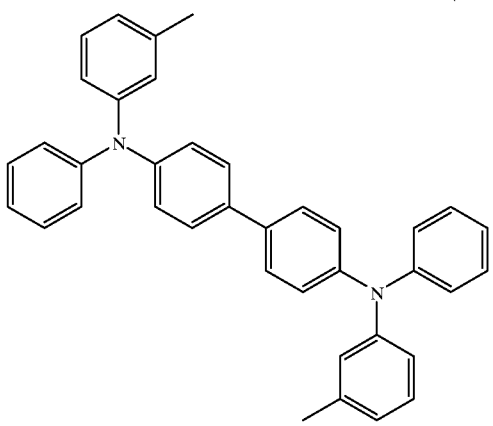

(XXVI)

The photoreceptors produced in Examples 11 to 18 and Comparative Examples 11 and 12 were evaluated in the following manner. The function separated type photoreceptors were evaluated for electrophotographic characteristics by using a testing apparatus for electrostatic recording paper (EPA-8200 produced by Kawaguchi Electric Works Co., Ltd.). The measurement conditions were an applied voltage of −6 kV and static of No. 3, and a half-value exposure amount $E_{1/2}$ ($\mu J/cm^2$) of monochrome light of 780 nm (radiation intensity: 2 $\mu W/cm^2$) isolated with an interference filter required for attenuating from −500 V to −250 V and an initial potential $V_0$ (−V) were measured. The single-layer type photoreceptors were measured by using the same testing apparatus for electrostatic recording paper. The measurement conditions were an applied voltage of +6 kV and static of No. 3, and a half-value exposure amount $E_{1/2}$ ($\mu J/cm^2$) of monochrome light of 780 nm (radiation intensity: 10 $\mu W/cm^2$) isolated with an interference filter required for attenuating from +500 V to +250 V and an initial potential $V_0$ (+V) were measured.

A commercially available digital duplicator (AR5130 produced by Sharp Corp.) was modified, and the photoreceptors of Examples 11 to 18 and Comparative Examples 11 and 12 were installed therein. A durability test by continuous blank copy in 30,000 times was conducted, and the charging potential and the half-value exposure amount $E_{1/2}$ were measured by using the testing apparatus for electrostatic recording paper before and after the durability test. Furthermore, a durability test by continuous blank copy in 30,000 times was conducted under a high temperature and high humidity condition (35° C., 85%), and the residual potential Vr was measured before and after the durability test. The results obtained are shown in Table 31.

TABLE 31

| Example | Charging potential (V) Initial | Charging potential (V) After 30,000 times | Half-value exposure amount ($\mu J/cm^2$) Initial | Half-value exposure amount ($\mu J/cm^2$) After repetition | Residual potential (V) Initial | Residual potential (V) After 30,000 times |
|---|---|---|---|---|---|---|
| Example 11 | −503 | −499 | 0.09 | 0.13 | −5 | −8 |
| Example 12 | −508 | −495 | 0.07 | 0.18 | −4 | −15 |
| Example 13 | −507 | −498 | 0.13 | 0.17 | −10 | −16 |
| Example 14 | −499 | −489 | 0.11 | 0.15 | −8 | −20 |
| Example 15 | −501 | −491 | 0.09 | 0.16 | −12 | −17 |
| Example 16 | −507 | −489 | 0.08 | 0.16 | −8 | −11 |
| Example 17 | −510 | −485 | 0.10 | 0.21 | −16 | −28 |
| Example 18 | +497 | +490 | 0.38 | 0.51 | +18 | +35 |
| Comparative Example 11 | −498 | −450 | 0.18 | 0.42 | −18 | −53 |
| Comparative Example 12 | −478 | −420 | 0.22 | 0.44 | −21 | −63 |

As shown in Table 31, it has been confirmed as follows: All Examples 11 to 18 had a deterioration amount of the charging potential after the durability test that was sufficiently smaller than Comparative Examples 11 and 12; had an initial sensitivity (half-value exposure amount) that was sufficiently higher than Comparative Examples 11 and 12; exhibited small deterioration in sensitivity after the durability test; and exhibited increase in residual potential after the durability test under a high temperature and high humidity environment that is sufficiently smaller than Comparative Examples 11 and 12.

Examples 19 to 26 and Comparative Examples 13 to 23, in which the oxotitanylphthalocyanine and an N,N'-bisenamine compound are used, will be described below.

Example 19

An interlayer 7 was formed on a conductive support 1, and a charge generating layer 5 was further formed thereon in the same manner as in Example 11. 10 parts by weight of N,N'-bisenamine shown by the example compound BE1 (charge transporting substance 3), 8 parts by weight of polycarbonate shown by the example compound V1 in Table 19 (binder resin), 2 parts by weight of polyester shown by formula (X) (binder resin), 0.2 part by weight of α-tocopherol (antioxidant), and 0.0002 part by weight of polydimethylsiloxane (leveling agent) were mixed, and a coating composition of a charge transporting layer of 15% by weight was prepared by using tetrahydrofuran as a solvent. The coating composition was coated on the charge generating layer 5 and dried to form a charge transporting layer 6 having a film thickness of 20 $\mu$m. Thus, a function separated type photoreceptor 8b having a photosensitive layer 4a having a laminated structure comprising the interlayer 7, the charge generating layer 5 and the charge transporting layer 6.

Example 20

A charge generating layer 5 was formed directly on a conductive support 1 of the Example 11 in the same manner as in Example 11. A charge transporting layer 6 was formed in the same manner as in Example 19 except that N,N'-bisenamine compound shown by the example compound BE3 was used as the charge transporting substance 3, and 0.5 part by weight of 2,6-di-t-butyl-4-methylphenol was used as an antioxidant. Thus, a function separated type photoreceptor 8b was obtained.

Example 21

A function separated type photoreceptor 8b was obtained in the same manner as in Example 19 except that a vinyl chloride-vinyl acetate copolymer resin (Essrec M-1 produced by Sekisui Chemical Co., Ltd.) was used as the binder resin in the charge generating layer 5, and an N,N'-bisenamine compound shown by the example compound BE14 was used as the charge transporting substance 3.

Example 22

An interlayer 7 was formed on a conductive support 1 in the same manner as in Example 11. A charge generating layer 5 was formed in the same manner as in Example 11 except that the oxotitanylphthalocyanine obtained in Production Example 2 was used. 10 parts by weight of N,N'-bisenamine shown by the example compound BE1 (charge transporting substance 3), 8 parts by weight of polycarbonate shown by the example compound V1 (binder resin), 2 parts by weight of polyester represented by formula (X) (binder resin), 0.5 part by weight of 2,6-di-t-butyl-4-methylphenol (antioxidant) and 0.0002 part by weight of polydimethylsiloxane (leveling agent) were mixed, and a coating composition for a charge transporting layer of 15% by weight was prepared by using dichloromethane as a solvent. The coating composition was coated on the charge generating layer 5 and dried to form a charge transporting layer 6 having a film thickness of 25 $\mu$m. Thus, a function separated type photoreceptor 8b having a photosensitive layer 4a having a laminated structure comprising the interlayer 7, the charge generating layer 5 and the charge transporting layer 6 was obtained.

Example 23

A function separated type photoreceptor 8b was obtained in the same manner as in Example 22 except that an N,N'-bisenamine-styryl compound shown by the example compound BE27 was used as the charge transporting substance 3 instead of the example compound BE1.

Example 24

An interlayer 7 was formed on a conductive support 1 in the same manner as in Example 11. A charge generating layer 5 was formed in the same manner as in Example 11 except that oxotitanylphthalocyanine obtained in Production Example 3 was used. A charge transporting layer 6 was formed in the same manner as in Example 22. Thus, a function separated type photoreceptor 8b having a photosensitive layer having a laminated structure comprising the interlayer 7, the charge generating layer 5 and the charge transporting layer 6 was obtained.

Example 25

A function separated type photoreceptor 8b was obtained in the same manner as in Example 24 except that an N,N'-bisenamine-styryl compound shown by the example compound BE40 was used as the charge transporting substance 3 instead of the example compound BE1.

Example 26

An interlayer 7 was formed on a conductive support 1 in the same manner as in Example 11. 1 part by weight of the oxotitanylphthalocyanine obtained in Production Example 1 (charge generating substance 2), 10 parts by weight of N,N'-bisenamine compound shown by the example compound BE6 (charge transporting substance 3), 8 parts by weight of polycarbonate shown by the example compound V1 (binder resin), 2 parts by weight of polyester represented by formula (X), and 0.5 part by weight of 2,6-di-t-butyl-4-methylphenol (antioxidant) were mixed, and a coating composition of 15% by weight was prepared by using dichloromethane as a solvent, which was then subjected to dispersion treatment along with glass beads having a diameter of 2 mm in the paint conditioner apparatus. The resulting coating composition was coated on the interlayer 7 and dried to form a photosensitive layer 4b having a film thickness of 25 μm. Thus, a single-layer type photoreceptor 8d comprising the interlayer 7 and the photosensitive layer 4b containing the charge generating substance 2 and the charge transporting substance 3 was obtained.

Comparative Example 13

A function separated type photoreceptor was obtained in the same manner as in Example 19 except that the oxotitanylphthalocyanine intermediate crystal obtained during Production Example 1 was used instead of the oxotitanylphthalocyanine used in Example 19.

Comparative Example 14

A function separated type photoreceptor was obtained in the same manner as in Example 20 except that the oxotitanylphthalocyanine intermediate crystal obtained during Production Example 1 was used instead of the oxotitanylphthalocyanine used in Example 20.

Comparative Example 15

A function separated type photoreceptor was obtained in the same manner as in Example 19 except that a known 4-(diethylamino)-benzaldehyde-N,N-diphenylhydrazone compound was used instead of the charge transporting substance used in Example 19.

Comparative Example 16

A function separated type photoreceptor was obtained in the same manner as in Example 19 except that polycarbonate comprising bisphenol A as a monomer component was used instead of the binder resin in the charge generating layer used in Example 19.

Comparative Example 17

A function separated type photoreceptor was obtained in the same manner as in Example 20 except that a-tocopherol was not added to the charge generating layer of Example 20.

Comparative Example 18

A function separated type photoreceptor was obtained in the same manner as in Example 19 except that 2,6-di-t-butyl-4-methylphenol was not added to the charge generating layer of Example 19.

Comparative Example 19

A function separated type photoreceptor was obtained in the same manner as in Example 19 except that polydimethylsiloxane was not added to the charge generating layer of Example 19. In Comparative Example 19, unevenness was formed on the surface of the photoreceptor, and a uniform coating film could not be obtained.

Comparative Example 20

A single-layer type photoreceptor was obtained in the same manner as in Example 26 except that the oxotitanylphthalocyanine intermediate crystal obtained during Production Example 1 was used instead of the charge generating substance in Example 26.

Comparative Example 21

A single-layer type photoreceptor was obtained in the same manner as in Example 26 except that a known 4-(diethylamino)-benzaldehyde-N,N-diphenylhydrazone compound was used instead of the charge transporting substance in Example 26.

Comparative Example 22

A single-layer type photoreceptor was obtained in the same manner as in Example 26 except that polycarbonate comprising bisphenol A as a monomer component was used instead of the binder resin in the charge generating layer used in Example 26.

Comparative Example 23

A single-layer type photoreceptor was obtained in the same manner as in Example 26 except that 2,6-di-t-butyl-4-methylphenol was not added.

Samples of Examples 19 to 26 and Comparative Examples 13 to 23 are shown in Table 32.

TABLE 32

| Example | Charge generating substance | Charge transporting substance | Binder Resin | Antioxidant | Polydimethylsiloxane |
|---|---|---|---|---|---|
| Example 19 | Production Example 1 | Example Compound BE1 | V1/X = 8/2 | α-tocopherol | Contained |
| Example 20 | Production Example 1 | Example Compound BE3 | V1/X = 8/2 | 2,6-di-t-butyl-4-methylphenol | Contained |
| Example 21 | Production Example 1 | Example Compound BE14 | V1/X = 8/2 | α-tocopherol | Contained |
| Example 22 | Production Example 2 | Example Compound BE1 | V1/X = 8/2 | 2,6-di-t-butyl-4-methylphenol | Contained |
| Example 23 | Production Example 2 | Example Compound BE27 | V1/X = 8/2 | 2,6-di-t-butyl-4-methylphenol | Contained |
| Example 24 | Production Example 3 | Example Compound BE1 | V1/X = 8/2 | 2,6-di-t-butyl-4-methylphenol | Contained |
| Example 25 | Production Example 3 | Example Compound BE40 | V1/X = 8/2 | 2,6-di-t-butyl-4-methylphenol | Contained |
| Example 26 | Production Example 1 | Example Compound BE6 | V1/X = 8/2 | 2,6-di-t-butyl-4-methylphenol | Contained |
| Comparative Example 13 | Intermediate | Example Compound BE1 | V1/X = 8/2 | α-tocopherol | Contained |
| Comparative Example 14 | Intermediate | Example Compound BE3 | V1/X = 8/2 | 2,6-di-t-butyl-4-methylphenol | Contained |
| Comparative Example 15 | Production Example 1 | Conventional Compound | V1/X = 8/2 | α-tocopherol | Contained |
| Comparative Example 16 | Production Example 1 | Example Compound BE1 | Polycarbonate | α-tocopherol | Contained |
| Comparative Example 17 | Production Example 1 | Example Compound BE3 | V1/X = 8/2 | Not Contained | Contained |
| Comparative Example 18 | Production Example 1 | Example Compound BE1 | V1/X = 8/2 | Not Contained | Contained |
| Comparative Example 19 | Production Example 1 | Example Compound BE1 | V1/X = 8/2 | α-tocopherol | Not Contained |
| Comparative Example 20 | Intermediate | Example Compound BE6 | V1/X = 8/2 | 2,6-di-t-butyl-4-methylphenol | Contained |
| Comparative Example 21 | Production Example 1 | Conventional Compound | V1/X = 8/2 | α-tocopherol | Contained |
| Comparative Example 22 | Production Example 1 | Example Compound BE6 | Polycarbonate | 2,6-di-t-butyl-4-methylphenol | Contained |
| Comparative Example 23 | Production Example 1 | Example Compound BE6 | V1/X = 8/2 | Not Contained | Contained |

The photoreceptors produced in Examples 19 to 26 and Comparative Examples 13 to 23 were evaluated for electrophotographic characteristics, and the durability test was conducted, in the same manner as described above. The degree of decrease in film thickness of the photoreceptor was measured by a wear testing apparatus (produced by Suga Testing Machine Co., Ltd.). The measurement conditions were aluminum oxide #2000 as an abrasion material, a load of 200 g·f, and a number of abrasion of 10,000. The results obtained are shown in Table 33.

TABLE 33

| Example | Charging potential (V) | | Half-value exposure amount ($\mu J/cm^2$) | | Residual potential (V) | | Amount of Abrasion (mg) |
|---|---|---|---|---|---|---|---|
| | Initial | After 30,000 times | Initial | After repetition | Initial | After 30,000 times | |
| Example 19 | −507 | −490 | 0.04 | 0.07 | −15 | −32 | 2.14 |
| Example 20 | −512 | −496 | 0.11 | 0.13 | −21 | −30 | 2.13 |
| Example 21 | −514 | −489 | 0.07 | 0.1 | −14 | −31 | 2.19 |
| Example 22 | −504 | −486 | 0.08 | 0.09 | −12 | −23 | 2.24 |
| Example 23 | −517 | −500 | 0.07 | 0.11 | −16 | −27 | 2.15 |
| Example 24 | −506 | −482 | 0.07 | 0.08 | −14 | −19 | 2.16 |
| Example 25 | −501 | −479 | 0.06 | 0.07 | −13 | −20 | 2.17 |
| Example 26 | 508 | 499 | 0.41 | 0.57 | 21 | 41 | 2.33 |
| Comparative Example 13 | −490 | −448 | 0.17 | 0.42 | −17 | −57 | 2.17 |
| Comparative Example 14 | −475 | −417 | 0.23 | 0.46 | −22 | −68 | 2.22 |
| Comparative Example 15 | −495 | −448 | 0.19 | 0.45 | −19 | −108 | 2.17 |
| Comparative | −475 | −421 | 0.2 | 0.41 | −23 | −68 | 4.95 |

TABLE 33-continued

| Example | Charging potential (V) Initial | Charging potential (V) After 30,000 times | Half-value exposure amount (μJ/cm²) Initial | Half-value exposure amount (μJ/cm²) After repetition | Residual potential (V) Initial | Residual potential (V) After 30,000 times | Amount of Abrasion (mg) |
|---|---|---|---|---|---|---|---|
| Example 16 | | | | | | | |
| Comparative Example 17 | −457 | −447 | 0.17 | 0.43 | −17 | −130 | 2.11 |
| Comparative Example 18 | −456 | −449 | 0.19 | 0.43 | −19 | −127 | 2.37 |
| Comparative Example 19 | −497 | — | 0.17 | — | −18 | — | 2.07 |
| Comparative Example 20 | 502 | 461 | 0.18 | 0.43 | 27 | 70 | 2.31 |
| Comparative Example 21 | 504 | 453 | 0.23 | 0.48 | 30 | 69 | 2.05 |
| Comparative Example 22 | 506 | 497 | 0.19 | 0.21 | 29 | 38 | 5.08 |
| Comparative Example 23 | 503 | 200 | 0.21 | 0.24 | 31 | 153 | 2.41 |

As shown in Table 33, it has been confirmed as follows: All Examples 19 to 26 had a deterioration amount of the charging potential after the durability test that was sufficiently smaller than Comparative Examples 13 to 23; had an initial sensitivity (half-value exposure amount) that was sufficiently higher than Comparative Examples 13 to 23; exhibited small deterioration in sensitivity after the durability test; and exhibited increase in residual potential after the durability test under a high temperature and high humidity environment that is sufficiently smaller than Comparative Examples 13 to 23.

Examples 27 to 34 and Comparative Examples 24 and 25, in which the oxotitanylphthalocyanine and a styryl compound are used, will be described below.

Example 27

An interlayer 7 was formed on a conductive support 1, and a charge generating layer 5 was further formed thereon in the same manner as in Example 11. The example compound ST1 (charge transporting substance 3) and polycarbonate (binder resin) (PCZ-200 produced by Mitsubishi Gas Chemical Co., Ltd.) were mixed in a weight ratio of 1/1, and a coating composition of a charge transporting layer of 15% by weight was prepared by using dichloromethane as a solvent. The coating composition was coated on the charge generating layer 5 and dried to form a charge transporting layer 6 having a film thickness of 20 μm. Thus, a function separated type photoreceptor 8b having a photosensitive layer 4a having a laminated structure comprising the interlayer 7, the charge generating layer 5 and the charge transporting layer 6 was obtained.

Examples 28 to 31

Function separated type photoreceptors 8b were obtained in the same manner as in Example 27 except that the example compounds ST9, ST17, ST23 and ST28 were used as the charge transporting substance 3 instead of the example compound ST1.

Example 32

A function separated type photoreceptor was obtained in the same manner as in Example 27 except that the oxotitanylphthalocyanine obtained in Production Example 2 was used instead of the charge generating substance 2 in Example 27.

Example 33

A function separated type photoreceptor 8b was obtained in the same manner as in Example 27 except that the oxotitanylphthalocyanine obtained in Production Example 3 was used instead of the charge generating substance 2 in Example 27.

Example 34

An interlayer 7 was formed on a conductive support 1 in the same manner as in Example 11. 1 part by weight of oxotitanylphthalocyanine obtained in Production Example 1 (charge generating substance 2); 10 parts by weight of the example compound ST2 (charge transporting substance 3) and 10 parts by weight of polycarbonate (binder resin) (PCZ-200 produced by Mitsubishi Gas Chemical Co., Ltd.) were mixed, and a coating composition of 18% by weight was prepared by using dichloromethane as a solvent, which was then subjected to a dispersion treatment along with glass beads having a diameter of 2 mm in the paint conditioner apparatus. The resulting coating composition for a photosensitive layer was coated on the interlayer 7 and dried to form a photosensitive layer 4b having a film thickness of 20 μm. Thus, a single-layer type photoreceptor 8d comprising the interlayer 7 and the photosensitive layer 4b containing the charge generating substance 2 and the charge transporting substance 3 was obtained.

Comparative Example 24

A function separated type photoreceptor was obtained in the same manner as in Example 27 except that the oxotitanylphthalocyanine intermediate crystal obtained during Production Example 1 was used instead of the oxotitanylphthalocyanine used in Example 27.

Comparative Example 25

A function separated type photoreceptor was obtained in the same manner as in Example 27 except that a charge transporting substance represented by formula (XXVII) was used instead of the charge transporting substance used in Example 27.

(XXVII)

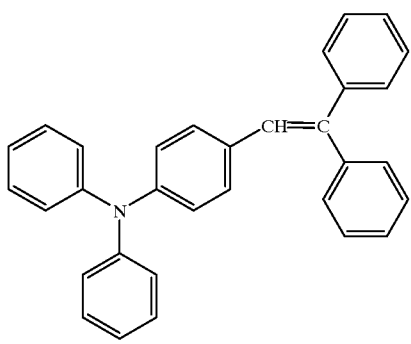

The photoreceptors produced in Examples 27 to 34 and Comparative Examples 24 and 25 were evaluated for electrophotographic characteristics, and the durability test was conducted, in the same manner as described above. The results obtained are shown in Table 34.

TABLE 34

| Example | Charging potential (V) | | Half-value exposure amount ($\mu$J/cm$^2$) | | Residual potential (V) | |
|---|---|---|---|---|---|---|
| | Initial | After 30,000 times | Initial | After repetition | Initial | After 30,000 times |
| Example 27 | −507 | −497 | 0.08 | 0.09 | −15 | −27 |
| Example 28 | −504 | −496 | 0.09 | 0.11 | −17 | −26 |
| Example 29 | −506 | −498 | 0.07 | 0.09 | −12 | −27 |
| Example 30 | −497 | −494 | 0.06 | 0.10 | −14 | −22 |
| Example 31 | −505 | −496 | 0.10 | 0.12 | −18 | −28 |
| Example 32 | −505 | −499 | 0.06 | 0.08 | −12 | −21 |
| Example 33 | −503 | −500 | 0.06 | 0.07 | −11 | −19 |
| Example 34 | +506 | +495 | 0.41 | 0.45 | +21 | +45 |
| Comparative Example 24 | −496 | −479 | 0.22 | 0.35 | −21 | −52 |
| Comparative Example 25 | −501 | −495 | 0.15 | 0.21 | −23 | −35 |

As shown in Table 34, it has been confirmed as follows: All Examples 27 to 34 had a deterioration amount of the charging potential after the durability test that was sufficiently smaller than Comparative Examples 24 and 25; had an initial sensitivity (half-value exposure amount) that was sufficiently higher than Comparative Examples 24 and 25; exhibited small deterioration in sensitivity after the durability test; and exhibited increase in residual potential after the durability test under a high temperature and high humidity environment that is sufficiently smaller than Comparative Examples 24 and 25.

Examples 35 to 42 and Comparative Examples 26 and 27, in which the oxotitanylphthalocyanine and an amine-hydrazone compound are used, will be described below.

Example 35

An interlayer 7 was formed on a conductive support 1, and a charge generating layer 5 was further formed, in the same manner as in Example 11. The example compound AH1 (charge transporting substance 3) and polycarbonate (binder resin) (PCZ-200 produced by Mitsubishi Gas Chemical Co., Ltd.) were mixed in a weight ratio of 1/1, and a coating composition for a charge transporting layer of 15% by weight was prepared by using dichloromethane as a solvent. The coating composition was coated on the charge generating layer 5 and dried to form a charge transporting layer 6 having a film thickness of 20 $\mu$m. Thus, a function separated type photoreceptor 8b having a photosensitive layer 4a having a laminated structure comprising the interlayer 7, the charge generating layer 5 and the charge transporting layer 6 was obtained.

Examples 36 to 39

Function separated type photoreceptors 8b were obtained in the same manner as in Example 35 except that the example compounds AH3, AH5, AH10 and AH16 were used as the charge transporting substance 3 instead of the example compound AH1.

Example 40

A function separated type photoreceptor 8b was obtained in the same manner as in Example 35 except that the oxotitanylphthalocyanine obtained in Production Example 2 was used instead of the charge generating substance 2 in Example 35.

Example 41

A function separated type photoreceptor 8b was obtained in the same manner as in Example 35 except that the oxotitanylphthalocyanine obtained in Production Example 3 was used instead of the charge generating substance 2 in Example 35.

Example 42

An interlayer 7 was formed on a conductive support 1 in the same manner as in Example 11. 1 part by weight of oxotitanylphthalocyanine obtained in Production Example 1 (charge generating substance 2), 10 parts by weight of the example compound AH2 (charge transporting substance 3) and 10 parts by weight of polycarbonate (binder resin) (PCZ-200 produced by Mitsubishi Gas Chemical Co., Ltd.) were mixed, and a coating composition of 18% by weight was prepared by using dichloromethane as a solvent, which was then subjected to a dispersion treatment along with glass beads having a diameter of 2 mm in the paint conditioner apparatus. The resulting coating composition for a photosensitive layer was coated on the interlayer 7 and dried to form a photosensitive layer 4b having a film thickness of 20 $\mu$m. Thus, a single-layer type photoreceptor 8d comprising the interlayer 7 and the photosensitive layer 4b containing the charge generating substance 2 and the charge transporting substance 3 was obtained.

Comparative Example 26

A function separated type photoreceptor was obtained in the same manner as in Example 35 except that the oxotitanylphthalocyanine intermediate crystal obtained during Production Example 1 was used instead of the oxotitanylphthalocyanine used in Example 35.

Comparative Example 27

A function separated type photoreceptor was obtained in the same manner as in Example 35 except that a charge transporting substance represented by formula (XXVIII) was used instead of the charge transporting substance used in Example 35.

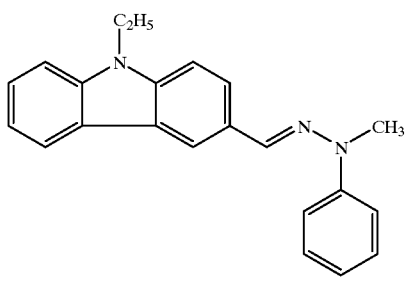

(XXVIII)

The photoreceptors produced in Examples 35 to 42 and Comparative Examples 26 and 27 were evaluated for electrophotographic characteristics, and the durability test was conducted, in the same manner as described above. The results obtained are shown in Table 35.

TABLE 35

| Example | Charging potential (V) | | Half-value exposure amount ($\mu J/cm^2$) | | Residual potential (V) | |
|---|---|---|---|---|---|---|
| | Initial | After 30,000 times | Initial | After repetition | Initial | After 30,000 times |
| Example 35 | −508 | −502 | 0.11 | 0.15 | −21 | −31 |
| Example 36 | −501 | −495 | 0.14 | 0.18 | −18 | −36 |
| Example 37 | −507 | −499 | 0.12 | 0.15 | −15 | −37 |
| Example 38 | −504 | −497 | 0.11 | 0.16 | −24 | −32 |
| Example 39 | −507 | −499 | 0.12 | 0.18 | −19 | −30 |
| Example 40 | −503 | −495 | 0.16 | 0.19 | −23 | −31 |
| Example 41 | −505 | −494 | 0.13 | 0.15 | −22 | −29 |
| Example 42 | +501 | +492 | 0.31 | 0.50 | +24 | +48 |
| Comparative Example 26 | −495 | −449 | 0.18 | 0.34 | −21 | −45 |
| Comparative Example 27 | −501 | −482 | 0.21 | 0.43 | −23 | −60 |

As shown in Table 35, it has been confirmed as follows: All Examples 35 to 42 had a deterioration amount of the charging potential after the durability test that was sufficiently smaller than Comparative Examples 26 and 27; had an initial sensitivity (half-value exposure amount) that was sufficiently higher than Comparative Examples 26 and 27; exhibited small deterioration in sensitivity after the durability test; and exhibited increase in residual potential after the durability test under a high temperature and high humidity environment that is sufficiently smaller than Comparative Examples 26 and 27.

Examples 43 to 50 and Comparative Examples 28 to 38, in which the oxotitanylphthalocyanine and a benzofuran-bishydrazone compound are used, will be described below.

Example 43

An interlayer 7 was formed on a conductive support 1, and a charge generating layer 5 was further formed thereon in the same manner as in Example 11. 10 parts by weight of a benzofuran-bishydrazone compound shown by the example compound BB1 (charge transporting substance 3), 8 parts by weight of polycarbonate shown by the example compound V1 (binder resin), 2 parts by weight of polyester shown by formula (X) (binder resin), 0.2 part by weight of a-tocopherol (antioxidant), and 0.0002 part by weight of polydimethylsiloxane (leveling agent) were mixed, and a coating composition of a charge transporting layer of 15% by weight was prepared by using tetrahydrofuran as a solvent. The coating composition was coated on the charge generating layer 5 and dried to form a charge transporting layer 6 having a film thickness of 20 $\mu$m. Thus, a function separated type photoreceptor 8b having a photosensitive layer 4a having a laminated structure comprising the interlayer 7, the charge generating layer 5 and the charge transporting layer 6 was obtained.

Example 44

A charge generating layer 5 was formed directly on a conductive support 1 of the Example 43 in the same manner as in Example 43. A charge transporting layer 6 was formed in the same manner as in Example 43 except that a benzofuran-bishydrazone compound shown by the example compound BB12 was used as the charge transporting substance 3, and 0.5 part by weight of 2,6-di-t-butyl-4-methylphenol was used as an antioxidant. Thus, a function separated type photoreceptor 8b was obtained.

Example 45

A function separated type photoreceptor 8b was obtained in the same manner as in Example 43 except that a vinyl chloride-vinyl acetate copolymer resin (Essrec M-1 produced by Sekisui Chemical Co., Ltd.) was used as the binder resin in the charge generating layer 5, and a benzofuran-bishydrazone compound shown by the example compound BB24 was used as the charge transporting substance 3.

Example 46

An interlayer 7 was formed on a conductive support 1 in the same manner as in Example 43. A charge generating layer 5 was formed in the same manner as in Example 43 except that the oxotitanylphthalocyanine obtained in Production Example 2 was used. 10 parts by weight of a benzofuran-bishydrazone compound shown by the example compound BB1 (charge transporting substance 3), 8 parts by weight of polycarbonate shown by the example compound V1 (binder resin), 2 parts by weight of polyester represented by formula (X) (binder resin), 0.5 part by weight of 2,6-di-t-butyl-4-methylphenol (antioxidant) and 0.0002 part by weight of polydimethylsiloxane (leveling agent) were mixed, and a coating composition for a charge transporting layer of 15% by weight was prepared by using dichloromethane as a solvent. The coating composition was coated on the charge generating layer 5 and dried to form a charge transporting layer 6 having a film thickness of 25 $\mu$m. Thus, a function separated type photoreceptor 8b having a photosensitive layer 4a having a laminated structure comprising the interlayer 7, the charge generating layer 5 and the charge transporting layer 6 was obtained.

Example 47

A function separated type photoreceptor 8b was obtained in the same manner as in Example 46 except that a benzofuran-bishydrazone compound shown by the example compound BB36 was used as the charge transporting substance 3.

Example 48

An interlayer 7 was formed on a conductive support 1 in the same manner as in Example 43. A charge generating layer 5 was formed in the same manner as in Example 43 except that oxotitanylphthalocyanine obtained in Production Example 3 was used. A charge transporting layer 6 was formed in the same manner as in Example 46. Thus, a function separated type photoreceptor 8b having a photosensitive layer having a laminated structure comprising the interlayer 7, the charge generating layer 5 and the charge transporting layer 6 was obtained.

Example 49

A function separated type photoreceptor 8b was obtained in the same manner as in Example 47 except that a benzofuran-bishydrazone compound shown by the example compound BB40 was used as the charge transporting substance 3.

Example 50

An interlayer 7 was formed on a conductive support 1 in the same manner as in Example 43. 1 part by weight of the oxotitanylphthalocyanine obtained in Production Example 1 (charge generating substance 2), 10 parts by weight of a benzofuran-bishydrazone compound shown by the example compound BB7 (charge transporting substance 3), 8 parts by weight of polycarbonate shown by the example compound V1 (binder resin), 2 parts by weight of polyester represented by formula (X), and 0.5 part by weight of 2,6-di-t-butyl-4-methylphenol (antioxidant) were mixed, and a coating composition of 15% by weight was prepared by using dichloromethane as a solvent, which was then subjected to dispersion treatment along with glass beads having a diameter of 2 mm in the paint conditioner apparatus. The resulting coating composition was coated on the interlayer 7 and dried to form a photosensitive layer 4b having a film thickness of 25 μm. Thus, a single-layer type photoreceptor 8d comprising the interlayer 7 and the photosensitive layer 4b containing the charge generating substance 2 and the charge transporting substance 3 was obtained.

Comparative Example 28

A function separated type photoreceptor was obtained in the same manner as in Example 43 except that the oxotitanylphthalocyanine intermediate crystal obtained during Production Example 1 was used instead of the oxotitanylphthalocyanine used in Example 43.

Comparative Example 29

A function separated type photoreceptor was obtained in the same manner as in Example 44 except that the oxotitanylphthalocyanine intermediate crystal obtained during Production Example 1 was used instead of the oxotitanylphthalocyanine used in Example 43.

Comparative Example 30

A function separated type photoreceptor was obtained in the same manner as in Example 43 except that a known 4-(diethylamino)-benzaldehyde-N,N-diphenylhydrazone compound was used instead of the charge transporting substance used in Example 43.

Comparative Example 31

A function separated type photoreceptor was obtained in the same manner as in Example 43 except that polycarbonate comprising bisphenol A as a monomer component was used instead of the binder resin in the charge generating layer used in Example 43.

Comparative Example 32

A function separated type photoreceptor was obtained in the same manner as in Example 44 except that α-tocopherol was not added to the charge generating layer of Example 44.

Comparative Example 33

A function separated type photoreceptor was obtained in the same manner as in Example 43 except that 2,6-di-t-butyl-4-methylphenol was not added to the charge generating layer of Example 43.

Comparative Example 34

A function separated type photoreceptor was obtained in the same manner as in Example 43 except that polydimethylsiloxane was not added to the charge generating layer of Example 43. In Comparative Example 34, unevenness was formed on the surface of the photoreceptor, and a uniform coating film could not be obtained.

Comparative Example 35

A single-layer type photoreceptor was obtained in the same manner as in Example 50 except that the oxotitanylphthalocyanine intermediate crystal obtained during Production Example 1 was used instead of the charge generating substance in Example 50.

Comparative Example 36

A single-layer type photoreceptor was obtained in the same manner as in Example 50 except that a known 4-(diethylamino)-benzaldehyde-N,N-diphenylhydrazone compound was used instead of the charge transporting substance in Example 50.

Comparative Example 37

A single-layer type photoreceptor was obtained in the same manner as in Example 50 except that polycarbonate comprising bisphenol A as a monomer component was used instead of the binder resin in Example 50.

Comparative Example 38

A single-layer type photoreceptor was obtained in the same manner as in Example 50 except that 2,6-di-t-butyl-4-methylphenol was not added.

Samples of Examples 43 to 50 and Comparative Examples 28 to 38 are shown in Table 36.

TABLE 36

| Example | Charge generating substance | Charge transporting substance | Binder Resin | Antioxidant | Polydimethylsiloxane |
|---|---|---|---|---|---|
| Example 43 | Production Example 1 | Example Compound BB1 | V1/X = 8/2 | α-tocopherol | Contained |
| Example 44 | Production Example 1 | Example Compound BB12 | V1/X = 8/2 | 2,6-di-t-butyl-4-methylphenol | Contained |

TABLE 36-continued

| Example | Charge generating substance | Charge transporting substance | Binder Resin | Antioxidant | Polydimethylsiloxane |
|---|---|---|---|---|---|
| Example 45 | Production Example 1 | Example Compound BB24 | V1/X = 8/2 | α-tocopherol | Contained |
| Example 46 | Production Example 2 | Example Compound BB1 | V1/X = 8/2 | 2,6-di-t-butyl-4-methylphenol | Contained |
| Example 47 | Production Example 2 | Example Compound BB36 | V1/X = 8/2 | 2,6-di-t-butyl-4-methylphenol | Contained |
| Example 48 | Production Example 3 | Example Compound BB1 | V1/X = 8/2 | 2,6-di-t-butyl-4-methylphenol | Contained |
| Example 49 | Production Example 3 | Example Compound BB40 | V1/X = 8/2 | 2,6-di-t-butyl-4-methylphenol | Contained |
| Example 50 | Production Example 1 | Example Compound BB7 | V1/X = 8/2 | 2,6-di-t-butyl-4-methylphenyl | Contained |
| Comparative Example 28 | Intermediate | Example Compound BB1 | V1/X = 8/2 | α-tocopherol | Contained |
| Comparative Example 29 | Intermediate | Example Compound BB12 | V1/X = 8/2 | 2,6-di-t-butyl-4-methylphenol | Contained |
| Comparative Example 30 | Production Example 1 | Conventional Compound | V1/X = 8/2 | α-tocopherol | Contained |
| Comparative Example 31 | Production Example 1 | Example Compound BB1 | Polycarbonate | α-tocopherol | Contained |
| Comparative Example 32 | Production Example 1 | Example Compound BB12 | V1/X = 8/2 | Not Contained | Contained |
| Comparative Example 33 | Production Example 1 | Example Compound BB1 | V1/X = 8/2 | Not Contained | Contained |
| Comparative Example 34 | Production Example 1 | Example Compound BB1 | V1/X = 8/2 | α-tocopherol | Not Contained |
| Comparative Example 35 | Intermediate | Example Compound BB7 | V1/X = 8/2 | 2,6-di-t-butyl-4-methylphenol | Contained |
| Comparative Example 36 | Production Example 1 | Conventional Compound | V1/X = 8/2 | α-tocopherol | Contained |
| Comparative Example 37 | Production Example 1 | Example Compound BB7 | Polycarbonate | 2,6-di-t-butyl-4-methylphenol | Contained |
| Comparative Example 38 | Production Example 1 | Example Compound BB7 | V1/X = 8/2 | Not Contained | Contained |

The photoreceptors produced in Examples 43 to 50 and Comparative Examples 28 to 38 were evaluated for electrophotographic characteristics, the durability test was conducted, the degree of decrease in film thickness of the photoreceptor was measured, in the same manner as described above. The results obtained are shown in Table 37.

TABLE 37

| Example | Charging potential (V) Initial | Charging potential (V) After 30,000 times | Half-value exposure amount (μJ/cm²) Initial | Half-value exposure amount (μJ/cm²) After repetition | Residual potential (V) Initial | Residual potential (V) After 30,000 times | Amount of Abrasion (mg) |
|---|---|---|---|---|---|---|---|
| Example 43 | −505 | −488 | 0.05 | 0.08 | −16 | −31 | 2.12 |
| Example 44 | −510 | −491 | 0.1 | 0.11 | −22 | −32 | 2.14 |
| Example 45 | −516 | −485 | 0.08 | 0.1 | −16 | −30 | 2.17 |
| Example 46 | −509 | −489 | 0.07 | 0.1 | −13 | −25 | 2.21 |
| Example 47 | −512 | −497 | 0.07 | 0.11 | −15 | −28 | 2.16 |
| Example 48 | −501 | −487 | 0.08 | 0.1 | −16 | −22 | 2.12 |
| Example 49 | −506 | −475 | 0.07 | 0.09 | −17 | −26 | 2.19 |
| Example 50 | 502 | 492 | 0.41 | 0.57 | 23 | 38 | 2.31 |
| Comparative Example 28 | −494 | −457 | 0.18 | 0.42 | −16 | −50 | 2.14 |
| Comparative Example 29 | −481 | −411 | 0.21 | 0.49 | −20 | −69 | 2.17 |
| Comparative Example 30 | −492 | −441 | 0.2 | 0.47 | −17 | −112 | 2.12 |
| Comparative Example 31 | −480 | −425 | 0.21 | 0.48 | −24 | −69 | 4.93 |
| Comparative Example 32 | −462 | −441 | 0.16 | 0.47 | −15 | −134 | 2.16 |
| Comparative Example 33 | −471 | −446 | 0.19 | 0.46 | −18 | −125 | 2.31 |
| Comparative Example 34 | −492 | — | 0.18 | — | −19 | — | 2.06 |

TABLE 37-continued

|  | Charging potential (V) | | Half-value exposure amount (µJ/cm$^2$) | | Residual potential (V) | | Amount of Abrasion (mg) |
| --- | --- | --- | --- | --- | --- | --- | --- |
| Example | Initial | After 30,000 times | Initial | After repetition | Initial | After 30,000 times | |
| Comparative Example 35 | 507 | 472 | 0.16 | 0.46 | 25 | 75 | 2.3 |
| Comparative Example 36 | 511 | 452 | 0.21 | 0.48 | 32 | 67 | 2.03 |
| Comparative Example 37 | 502 | 484 | 0.19 | 0.23 | 28 | 39 | 5.09 |
| Comparative Example 38 | 508 | 224 | 0.22 | 0.29 | 30 | 155 | 2.34 |

As shown in Table 37, it has been confirmed as follows: All Examples 43 to 50 had a deterioration amount of the charging potential after the durability test that was sufficiently smaller than Comparative Examples 28 to 38; had a sufficiently high initial sensitivity (half-value exposure amount); exhibited small deterioration in sensitivity after the durability test; and exhibited sufficiently small increase in residual potential after the durability test under a high temperature and high humidity environment.

Production Example 4 (Example Compound BE62)

1.0 g of p-toluidine and 1.59 g (1.05 equivalents) of 4-formylchroman were dissolved in 50 ml of toluene. A catalytic amount (about 50 mg) of p-toluenesulfonic acid was then added to the mixed solution, which was gradually heated to 90° C. under stirring. At this time, water by-produced by the reaction was distilled away by azeotropy with toluene.

1.97 g of 4-formylchroman (1.30 equivalents) was added to the reaction mixture to react therewith, and water by-produced by the reaction was similarly distilled away by azeotropy with toluene. After turbidity of the azeotropic toluene was disappeared, heating and stirring were continued for further 3 hours. After completing the reaction, toluene was removed by an evaporator, and the residue was recrystallized from a mixed solvent of ethanol and ethyl acetate to obtain 2.1 g of the example compound BE62 (yield: 57.0%).

The resulting compound BE62 was confirmed as the example compound BE62 by a $^1$H-NMR spectrum, a normal $^{13}$C-NMR spectrum and a DEPT135 $^{13}$C-NMR spectrum.

Figure 11:
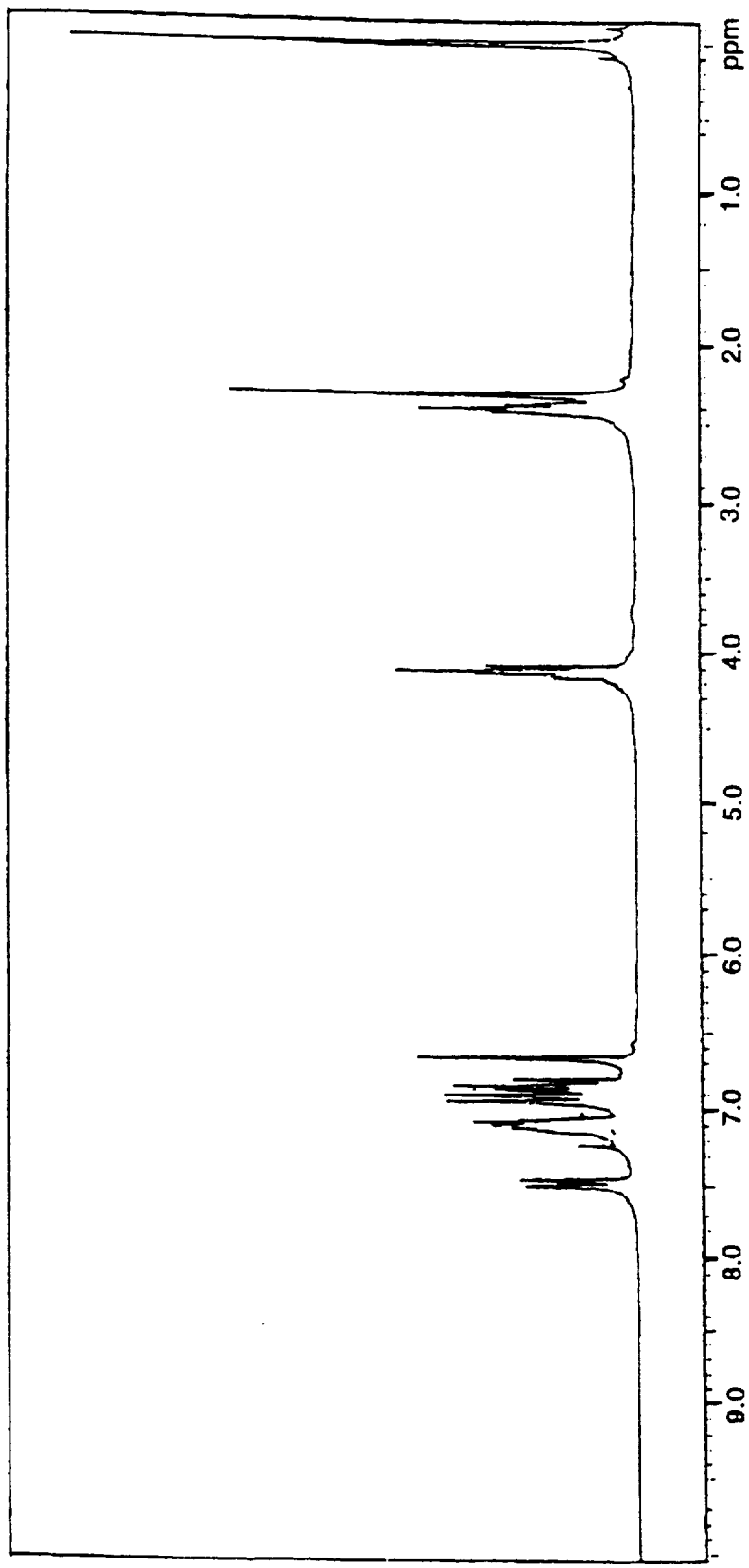
FIG. 11 is an $^1$H-NMR spectrum of an example compound BE62 in heavy chloroform.
Figure 12:
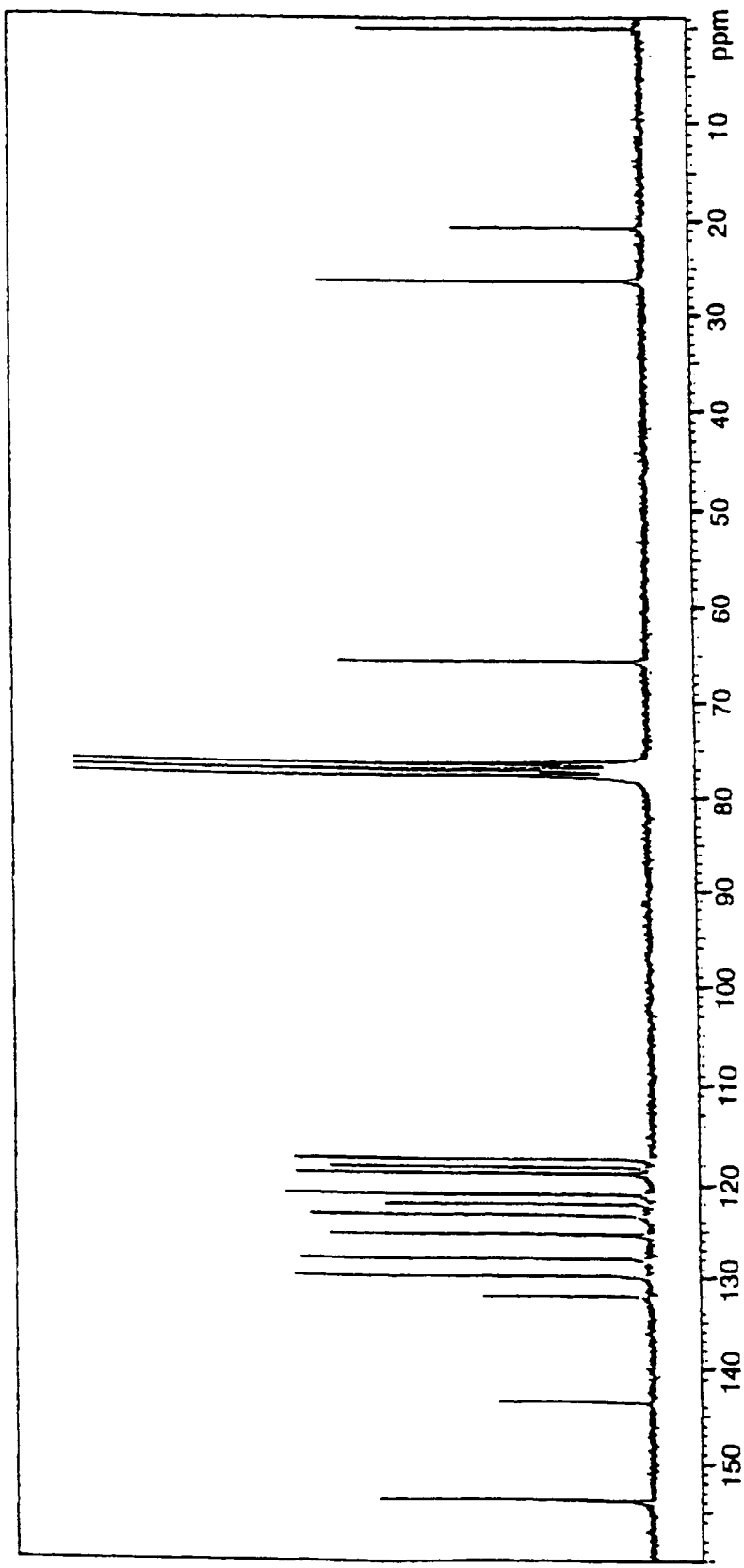
FIG. 12 is a $^{13}$C-NMR spectrum of the example compound BE62 in heavy chloroform.
Figure 13:
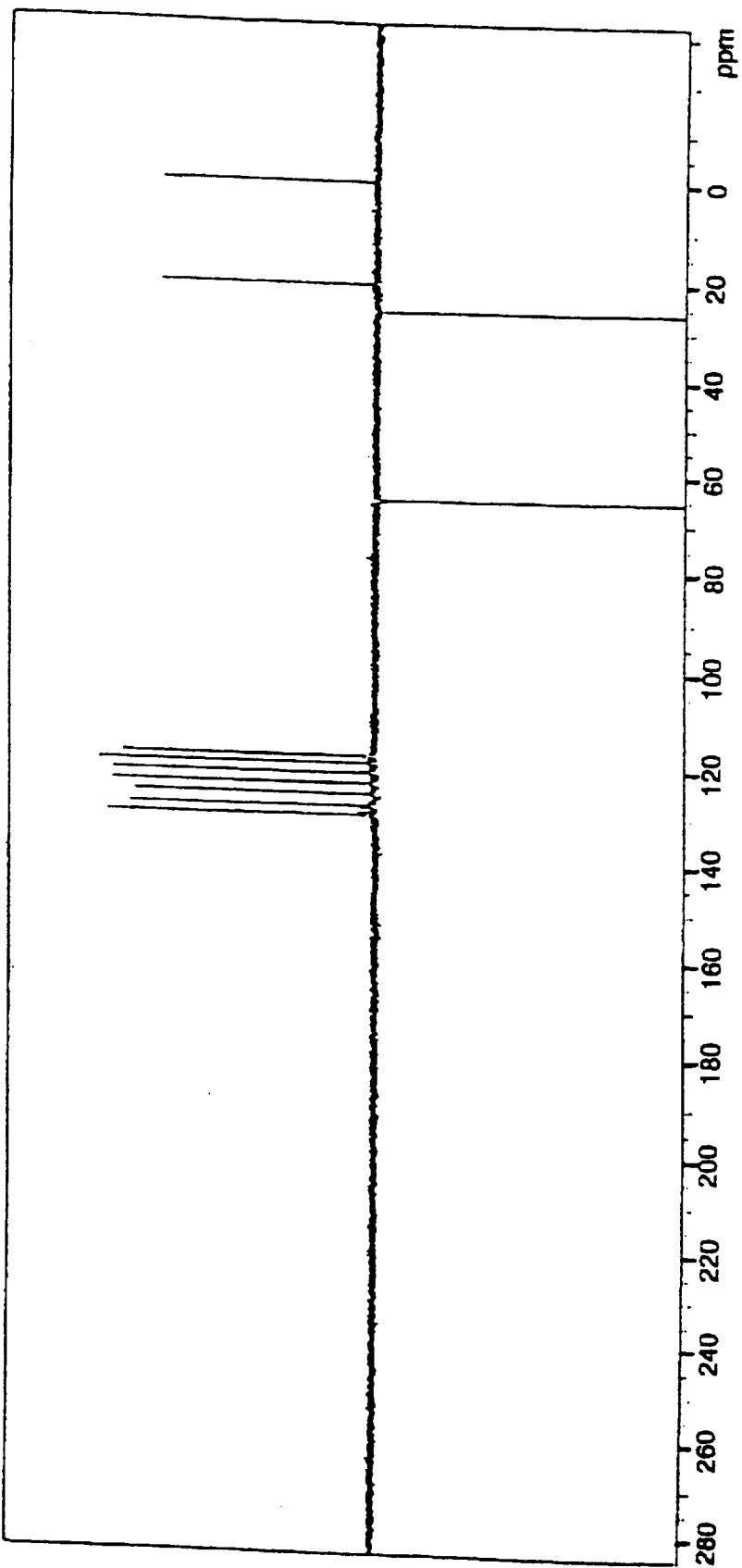
FIG. 13 is a DEPT135$^{13}$C-NMR spectrum of the example compound BE62 in heavy chloroform.

FIG. 11, FIG. 12 and FIG. 13 show a $^1$H-NMR spectrum, a normal $^{13}$C-NMR spectrum and a DEPT135 $^3$C-NMR spectrum of the example compound BE62 in heavy chloroform, respectively.

Production Examples 5 to 39

The example compounds BE61 and BE63 to BE96 were obtained in the same manner as in Production Example 4 except that the corresponding amine compounds were used instead of the amino compound used in Production Example 4.

Example 51

A polyester film having aluminum vapor deposited (film thickness: 1.0 µm) was used as a conductive support, and a dispersion solution obtained by dissolving 2.1 g of titanium oxide (TPO55B produced by Ishihara Sangyo Kaisha, Ltd.) and 3.9 g of copolymer nylon (CM8000 produced by Toray Corp.) in a mixed solvent comprising 32.9 g of methyl alcohol and 61.1 g of dichloroethane was coated thereon and dried to form an interlayer having a film thickness of 1 µm.

1 part by weight of the crystalline oxotitanylphthalocyanine of the invention obtained in Production Example 1 and 1 part by weight of polybutyral (Essrec BL-1 produced by Sekisui Chemical Co., Ltd.) were mixed with 70 parts by weight of ethyl methyl ketone, and was subjected to a dispersion treatment along with 70 parts by weight of glass beads having a diameter of 2 mm for 5 hours in a paint conditioner apparatus (produced by Redlevel Corp.). The resulting solution was coated on the interlayer and dried to form a charge generating layer having a film thickness of 0.4 µm.

10 parts by weight of a bisenamine compound of the example compound BE62 of the invention as a charge transporting substance, 8 parts by weight of the polycarbonate resin V1 and 2 parts by weight of the polyester resin represented by formula (X) as a binder, 0.2 part by weight of α-tocopherol as an antioxidant and 0.0002 part by weight of polydimethylsiloxane as a leveling agent were mixed, and a solution of 15% by weight was produced by using tetrahydrofuran as a solvent. The solution was coated on the charge generating layer and dried to form a charge transporting layer having a film thickness of 20 µm.

Thus, a laminated type electrophotographic photoreceptor sample 11 comprising the charge generating layer and the charge transporting layer was obtained.

Example 52

A polyester film having aluminum vapor deposited (film thickness: 1.0 µm) was used as a conductive support, and the solution obtained by the dispersion treatment in Example 51 was directly coated thereon and dried to form a charge generating layer having a film thickness of 0.4 µm.

A charge transporting layer was formed in the same manner as in Example 51 except that 10 parts by weight of a bisenamine compound of the example compound BE69 of the invention was used as a charge transporting substance, and 0.5 part by weight of 2,6-di-t-butyl-4-methylphenol was used as an antioxidant, so as to obtain a function separated type photoreceptor sample 12.

Example 53

A function separated type photoreceptor sample 13 was obtained in the same manner as in Example 51 except that a copolymer resin of vinyl chloride and vinyl acetate (Essrec M-1 produced by Sekisui Chemical Co., Ltd.) was used as the resin of the charge generating layer, and a bisenamine compound of the example compound BE73 of the invention was used as the charge transporting substance.

Example 54

A polyester film having aluminum vapor deposited (film thickness: 1.0 µm) was used as a conductive support, and a dispersion solution obtained by dissolving 2.1 g of titanium oxide (TPO55B produced by Ishihara Sangyo Kaisha, Ltd.) and 3.9 g of copolymer nylon (CM8000 produced by Toray Corp.) in a mixed solvent comprising 32.9 g of methyl alcohol and 61.1 g of dichloroethane was coated thereon and dried to-form an interlayer having a film thickness of 1 μm.

A charge generating layer having a film thickness of 0.4 μm was formed on the interlayer in the same manner as in Example 51 except that 1 parts by weight of the crystalline oxotitanylphthalocyanine of the invention obtained in Production Example 2.

10 parts by weight of a bisenamine compound of the example compound BE62 of the invention as a charge transporting substance, 8 parts by weight of the polycarbonate resin V1 and 2 parts by weight of the polyester resin represented by formula (X) as a binder, 0.5 part by weight of 2,6-di-t-butyl-4-methylphenol as an antioxidant and 0.0002 part by weight of polydimethylsiloxane as a leveling agent were mixed, and a solution of 15% by weight was produced by using dichloromethane as a solvent. The solution was coated on the charge generating layer and dried to form a charge transporting layer having a film thickness of 25 μm.

Thus, a function separated type electrophotographic photoreceptor sample 14 comprising the charge generating layer and the charge transporting layer was obtained.

Example 55

A function separated type photoreceptor sample 15 was obtained in the same manner as in Example 54 except that a bisenamine-styryl compound of the example compound BE85 of the invention was used as the charge transporting substance.

Example 56

A polyester film having aluminum vapor deposited (film thickness: 1.0 μm) was used as a conductive support, and a dispersion solution obtained by dissolving 2.1 g of titanium oxide (TPO55B produced by Ishihara Sangyo Kaisha, Ltd.) and 3.9 g of copolymer nylon (CM8000 produced by Toray Corp.) in a mixed solvent comprising 32.9 g of methyl alcohol and 61.1 g of dichloroethane was coated thereon and dried to form an interlayer having a film thickness of 1 μm.

A charge generating layer having a film thickness of 0.4 μm was formed on the interlayer in the same manner as in Example 54 except that 1 parts by weight of the crystalline oxotitanylphthalocyanine of the invention obtained in Production Example 3.

10 parts by weight of a bisenamine compound of the example compound BE62 of the invention as a charge transporting substance, 8 parts by weight of the polycarbonate resin V1 and 2 parts by weight of the polyester resin represented by formula (X) as a binder, 0.5 part by weight of 2,6-di-t-butyl-4-methylphenol as an antioxidant and 0.0002 part by weight of polydimethylsiloxane as a leveling agent were mixed, and a solution of 15% by weight was produced by using dichloromethane as a solvent. The solution was coated on the charge generating layer and dried to form a charge transporting layer having a film thickness of 25 μm.

Thus, a function separated type electrophotographic photoreceptor sample 16 comprising the charge generating layer and the charge transporting layer was obtained.

Example 57

A function separated type photoreceptor sample 17 was obtained in the same manner as in Example 56 except that a bisenamine-styryl compound of the example compound BE89 of the invention was used as the charge transporting substance.

Example 58

A polyester film having aluminum vapor deposited (film thickness: 1.0 μm) was used as a conductive support, and a dispersion solution obtained by dissolving 2.1 g of titanium oxide (TPO55B produced by Ishihara Sangyo Kaisha, Ltd.) and 3.9 g of copolymer nylon (CM8000 produced by Toray Corp.) in a mixed solvent comprising 32.9 g of methyl alcohol and 61.1 g of dichloroethane was coated thereon and dried to form an interlayer having a film thickness of 1 μm.

1 part by weight of the crystalline oxotitanylphthalocyanine of the invention obtained in Production Example 1 as a charge generating substance, 10 parts by weight of a bisenamine compound of the example compound BE71 of the invention as a charge transporting substance, 8 parts by weight of the polycarbonate resin V1 and 2 parts by weight of the polyester resin represented by formula (X) as a binder, and 0.5 part by weight of 2,6-di-t-butyl-4-methylphenol as an antioxidant were mixed, and a solution of 15% by weight was produced by using dichloromethane as a solvent, which was dispersed along with 70 parts by weight of glass beads for 5 hours in a paint conditioner apparatus (produced by Redlevel Corp.).

The resulting solution was coated on the interlayer and dried to form a photosensitive layer having a film thickness of 25 μm.

Thus, a single-layer photoreceptor sample 18 having a charge transporting layer having a charge generating substance dispersed therein was obtained.

Comparative Example 39

A function separated type photoreceptor sample 19 was obtained in the same manner as in Example 51 except that the oxotitanylphthalocyanine intermediate crystal having the X-ray diffraction pattern shown in FIG. 5 obtained during the Production Example 1 was used.

Comparative Example 40

A function separated type photoreceptor sample 20 was obtained in the same manner as in Example 52 except that the oxotitanylphthalocyanine intermediate crystal having the X-ray diffraction pattern shown in FIG. 5 obtained during the Production Example 1 was used.

Comparative Example 41

A laminated type photoreceptor sample 21 was obtained in the same manner as in Example 51 except that a known 4-(dimethylamino)-benzaldehyde-N,N-diphenylhydrazone compound was used as a charge transporting substance.

Comparative Example 42

A laminated type photoreceptor sample 22 was obtained in the same manner as in Example 51 except that a polycarbonate resin comprising bisphenol A as a monomer component was used as a binder resin in the charge generating layer.

Comparative Example 43

A laminated type photoreceptor sample 23 was obtained in the same manner as in Example 52 except that a-tocopherol was not added to the charge generating layer.

Comparative Example 44

A laminated type photoreceptor sample 24 was obtained in the same manner as in Example 51 except that 2,6-di-t-butyl-4-methylphenol was not added to the charge generating layer.

Comparative Example 45

A laminated type photoreceptor sample 25 was produced in the same manner as in Example 51 except that the polydimethylsiloxane was not added to the charge generating layer, but unevenness was formed on the surface of the photoreceptor, and a uniform coated film could not be obtained.

Comparative Example 46

A single-layer type photoreceptor sample 26 was obtained in the same manner as in Example 58 except that the oxotitanylphthalocyanine intermediate crystal having the X-ray diffraction pattern shown in FIG. 5 obtained during the Production Example 1 was used as the charge transporting substance.

Comparative Example 47

A single-layer type photoreceptor sample 27 was obtained in the same manner as in Example 58 except that a known 4-(diethylamino)-benzaldehyde-N,N-diphenylhydrazone compound was used as a charge transporting substance.

Comparative Example 48

A single-layer type photoreceptor sample 28 was obtained in the same manner as in Example 58 except that a polycarbonate resin comprising bisphenol A as a monomer component was used as a binder polymer.

Comparative Example 49

A single-layer type photoreceptor sample 29 was obtained in the same manner as in Example 58 except that 2,6-di-t-butyl-4-methylphenol was not added.

The samples 11 to 29 produced in the Examples are shown in Table 38.

TABLE 38

|  |  | Charge generating substance | Charge transporting substance | Binder Resin |  |  |  |
| --- | --- | --- | --- | --- | --- | --- | --- |
| Sample 11 | Example 51 | Production Example 1 | Example Compound BE62 | V1/X = 8/2 | α-tocopherol | polydimethylsiloxane |
| Sample 12 | Example 52 | Production Example 1 | Example Compound BE69 | V1/X = 8/2 | 2,6-di-t-butyl-4-methylphenol | polydimethylsiloxane |
| Sample 13 | Example 53 | Production Example 1 | Example Compound BE73 | V1/X = 8/2 | α-tocopherol | polydimethylsiloxane |
| Sample 14 | Example 54 | Production Example 2 | Example Compound BE62 | V1/X = 8/2 | 2,6-di-t-butyl-4-methylphenol | polydimethylsiloxane |
| Sample 15 | Example 55 | Production Example 2 | Example Compound BE85 | V1/X = 8/2 | 2,6-di-t-butyl-4-methylphenol | polydimethylsiloxane |
| Sample 16 | Example 56 | Production Example 3 | Example Compound BE62 | V1/X = 8/2 | 2,6-di-t-butyl-4-methylphenol | polydimethylsiloxane |
| Sample 17 | Example 57 | Production Example 3 | Example Compound BE89 | V1/X = 8/2 | 2,6-di-t-butyl-4-methylphenol | polydimethylsiloxane |
| Sample 18 | Example 58 | Production Example 1 | Example Compound BE71 | V1/X = 8/2 | 2,6-di-t-butyl-4-methylphenol | polydimethylsiloxane |
| Sample 19 | Comparative Example 39 | Intermediate | Example Compound BE62 | V1/X = 8/2 | α-tocopherol | polydimethylsiloxane |
| Sample 20 | Comparative Example 40 | Intermediate | Example Compound BE69 | V1/X = 8/2 | 2,6-di-t-butyl-4-methylphenol | polydimethylsiloxane |
| Sample 21 | Comparative Example 41 | Production Example 1 | Conventional Compound | V1/X = 8/2 | α-tocopherol | polydimethylsiloxane |
| Sample 22 | Comparative Example 42 | Production Example 1 | Example Compound BE62 | Polycarbonate | α-tocopherol | polydimethylsiloxane |
| Sample 23 | Comparative Example 43 | Production Example 1 | Example Compound BE62 | V1/X = 8/2 | Not contained | polydimethylsiloxane |
| Sample 24 | Comparative Example 44 | Production Example 1 | Example Compound BE62 | V1/X = 8/2 | Not contained | polydimethylsiloxane |
| Sample 25 | Comparative Example 45 | Production Example 1 | Example Compound BE62 | V1/X = 8/2 | α-tocopherol | Not contained |
| Sample 26 | Comparative Example 46 | Intermediate | Example Compound BE71 | V1/X = 8/2 | 2,6-di-t-butyl-4-methylphenol | polydimethylsiloxane |
| Sample 27 | Comparative Example 47 | Production Example 1 | Conventional Compound | V1/X = 8/2 | α-tocopherol | polydimethylsiloxane |
| Sample 28 | Comparative Example 48 | Production Example 1 | Example Compound BE71 | Polycarbonate | 2,6-di-t-butyl-4-methylphenol | polydimethylsiloxane |
| Sample 29 | Comparative Example 49 | Production Example 1 | Example Compound BE71 | V1/X = 8/2 | Not contained | polydimethylsiloxane |

The electrophotographic photoreceptors thus produced were evaluated for electrophotographic characteristics by a testing apparatus for electrostatic recording paper (EPA-8200 produced by Kawaguchi Electric Works Co., Ltd.). The measurement conditions were an applied voltage of −6 kV and static of No. 3, and an exposure amount $E_{1/2}$ ($\mu J/cm^2$) of monochrome light of 780 nm (radiation intensity: 2 $\mu W/cm^2$) isolated with an interference filter required for attenuating from −500 V to −250 V and an initial potential $V_0$ (−V) were measured.

The single-layer type electrophotographic photoreceptors were measured by using the same testing apparatus for electrostatic recording paper under the conditions where the applied voltage was +6 kV and static was No. 3, and an exposure amount $E_{1/2}$ ($\mu J/cm^2$) of monochrome light of 780 nm (radiation intensity: 10 $\mu W/cm^2$) isolated with an interference filter required for attenuating from +500 V to +250 V and an initial potential $V_0$ (+V) were measured.

A commercially available digital duplicator (AR5130 produced by Sharp) was modified, and the samples shown in Table 38 were used as a drum part. Continuous blank copy was conducted for 30,000 times (non-copy aging), and the charging potential and the exposure amount $E_{1/2}$ were measured by using the testing apparatus for electrostatic recording paper before and after the continuous blank copy. Furthermore, continuous blank copy (non-copy aging) was conducted for 30,000 times under a high temperature and high humidity condition (35° C., 85%), and the residual potential was measured before and after the continuous blank copy.

The degree of decrease in film thickness of the photoreceptor was measured by a wear testing apparatus (produced by Suga Testing Machine Co., Ltd.). The measurement conditions were aluminum oxide #2000 as an abrasion material, a load of 200 g×f, and a number of abrasion of 10,000.

The results obtained are shown in Table 39.

TABLE 39

| | Charging potential (V) | | Half-value exposure amount ($\mu J/cm^2$) | | Residual potential (V) | | Amount of Abrasion (mg) |
|---|---|---|---|---|---|---|---|
| | Initial | After 30,000 times | Initial | After repetition | Initial | After 30,000 times | |
| Example 51 | −508 | −491 | 0.04 | 0.07 | −15 | −31 | 2.12 |
| Example 52 | −515 | −494 | 0.12 | 0.14 | −20 | −32 | 2.04 |
| Example 53 | −511 | −488 | 0.08 | 0.12 | −13 | −34 | 2.27 |
| Example 54 | −508 | −484 | 0.08 | 0.09 | −11 | −24 | 2.26 |
| Example 55 | −515 | −497 | 0.07 | 0.11 | −14 | −29 | 2.31 |
| Example 56 | −504 | −481 | 0.06 | 0.08 | −14 | −19 | 2.16 |
| Example 57 | −498 | −478 | 0.08 | 0.09 | −15 | −20 | 2.20 |
| Example 58 | +510 | +498 | 0.40 | 0.56 | +25 | +45 | 2.34 |
| Comparative Example 39 | −491 | −450 | 0.18 | 0.43 | −18 | −53 | 2.27 |
| Comparative Example 40 | −478 | −420 | 0.22 | 0.44 | −21 | −63 | 2.18 |
| Comparative Example 41 | −498 | −450 | 0.18 | 0.42 | −18 | −102 | 2.24 |
| Comparative Example 42 | −478 | −420 | 0.22 | 0.44 | −21 | −63 | 4.85 |
| Comparative Example 43 | −460 | −440 | 0.18 | 0.42 | −18 | −123 | 2.10 |
| Comparative Example 44 | −460 | −440 | 0.18 | 0.42 | −18 | −123 | 2.45 |
| Comparative Example 45 | −498 | — | 0.18 | — | −18 | — | 2.37 |
| Comparative Example 46 | +508 | +462 | 0.18 | 0.42 | +30 | +68 | 2.50 |
| Comparative Example 47 | +505 | +456 | 0.22 | 0.44 | +31 | +74 | 2.71 |
| Comparative Example 48 | +504 | +497 | 0.18 | 0.24 | +20 | +34 | 5.01 |
| Comparative Example 49 | +501 | +470 | 0.22 | 0.26 | +30 | +141 | 2.64 |

As shown in Table 39, it has been understood that the samples of Examples 51 to 58 had potential deterioration of the charging potential after the durability test (30,000 times) that was sufficiently smaller than the conventional samples of Comparative Examples 39 to 49; had an initial sensitivity (half-value exposure amount) that was sufficiently higher than Comparative Examples; and exhibited increase in residual potential after the durability test that is sufficiently small.

Furthermore, the characteristics of the samples of the invention have been confirmed that the increase in residual potential after the durability test (30,000 times) under a high temperature and high humidity condition was sufficiently smaller than the conventional samples.

Production Example 40

(Production of Bishydrazone Compound Shown by Example Compound BB63)

2.0 g (1.0 equivalent) of 5-formyl-2-acetylbenzo[b]furan was dissolved in 10 ml of ethanol, and 1.36 g (1.05 equivalents) of N-methyl-N-phenylhydrazine and 0.1 ml of acetic acid as a catalyst were added thereto at 0° C. Thereafter, it was maintained at room temperature, and stirred for 15 hours.

After confirming the completion of the reaction by thin layer chromatography (TLC), the resulting solid matter was filtered and washed with ethanol. The solid matter was recrystallized from ethanol to obtain 2.73 g of a 5-formyl-2-acetylbenzo[b]furan-N-methyl-N-phenylhydrazine monohydrazone compound as a light yellow crystal (yield: 87.9%).

1.0 g (1.0 equivalent) of resulting 5-formyl-2-acetylbenzo[b]furan-N-methyl-N-phenylhydrazone was dissolved in 6 ml of ethanol, and 0.51 g (1.1 equivalents) of N-aminoindoline and 0.05 ml of acetic acid as a catalyst were added thereto at room temperature. Thereafter, it was maintained at 60 to 70° C., and heated and stirred for 5 hours.

After confirming the completion of the reaction by TLC, the reaction mixture was allowed to be cooled, and the resulting solid matter was filtered and washed with ethanol. The solid matter was recrystallized from ethanol to obtain 2.73 g of the objective bishydrazone compound (example compound BB63) as a yellow crystal (yield: 93.0%).

Figure 14:
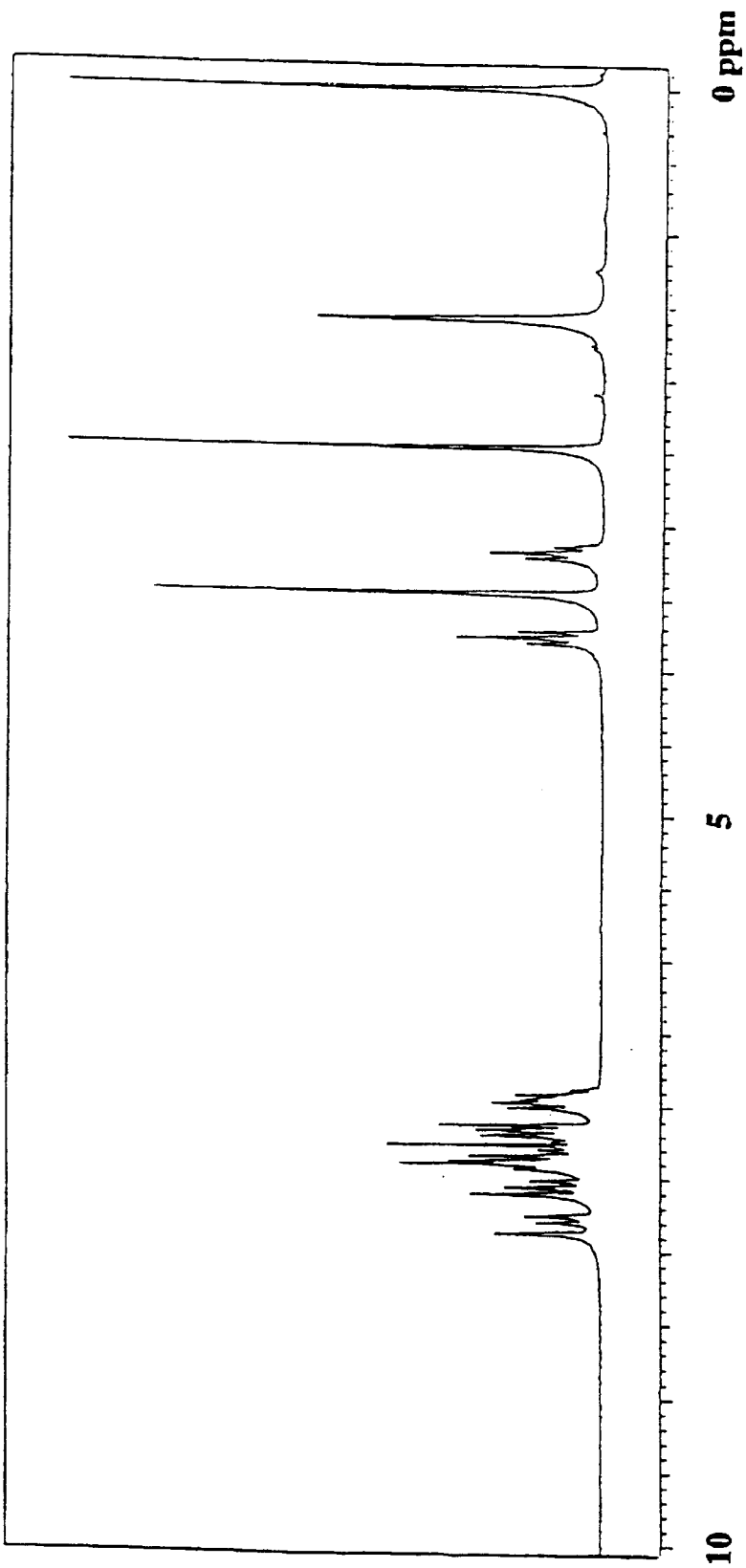
FIG. 14 is an $^1$H-NMR spectrum of an example compound BB63 in heavy chloroform.
Figure 15:
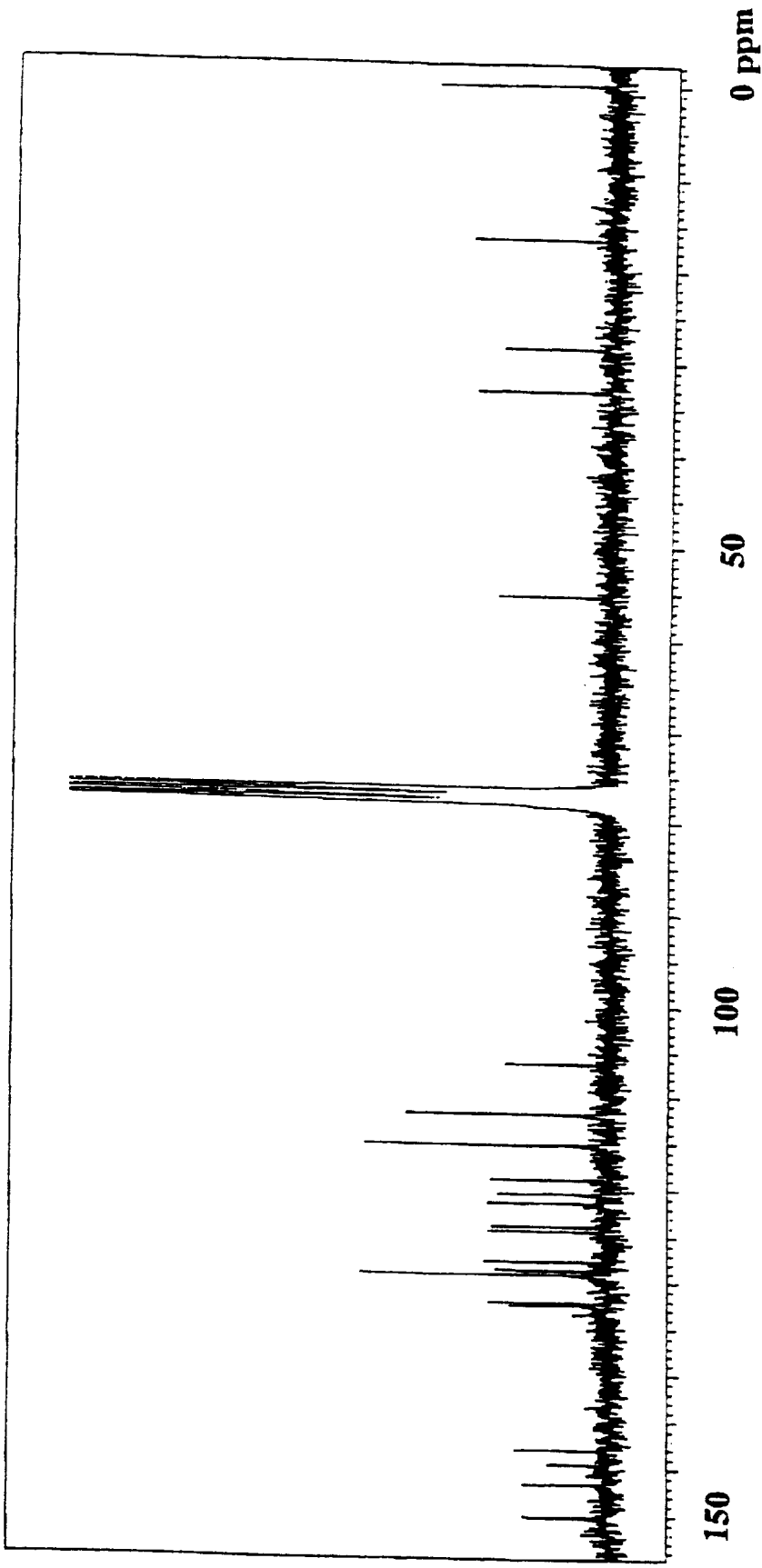
FIG. 15 is a $^{13}$C-NMR spectrum of the example compound BB63 in heavy chloroform.
Figure 16:
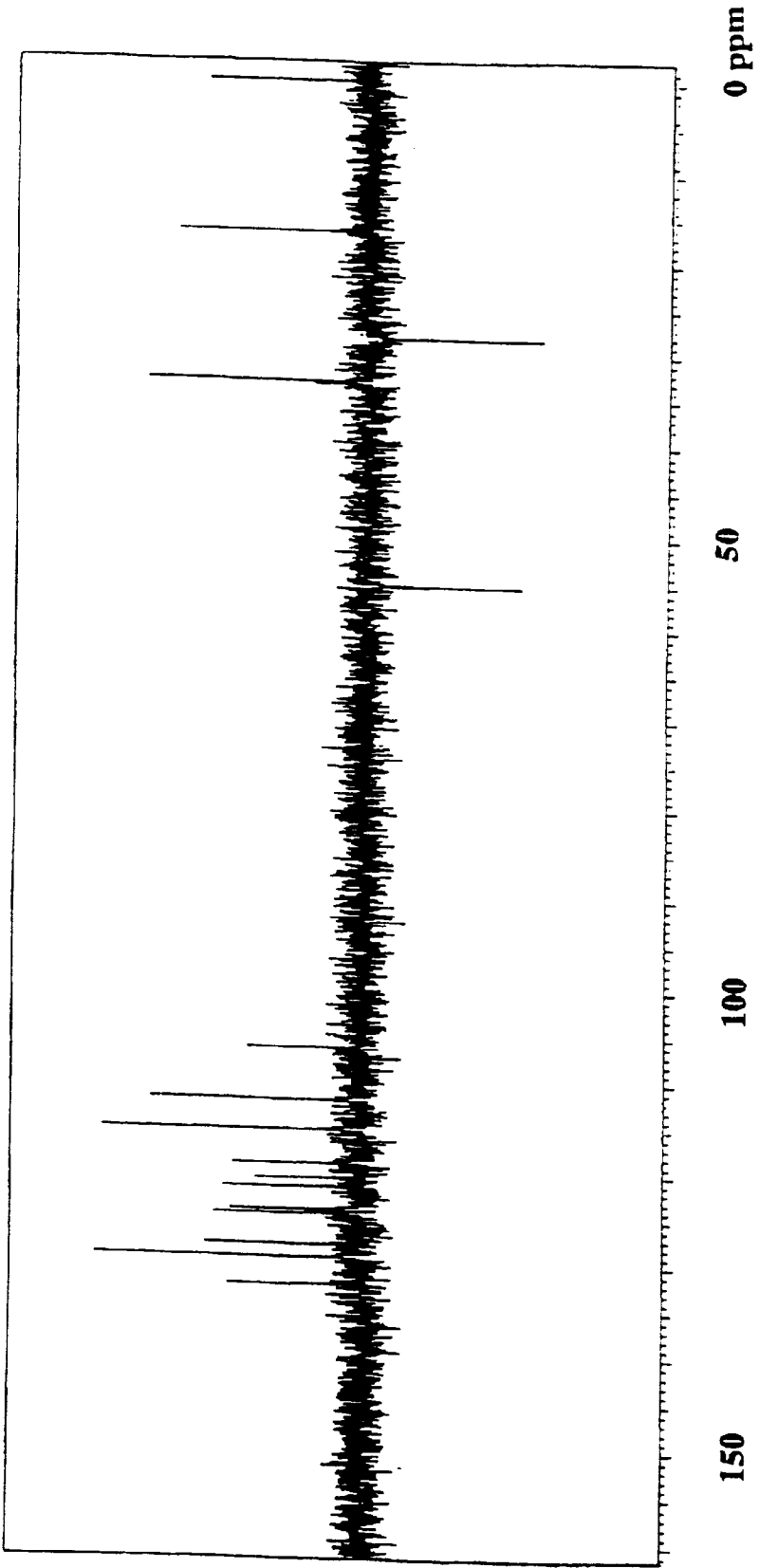
FIG. 16 is a DEPT135$^{13}$C-NMR spectrum of the example compound BB63 in heavy chloroform.

The structure of the resulting bishydrazone compound (example compound BB63) was confirmed by measuring with $^1$H-NMR, normal $^{13}$C-NMR and DEPT135$^{13}$C-NMR. The measurement result of $^1$H-NMR is shown in FIG. 14, the measurement result of normal $^{13}$C-NMR is shown in FIG. 15, and the measurement result of DEPT135$^{13}$C-NMR is shown in FIG. 16. These NMR spectra well support the structure of the objective bishydrazone compound (example compound BB63).

Production Example 41

(Production of Bishydrazone Compound Shown by Example Compound BB62)

2.0 g (1.0 equivalent) of 5-formyl-2-acetylbenzo[b]furan was dissolved in 10 ml of ethanol, and 1.47 g (1.03 equivalents) of N-aminoindoline and 0.1 ml of acetic acid as a catalyst were added thereto at 0° C. Thereafter, it was maintained at room temperature, and stirred for 15 hours. After confirming the completion of the reaction with TLC, the resulting solid matter was filtered and washed with ethanol. The solid matter was recrystallized from ethanol to obtain 3.09 g of 5-formyl-2-acetylbenzo[b]furan-N-aminoindoline monohydrazone as a light yellow crystal (yield: 95.5%).

1.0 g (1.0 equivalent) of resulting 5-formyl-2-acetylbenzo[b]furan-N-aminoindoline monohydrazone was dissolved in 6 ml of ethanol, and 0.48 g (1.2 equivalents) of N-methyl-N-phenylhydrazine and 0.05 ml of acetic acid as a catalyst were added thereto. Thereafter, it was maintained at 60 to 70° C., and heated and stirred for 5 hours. After confirming the completion of the reaction by TLC, the reaction mixture was allowed to be cooled, and the resulting solid matter was filtered and washed with ethanol. The solid matter was recrystallized from ethanol to obtain 1.28 g of the objective bishydrazone compound (example compound BB62) as a yellow crystal (yield: 91.8%).

Figure 17:
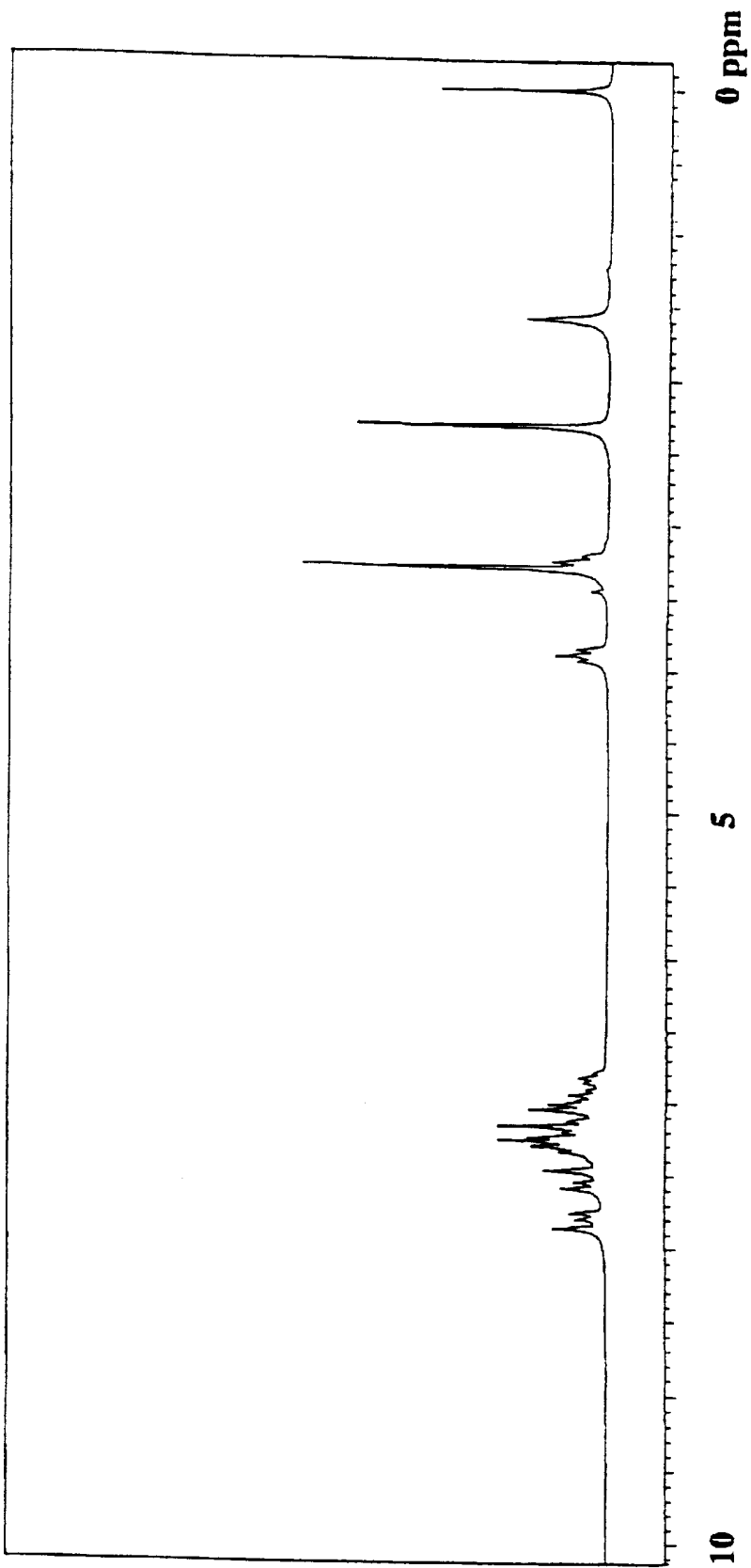
FIG. 17 is an $^1$H-NMR spectrum of an example compound BB62 in heavy chloroform.
Figure 18:
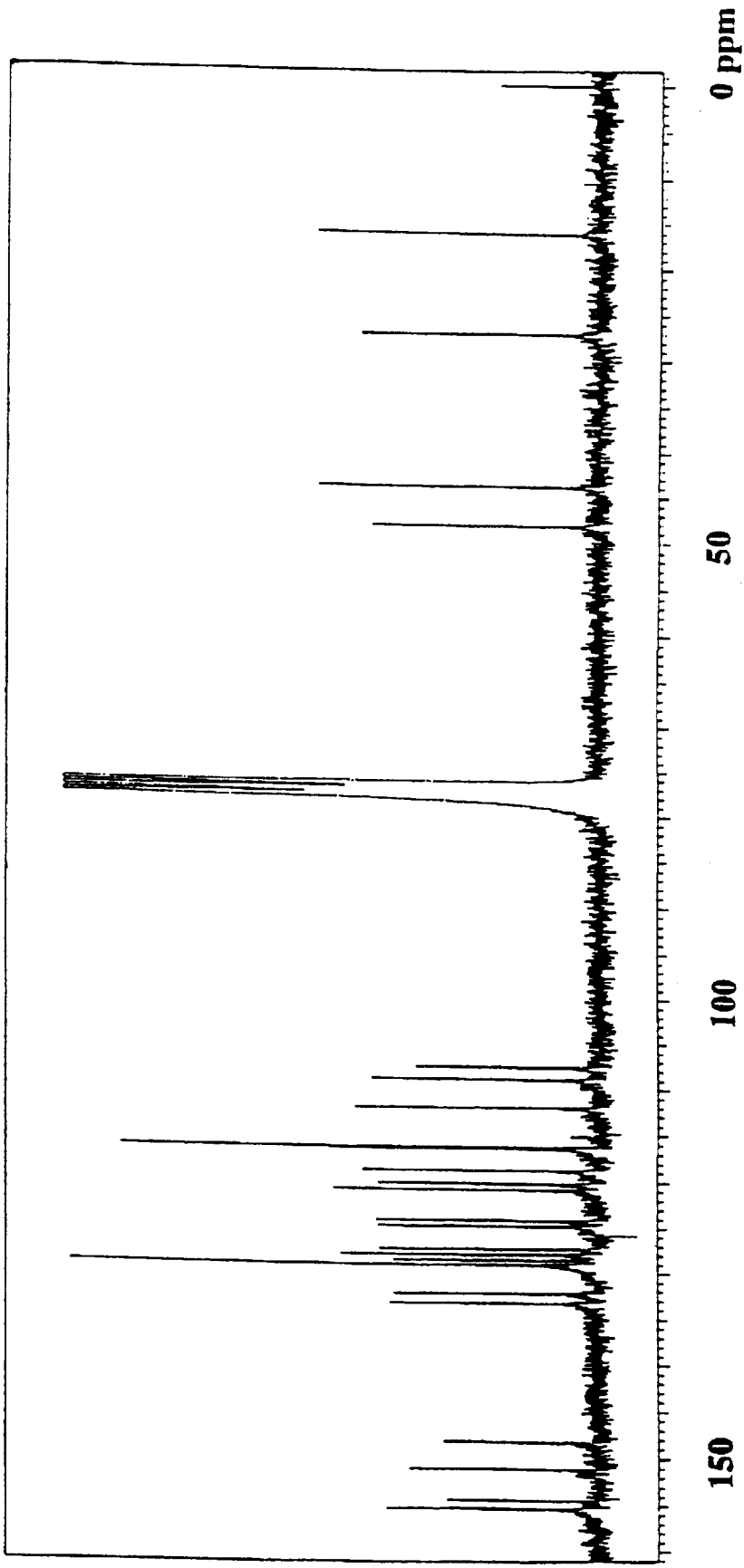
FIG. 18 is a $^{13}$C-NMR spectrum the an example compound BB62 in heavy chloroform.
Figure 19:
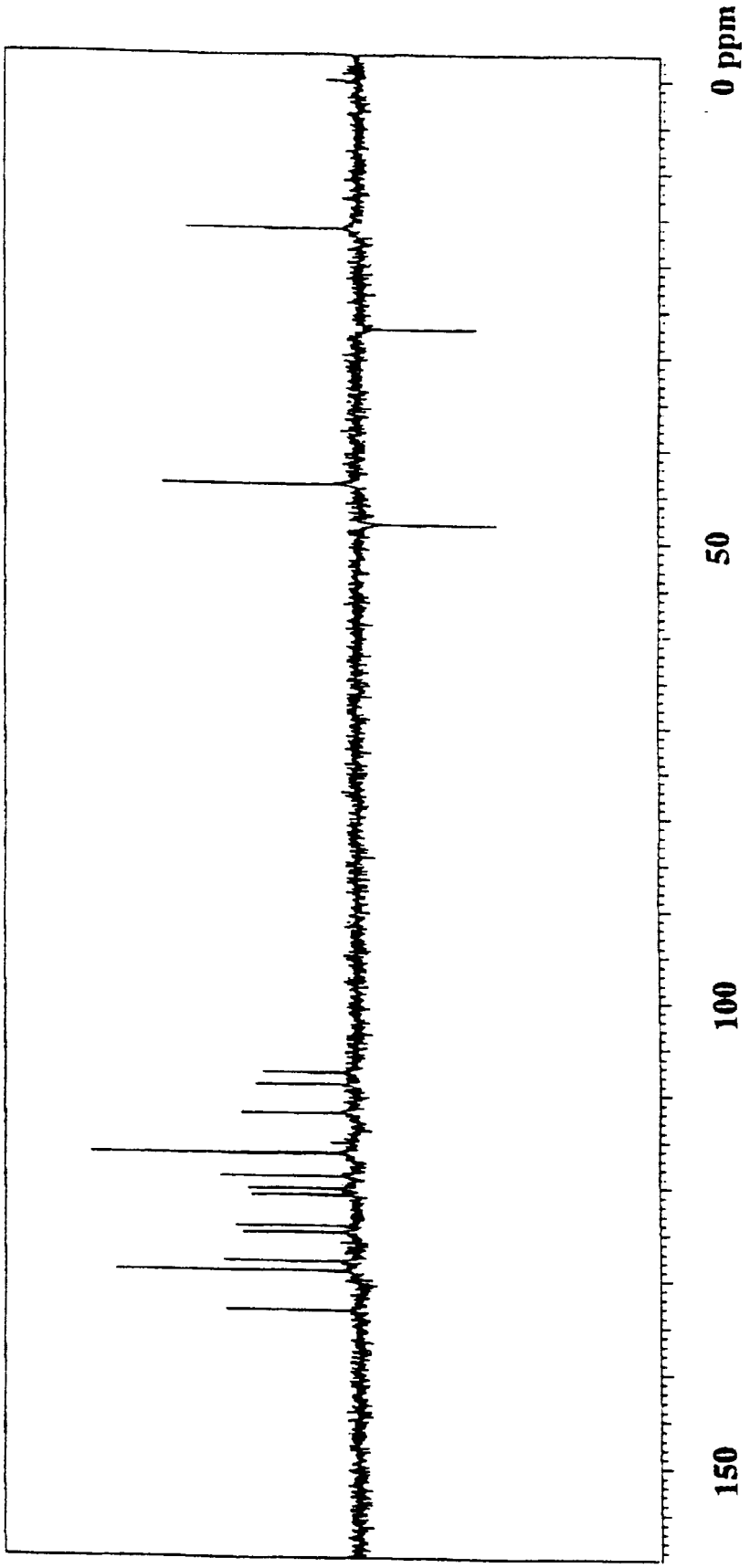
FIG. 19 is a DEPT135$^{13}$C-NMR spectrum of the example compound BB62 in heavy chloroform.

The structure of the resulting bishydrazone compound (example compound BB62) was confirmed in the same manner as in Production Example 40. The measurement result of $^1$H-NMR is shown in FIG. 17, the measurement result of normal $^{13}$C-NMR is shown in FIG. 18, and the measurement result of DEPT135$^{13}$C-NMR is shown in FIG. 19. These NMR spectra well support the structure of the objective bishydrazone compound (example compound B-62).

Production Example 42

(Production of Bishydrazone Compound Shown by Example Compound BB61)

1.0 g (1.0 equivalent) of 5-formyl-2-acetylbenzo[b]furan was dissolved in 10 ml of ethanol, and 1.56 g (2.4 equivalents) of N-methyl-N-phenylhydrazine and 0.1 ml of acetic acid as a catalyst were added thereto at room temperature. Thereafter, it was heated to 70 to 80° C. and stirred for 15 hours. After confirming the completion of the reaction with TLC, the resulting solid matter was filtered and washed with ethanol. The solid matter was recrystallized from ethanol to obtain 1.95 g of the objective bishydrazone compound (example compound BB61) as a light yellow crystal (yield: 92.6%).

Figure 20:
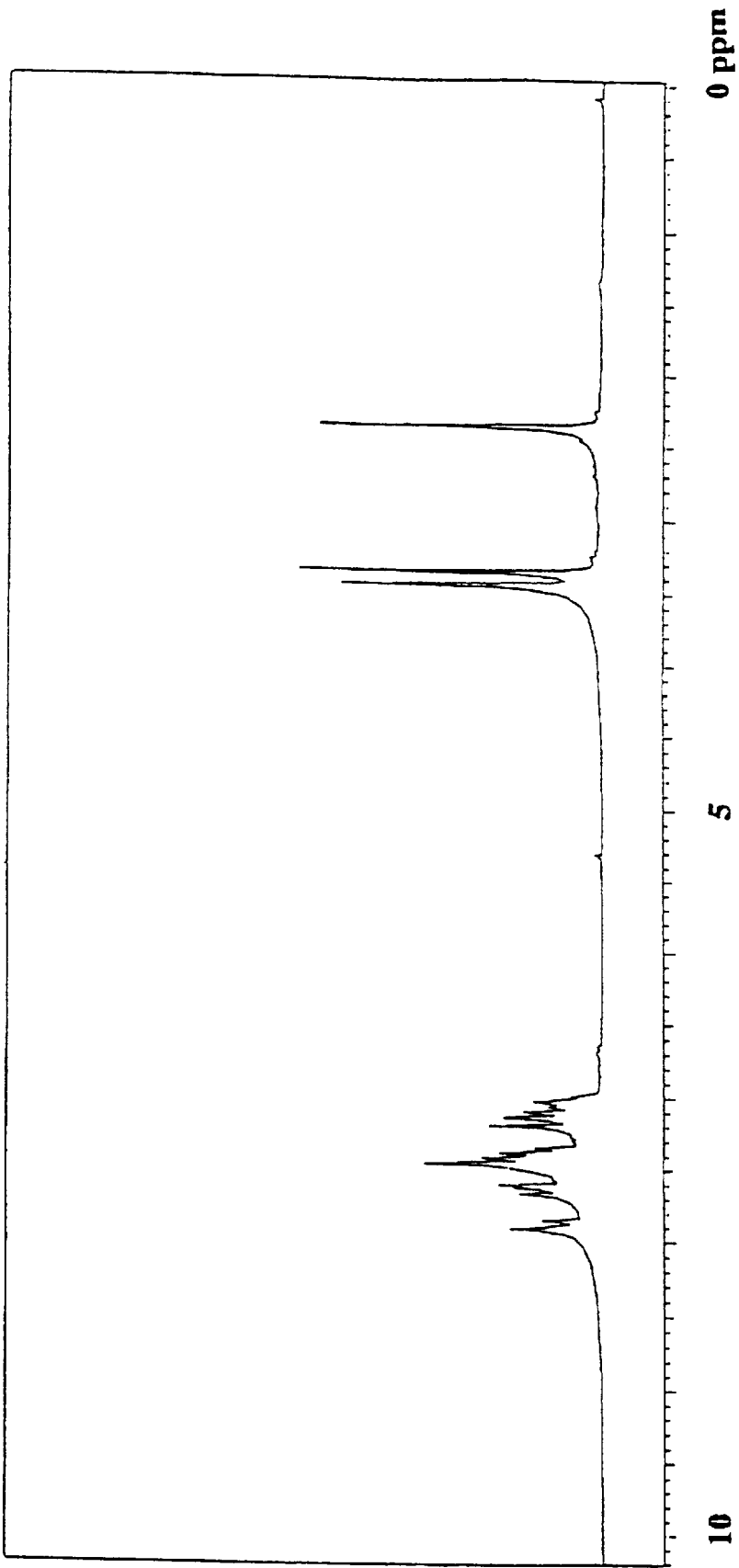
FIG. 20 is an $^1$H-NMR spectrum of an example compound BB61 in heavy chloroform.
Figure 21:
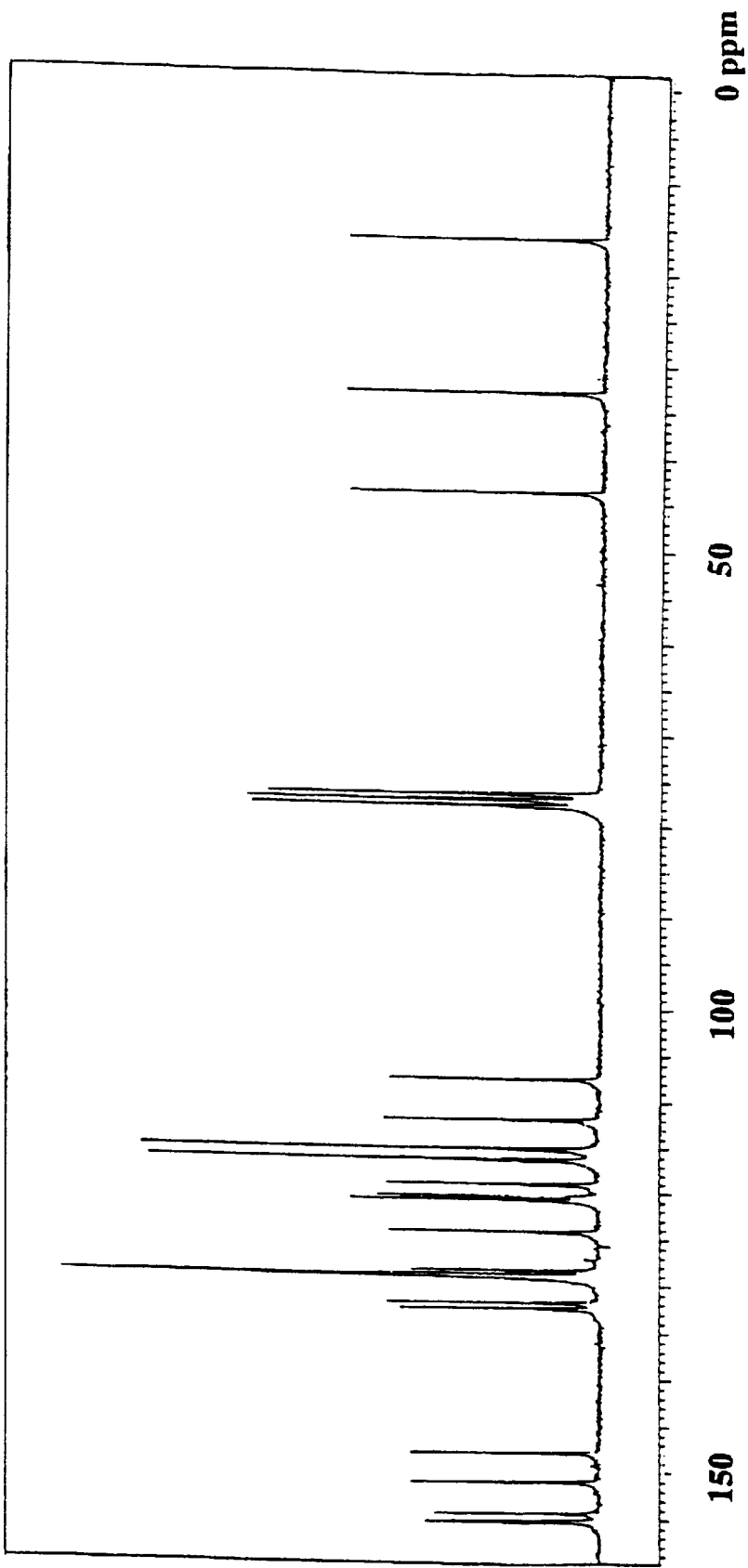
FIG. 21 is a $^{13}$C-NMR spectrum of the example compound BB61 in heavy chloroform.
Figure 22:
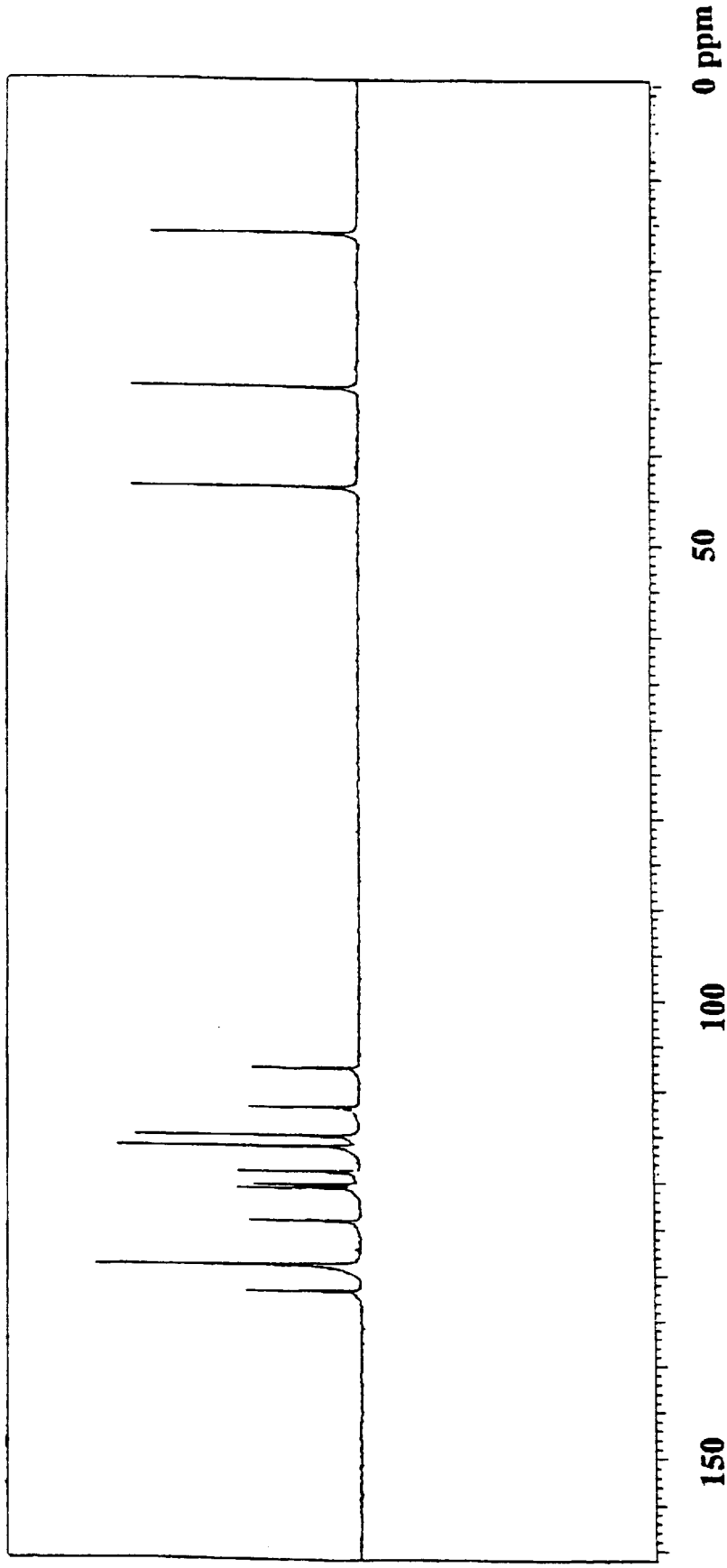
FIG. 22 is a DEPT135$^{13}$C-NMR spectrum of the example compound BB61 in heavy chloroform.

The structure of the resulting bishydrazone compound (example compound BB61) was confirmed in the same manner as in Production Example 40. The measurement result of $^1$H-NMR is shown in FIG. 20, the measurement result of normal $^{13}$C-NMR is shown in FIG. 21, and the measurement result of DEPT135$^{13}$C-NMR is shown in FIG. 22. These NMR spectra well support the structure of the objective bishydrazone compound (example compound BB61).

Production Example 43

(Production of Bishydrazone Compound Shown by Example Compound BB64)

1.0 g (1.0 equivalent) of 5-formyl-2-acetylbenzo[b]furan was dissolved in 10 ml of ethanol, and 1.71 g (2.4 equivalents) of N-aminoindoline and 0.1 ml of acetic acid as a catalyst were added thereto at room temperature. Thereafter, it was heated to 70 to 80° C. and stirred for 15 hours. After confirming the completion of the reaction with TLC, the resulting solid matter was filtered and washed with ethanol. The solid matter was recrystallized from ethanol to obtain 2.10 g of the objective bishydrazone compound (example compound BB64) as a light yellow crystal (yield: 94.0%).

Figure 23:
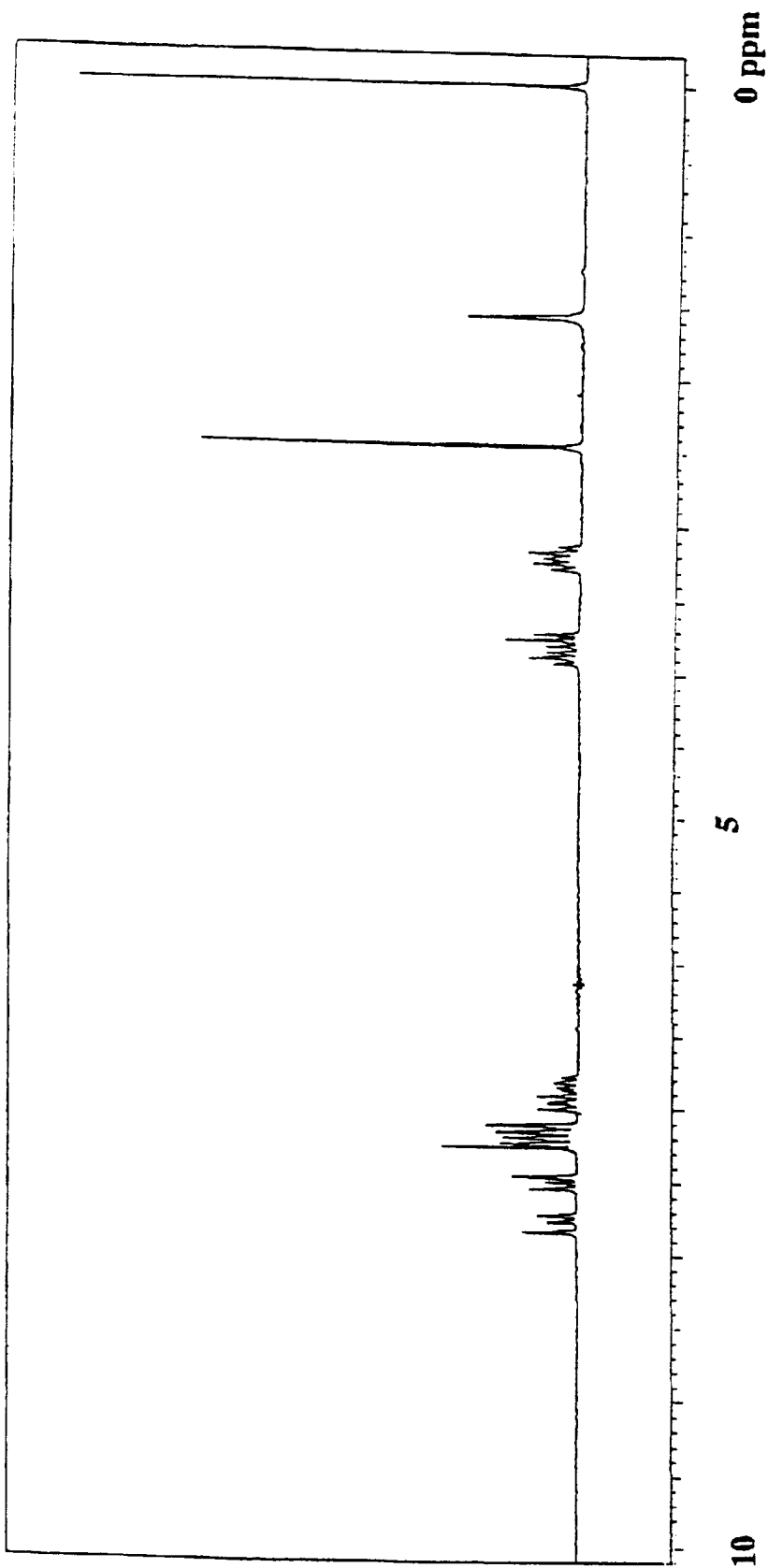
FIG. 23 is an $^1$H-NMR spectrum of an example compound BB64 in heavy chloroform.
Figure 24:
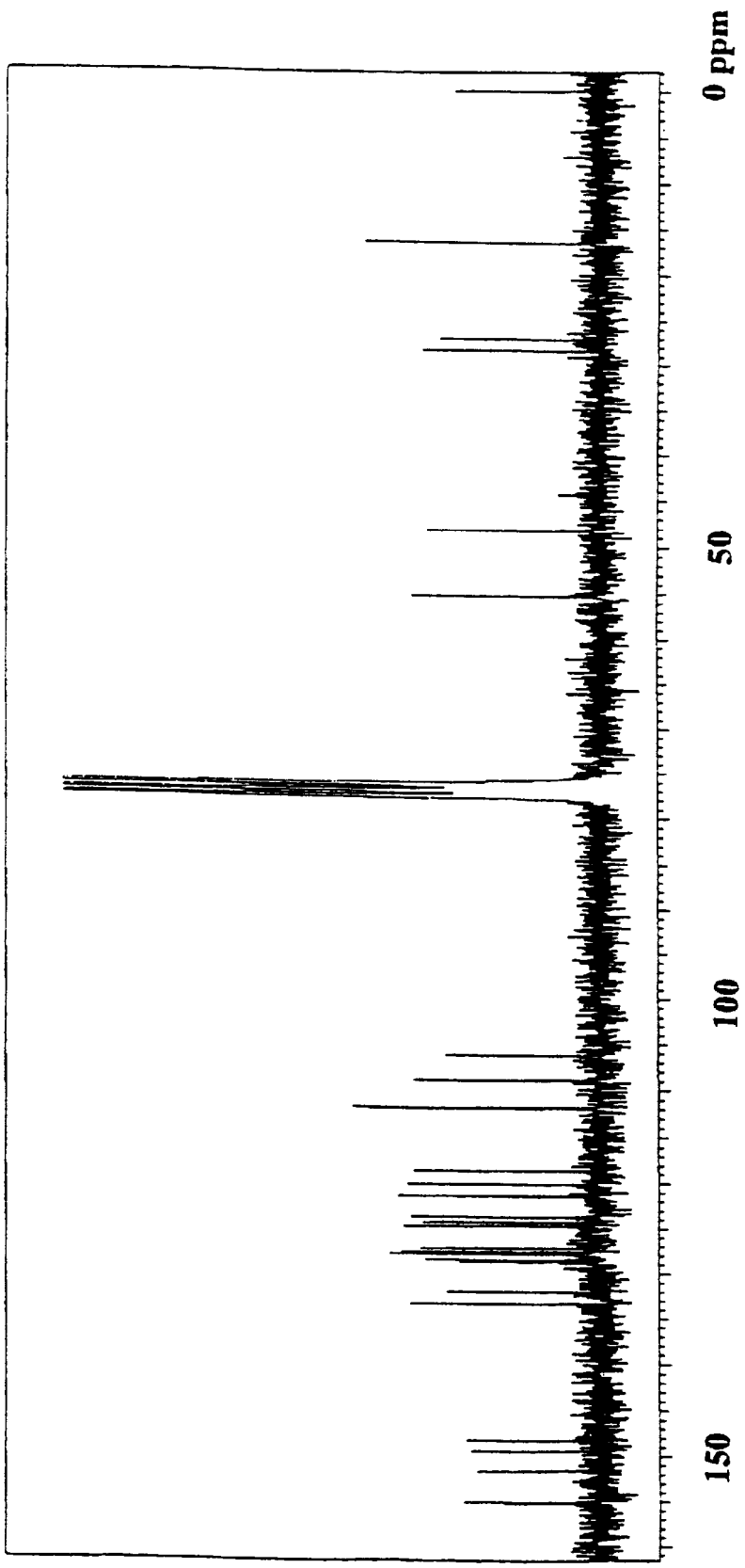
FIG. 24 is a $^{13}$C-NMR spectrum of the example compound BB64 in heavy chloroform.
Figure 25:
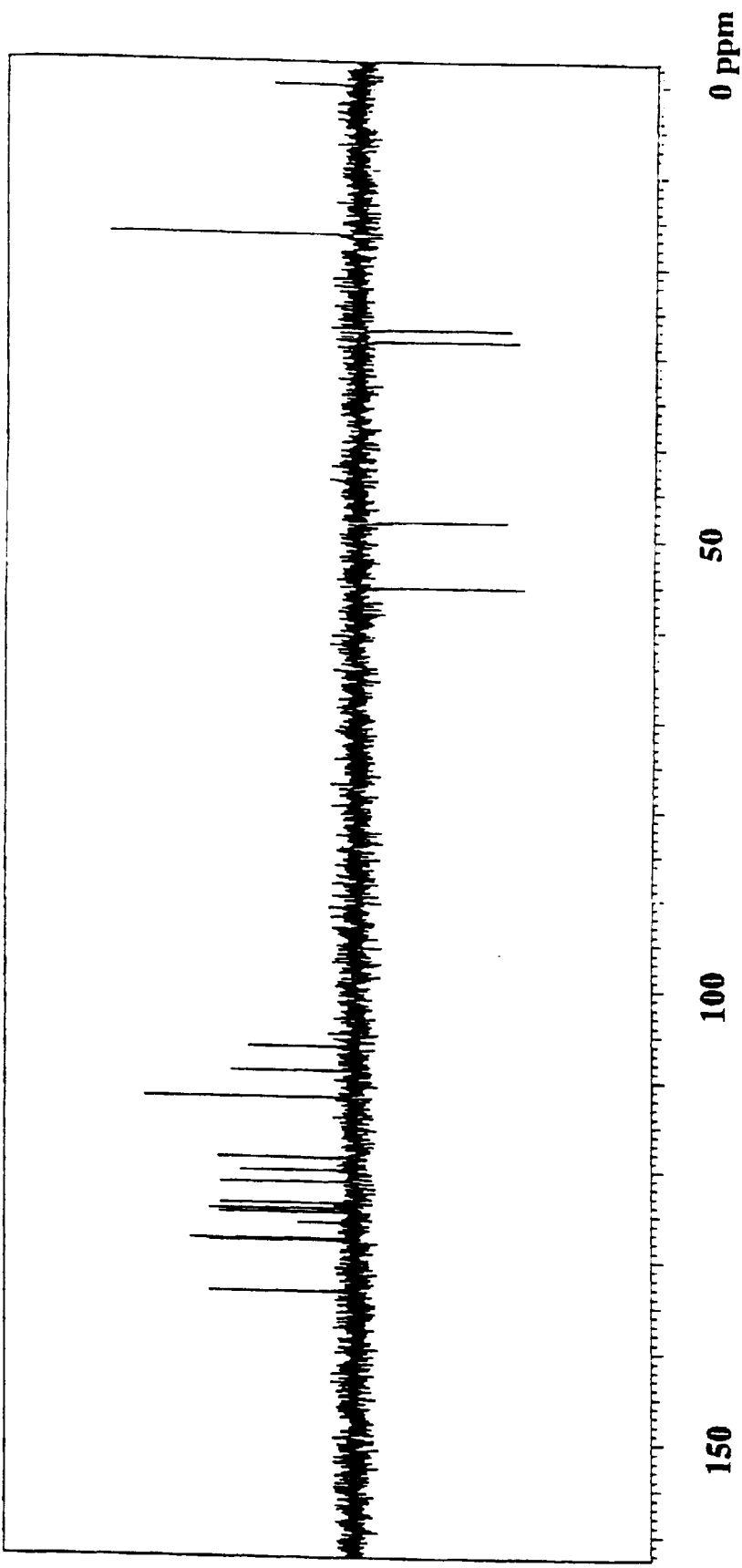
FIG. 25 is a DEPT135$^{13}$C-NMR spectrum of an example compound BB64 in heavy chloroform.

The structure of the resulting bishydrazone compound (example compound BB64) was confirmed in the same manner as in Production Example 40. The measurement result of $^1$H-NMR is shown in FIG. 23, the measurement result of normal $^{13}$C-NMR is shown in FIG. 24, and the measurement result of DEPT135$^{13}$C-NMR is shown in FIG. 25. These NMR spectra well support the structure of the objective bishydrazone compound (example compound BB64).

Example 59

A polyester film having aluminum vapor deposited was used as a conductive support, and a solution obtained by dissolving titanium oxide and copolymer nylon (CM8000 produced by Toray Corp.) in a mixed solvent comprising methyl alcohol and dichloroethane was coated thereon and dried to form an interlayer having a film thickness of 1 μm.

1 part by weight of the crystalline oxotitanylphthalocyanine obtained in Production Example 1 and 1 part by weight of polybutyral (Essrec BL-1 produced by Sekisui Chemical Co., Ltd.) were mixed with 70 parts by weight of methyl ethyl ketone, and was subjected to a dispersion treatment along with glass beads having a diameter of 2 mm in a paint conditioner apparatus (produced by Redlevel Corp.). The resulting solution was coated on the interlayer and dried to form a charge generating layer having a film thickness of 0.4 μm.

10 parts by weight of a benzofuran-bishydrazone compound of the example compound BB61 as a charge transporting substance, 8 parts by weight of the polycarbonate resin V1 and 2 parts by weight of the polyester resin represented by formula (X) as a binder, 0.2 part by weight of α-tocopherol as an antioxidant and 0.0002 part by weight of polydimethylsiloxane as a leveling agent were mixed, and a solution of 15% by weight was produced by using tetrahydrofuran as a solvent. The solution was coated on the charge generating layer to form a charge transporting layer having a dry film thickness of 20 μm.

Thus, a laminated type electrophotographic photoreceptor 8*b* shown in FIG. 2 comprising the charge generating layer and the charge transporting layer was obtained.

Example 60

A polyester film having aluminum vapor deposited was used as a conductive support, and the solution obtained by the dispersion treatment in Example 59 was directly coated thereon and dried to form a charge generating layer having a film thickness of 0.4 μm.

A charge transporting layer was formed on the charge generating layer in the same manner as in Example 59 except that a benzofuran-bishydrazone compound of the example compound BB72 was used as a charge transporting substance, and 0.5 part by weight of 2,6-di-t-butyl-4-methylphenol was used as an antioxidant, so as to obtain a laminated type electrophotographic photoreceptor 8a shown in FIG. 1 comprising the charge generating layer and the charge transporting layer.

Example 61

A laminated type electrophotographic photoreceptor 8b was obtained in the same manner as in Example 59 except that a copolymer resin of vinyl chloride and vinyl acetate (Essrec M-1 produced by Sekisui Chemical Co., Ltd.) was used as the resin of the charge generating layer, and a benzofuran-bishydrazone compound of the example compound BB84 was used as the charge transporting substance.

Example 62

A polyester film having aluminum vapor deposited was used as a conductive support, and a solution obtained by dissolving titanium oxide and copolymer nylon (CM8000 produced by Toray Corp.) in a mixed solvent comprising methyl alcohol and dichloroethane was coated thereon and dried to form an interlayer having a film thickness of 1 μm.

A charge generating layer having a film thickness of 0.4 μm was formed on the interlayer by coating a solution containing the crystalline oxotitanylphthalocyanine of the invention obtained in Production Example 2 on the interlayer and then dried.

10 parts by weight of a benzofuran-bishydrazone compound of the example compound BB61, 8 parts by weight of the polycarbonate resin V1 and 2 parts by weight of the polyester resin represented by formula (X) as a binder, 0.5 part by weight of 2,6-di-t-butyl-4-methylphenol as an antioxidant and 0.0002 part by weight of polydimethylsiloxane as a leveling agent were mixed, and a solution of 15% by weight was produced by using dichloromethane as a solvent. The solution was coated on the charge generating layer and dried to form a charge transporting layer having a film thickness of 25 μm.

Thus, a laminated type electrophotographic photoreceptor 8b shown in FIG. 2 comprising the charge generating layer and the charge transporting layer was obtained.

Example 63

A laminated type electrophotographic photoreceptor 8b was obtained in the same manner as in Example 62 except that a benzofuran-bishydrazone-styryl compound of the example compound BB96 was used as the charge transporting substance.

Example 64

A polyester film having aluminum vapor deposited was used as a conductive support, and a solution obtained by dissolving titanium oxide and copolymer nylon (CM8000 produced by Toray Corp.) in a mixed solvent comprising methyl alcohol and dichloroethane was coated thereon and dried to form an interlayer having a film thickness of 1 μm.

A charge generating layer having a film thickness of 0.4 μm was formed by coating a solution containing the crystalline oxotitanylphthalocyanine obtained in Production Example 3 on the interlayer and then dried.

10 parts by weight of a benzofuran-bishydrazone compound of the example compound BB61, 8 parts by weight of the polycarbonate resin V1 and 2 parts by weight of the polyester resin represented by formula (X) as a binder, 0.5 part by weight of 2,6-di-t-butyl-4-methylphenol as an antioxidant and 0.0002 part by weight of polydimethylsiloxane as a leveling agent were mixed, and a solution of 15% by weight was produced by using dichloromethane as a solvent. The solution was coated on the charge generating layer and dried to form a charge transporting layer having a film thickness of 25 μm.

Thus, a laminated type electrophotographic photoreceptor 8b shown in FIG. 2 comprising the charge generating layer and the charge transporting layer was obtained.

Example 65

A laminated type electrophotographic photoreceptor 8b was obtained in the same manner as in Example 64 except that an unsymmetrical benzofuran-bishydrazone-styryl compound of the example compound BB100 was used as the charge transporting substance.

Example 66

A polyester film having aluminum vapor deposited was used as a conductive support, and a solution obtained by dissolving titanium oxide and copolymer nylon (CM8000 produced by Toray Corp.) in a mixed solvent comprising methyl alcohol and dichloroethane was coated thereon and dried to form an interlayer having a film thickness of 1 μ.

1 part by weight of the crystalline oxotitanylphthalocyanine obtained in Production Example 1, 10 parts by weight of a benzofuran-bishydrazone compound of the example compound BB67, 8 parts by weight of the polycarbonate resin V1 and 2 parts by weight of the polyester resin represented by formula (X) as a binder, and 0.5 part by weight of 2,6-di-t-butyl-4-methylphenol as an antioxidant were mixed, and a solution of 15% by weight was produced by using dichloromethane as a solvent, which was dispersed along with glass beads in a paint conditioner apparatus (produced by Redlevel Corp.). The solution resulting by the dispersion treatment was coated on the interlayer and dried to form a photosensitive layer having a film thickness of 25 μm.

Thus, a single-layer electrophotographic photoreceptor 8d shown in FIG. 4 having a charge transporting layer having a charge generating substance dispersed therein was obtained.

Comparative Example 50

A laminated type electrophotographic photoreceptor 8b was obtained in the same manner as in Example 59 except that a crystal of Y type oxotitanylphthalocyanine having the X-ray diffraction pattern shown in FIG. 5 obtained during the Production Example 1 was used.

Comparative Example 51

A laminated type electrophotographic photoreceptor 8a was obtained in the same manner as in Example 60 except that a crystal of Y type oxotitanylphthalocyanine having the X-ray diffraction pattern shown in FIG. 5 obtained during the Production Example 1 was used.

Comparative Example 52

A laminated type electrophotographic photoreceptor 8b was obtained in the-same manner as in Example 59 except that a 4-(diethylamino)-benzaldehyde-N,N-diphenylhydrazone compound, which was a known charge transporting substance, was used as a charge transporting substance.

Comparative Example 53

A laminated type electrophotographic photoreceptor 8b was obtained in the same manner as in Example 59 except that a polycarbonate resin comprising bisphenol A as a monomer component was used as a binder resin in the charge generating layer.

Comparative Example 54

A laminated type electrophotographic photoreceptor 8a was obtained in the same manner as in Example 60 except that α-tocopherol was not added to the charge generating layer.

Comparative Example 55

A laminated type electrophotographic photoreceptor 8b was obtained in the same manner as in Example 59 except that 2,6-di-t-butyl-4-methylphenol was not added to the charge generating layer.

Comparative Example 56

A laminated type electrophotographic photoreceptor 8b was produced in the same manner as in Example 59 except that the polydimethylsiloxane was not added to the charge generating layer.

However, in the photoreceptor 8b, unevenness was formed on the surface thereof, and a uniform coated film could not be obtained.

Comparative Example 57

A single-layer type electrophotographic photoreceptor 8d was obtained in the same manner as in Example 66 except that a crystal of Y type oxotitanylphthalocyanine having the X-ray diffraction pattern shown in FIG. 5 obtained during the Production Example 1 was used.

Comparative Example 58

A single-layer type photoreceptor 8d was obtained in the same manner as in Example 66 except that a 4-(diethylamino)-benzaldehyde-N,N-diphenylhydrazone compound, which was known as a charge transporting substance, was used as a charge transporting substance.

Comparative Example 59

A single-layer type photoreceptor 8d was obtained in the same manner as in Example 66 except that a polycarbonate resin comprising bisphenol A as a monomer component was used as a binder resin.

Comparative Example 60

A single-layer type photoreceptor 8d was obtained in the same manner as in Example 66 except that 2,6-di-t-butyl-4-methylphenol was not added.

The electrophotographic photoreceptors produced in the Examples and Comparative Examples are shown in Table 40.

TABLE 40

| Example No. | Charge generating substance | Charge transporting substance[A] | Binder resin | Antioxidant | Leveling Agent |
|---|---|---|---|---|---|
| Example 59 | Production Example 1 | BB61 | V1/X* | α-tocopherol | Contained |
| Example 60 | Production Example 1 | BB72 | V1/X* | DBMP[AA] | Contained |
| Example 61 | Production Example 1 | BB84 | V1/X* | α-tocopherol | Contained |
| Example 62 | Production Example 2 | BB61 | V1/X* | DBMP[AA] | Contained |
| Example 63 | Production Example 2 | BB96 | V1/X* | DBMP[AA] | Contained |
| Example 64 | Production Example 3 | BB61 | V1/X* | DBMP[AA] | Contained |
| Example 65 | Production Example 3 | BB100 | V1/X* | DBMP[AA] | Contained |
| Example 66 | Production Example 1 | BB67 | V1/X* | DBMP[AA] | Contained |
| Comparative Example 50 | Intermediate | BB61 | V1/X* | α-tocopherol | Contained |
| Comparative Example 51 | Intermediate | BB72 | V1/X* | DBMP[AA] | Contained |
| Comparative Example 52 | Production Example 1 | Conventional Compound | V1/X* | α-tocopherol | Contained |
| Comparative Example 53 | Production Example 1 | BB61 | Polycarbonate** | α-tocopherol | Contained |
| Comparative Example 54 | Production Example 1 | BB72 | V1/X* | Not Contained | Contained |
| Comparative | Production | BB61 | V1/X* | Not Contained | Contained |

TABLE 40-continued

| Example No. | Charge generating substance | Charge transporting substance[A] | Binder resin | Antioxidant | Leveling Agent |
|---|---|---|---|---|---|
| Example 55 | Example 1 | | | | |
| Comparative Example 56 | Production Example 1 | BB61 | V1/X* | α-tocopherol | Not Contained |
| Comparative Example 57 | Intermediate | BB67 | V1/X* | DBMP[AA] | Contained |
| Comparative Example 58 | Production Example 1 | Conventional Compound | V1/X* | α-tocopherol | Contained |
| Comparative Example 59 | Production Example 1 | BB67 | Polycarbonate** | DBMP[AA] | Contained |
| Comparative Example 60 | Production Example 1 | BB67 | V1/X* | Not Contained | Contained |

*V1/X: Resins of formulae (V1) and (X) were used at a mixing ratio of 8/2.
**Polycarbonate comprising bisphenol A as monomer component
***Polydimethylsiloxane was used as leveling agent.
[A]shown in terms of number of example compound
[AA]DBMP shows 2,6-di-t-butyl-4-methylphenol The electrophotographic photoreceptors thus produced were evaluated for electrophotographic characteristics by a testing apparatus for electrostatic recording paper (EPA-8200 produced by Kawaguchi Electric-Works Co., Ltd.).

The measurement conditions were an applied voltage of −6 kV and static of No. 3, and an exposure amount $E_{1/2}$ ($\mu J/cm^2$) of monochrome light of 780 nm (radiation intensity: 2 $\mu W/cm^2$) isolated with an interference filter required for attenuating from −500 V to −250 V and an initial potential $V_0$ (−V) were measured.

The single-layer type electrophotographic photoreceptors were measured by using the same testing apparatus for electrostatic recording paper under the conditions where the applied voltage was +6 kV and static was No. 3, and an exposure amount $E_{1/2}$ ($\mu J/cm^2$) of monochrome light of 780 nm (radiation intensity: 10 $\mu W/cm^2$) isolated with an interference filter required for attenuating from +500 V to +250 V and an initial potential $V_0$ (+V) were measured.

A commercially available digital duplicator (AR5130 produced by Sharp Corp.) was modified, and the photoreceptors were used as a drum part. Continuous blank copy was conducted for 30,000 times (non copy aging), and the charging potential and $E_{1/2}$ were measured by using the testing apparatus for electrostatic recording paper before and after the continuous blank copy.

Furthermore, continuous blank copy was conducted for 30,000 times under a high temperature and high humidity condition (35° C., 85%), and the residual potential was measured before and after the continuous blank copy.

The degree of decrease in film thickness of the photoreceptor was measured by a wear testing apparatus (produced by Suga Testing Machine Co., Ltd.). The measurement conditions were aluminum oxide #2000 as an abrasion material, a load of 200 g·f, and a number of abrasion of 10,000.

The results obtained are shown in Table 41.

TABLE 41

| | Charging potential (V) | | Half-value exposure amount ($\mu J/cm^2$) | | Residual potential (V) | | Amount of Abrasion (mg) |
|---|---|---|---|---|---|---|---|
| Example No. | Initial | After 30,000 times | Initial | After repetition | Initial | After 30,000 times | |
| Example 59 | −500 | −490 | 0.06 | 0.08 | −15 | −29 | 2.17 |
| Example 60 | −807 | −492 | 0.11 | 0.13 | −22 | 34 | 2.04 |
| Example 61 | −511 | −501 | 0.08 | 0.12 | −19 | −31 | 2.18 |
| Example 62 | −502 | −492 | 0.08 | 0.13 | −12 | −28 | 1.99 |
| Example 63 | −512 | −503 | 0.09 | 0.11 | −20 | −31 | 2.22 |
| Example 64 | −507 | −498 | 0.08 | 0.12 | −17 | −22 | 2.17 |
| Example 65 | −510 | −493 | 0.09 | 0.12 | −20 | −32 | 2.11 |
| Example 66 | 508 | 493 | 0.45 | 0.58 | 25 | 40 | 2.22 |
| Comparative Example 50 | −494 | −457 | 0.18 | 0.42 | −16 | −50 | 2.14 |
| Comparative Example 51 | −481 | −411 | 0.21 | 0.49 | −20 | −69 | 2.17 |
| Comparative Example 52 | −492 | −441 | 0.20 | 0.47 | −17 | −112 | 2.12 |
| Comparative Example 53 | −480 | −425 | 0.21 | 0.48 | −24 | −69 | 4.93 |
| Comparative Example 54 | −462 | −441 | 0.16 | 0.47 | −15 | −134 | 2.16 |
| Comparative Example 55 | −471 | −446 | 0.19 | 0.46 | −18 | −125 | 2.31 |
| Comparative Example | −492 | — | 0.18 | — | −19 | — | 2.06 |

TABLE 41-continued

| Example No. | Charging potential (V) Initial | Charging potential (V) After 30,000 times | Half-value exposure amount ($\mu J/cm^2$) Initial | Half-value exposure amount ($\mu J/cm^2$) After repetition | Residual potential (V) Initial | Residual potential (V) After 30,000 times | Amount of Abrasion (mg) |
|---|---|---|---|---|---|---|---|
| Comparative Example 56 | 507 | 472 | 0.16 | 0.46 | 25 | 75 | 2.30 |
| Comparative Example 57 | 511 | 452 | 0.21 | 0.48 | 32 | 67 | 2.03 |
| Comparative Example 58 | 502 | 484 | 0.19 | 0.23 | 28 | 39 | 5.09 |
| Comparative Example 59 | 508 | 224 | 0.22 | 0.29 | 30 | 155 | 2.34 |
| Comparative Example 60 | | | | | | | |

As shown in Table 41, all the photoreceptors of Examples 59 to 66 had potential deterioration of the charging potential after the durability test (30,000 times) that was sufficiently smaller than the conventional photoreceptors of Comparative Examples 50 to 60; had an initial sensitivity (half-value exposure amount) that was sufficiently higher than Comparative Examples; and exhibited small deterioration in sensitivity after the durability test.

Furthermore, in the characteristics of the photoreceptors of the invention, the increase in residual potential after the durability test (30,000 times) under a high temperature and high humidity condition was sufficiently smaller than the conventional photoreceptors.

Production Example 44 (Production of Bis-cyclic hydrazone Compound shown by Example Compound BB111)

0.60 g (1.0 equivalent) of 2,5-bisformylbenzo[b]furan was dissolved in 10 ml of ethanol, and 0.970 g (2.1 equivalents) of 1-amino-2, 3-dihydroindol and 0.05 ml of acetic acid were added thereto, which was stirred at a temperature of from 60 to 70° C. for 5 hours.

After confirming the completion of the reaction by thin layer chromatography (TLC), the resulting solid matter was filtered and washed with ethanol. The solid matter was recrystallized from ethanol to obtain 1.40 g of the objective benzofuran-bis-cyclic hydrazone compound (example compound BB111) as yellow powder (yield: 93%).

Figure 26:
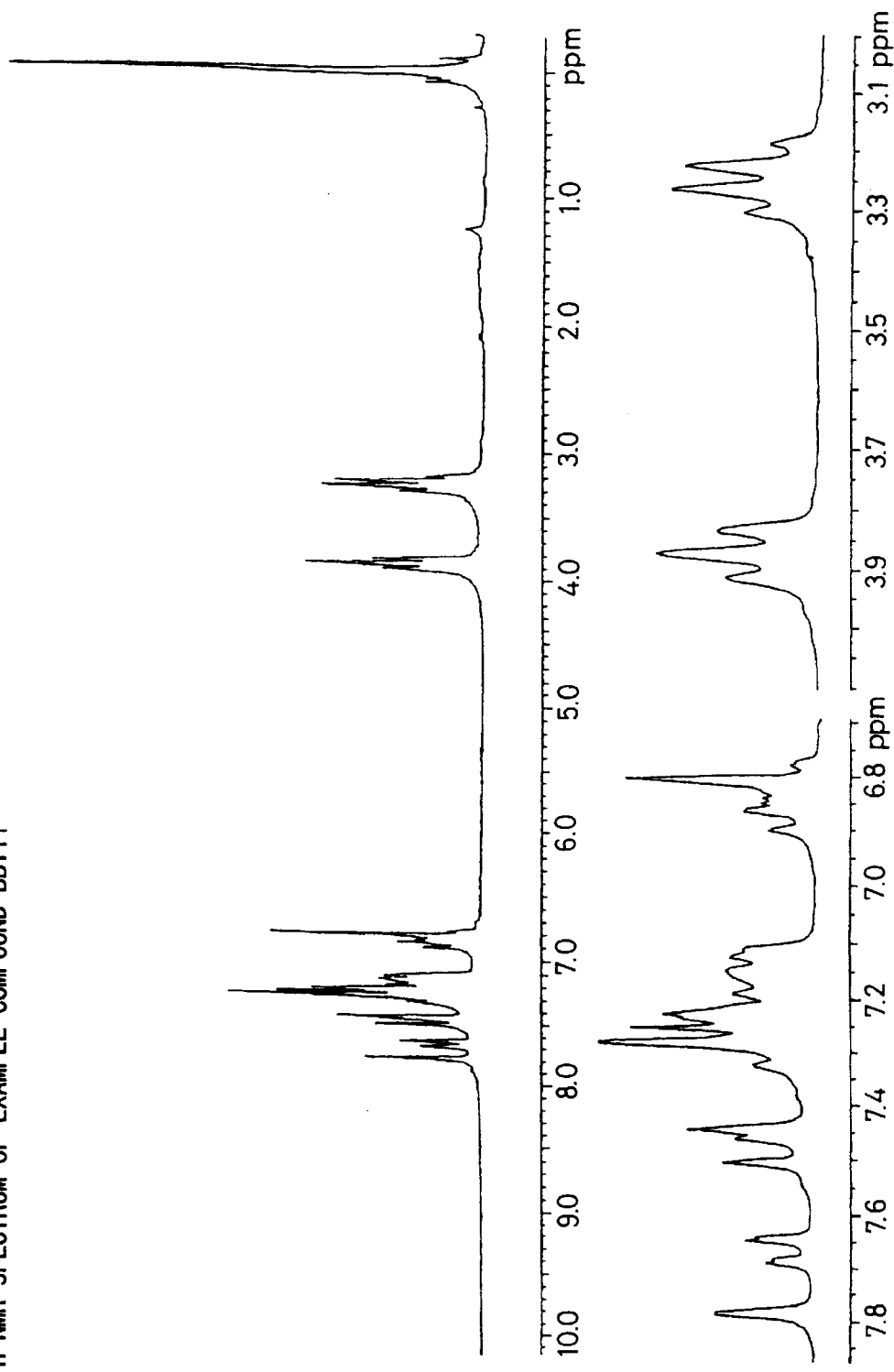
FIG. 26 is an H-NMR spectrum of an example compound BB111.
Figure 27:
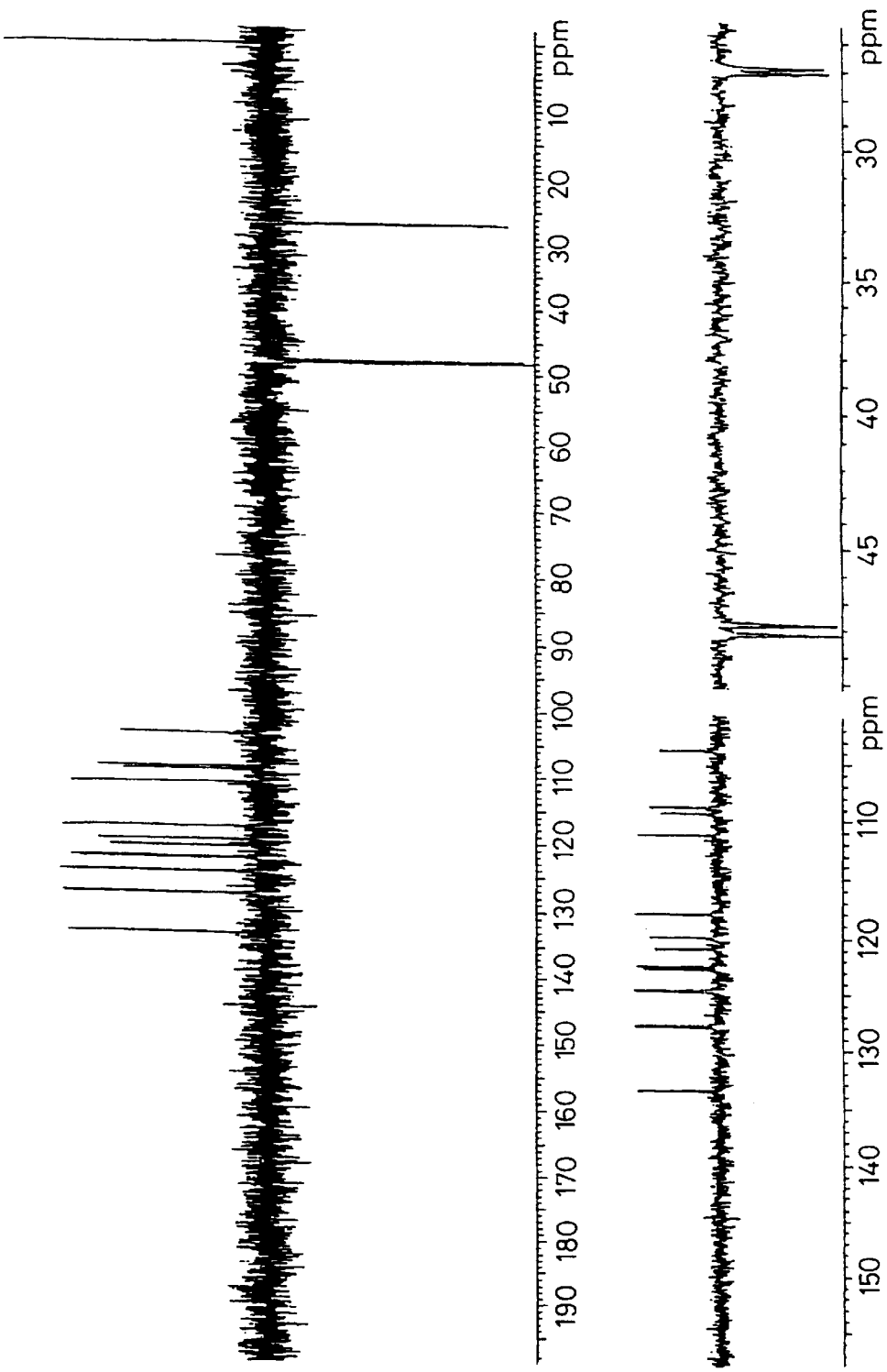
FIG. 27 is the $^3$C-NMR spectrum of an example compound BB111.
Figure 28:
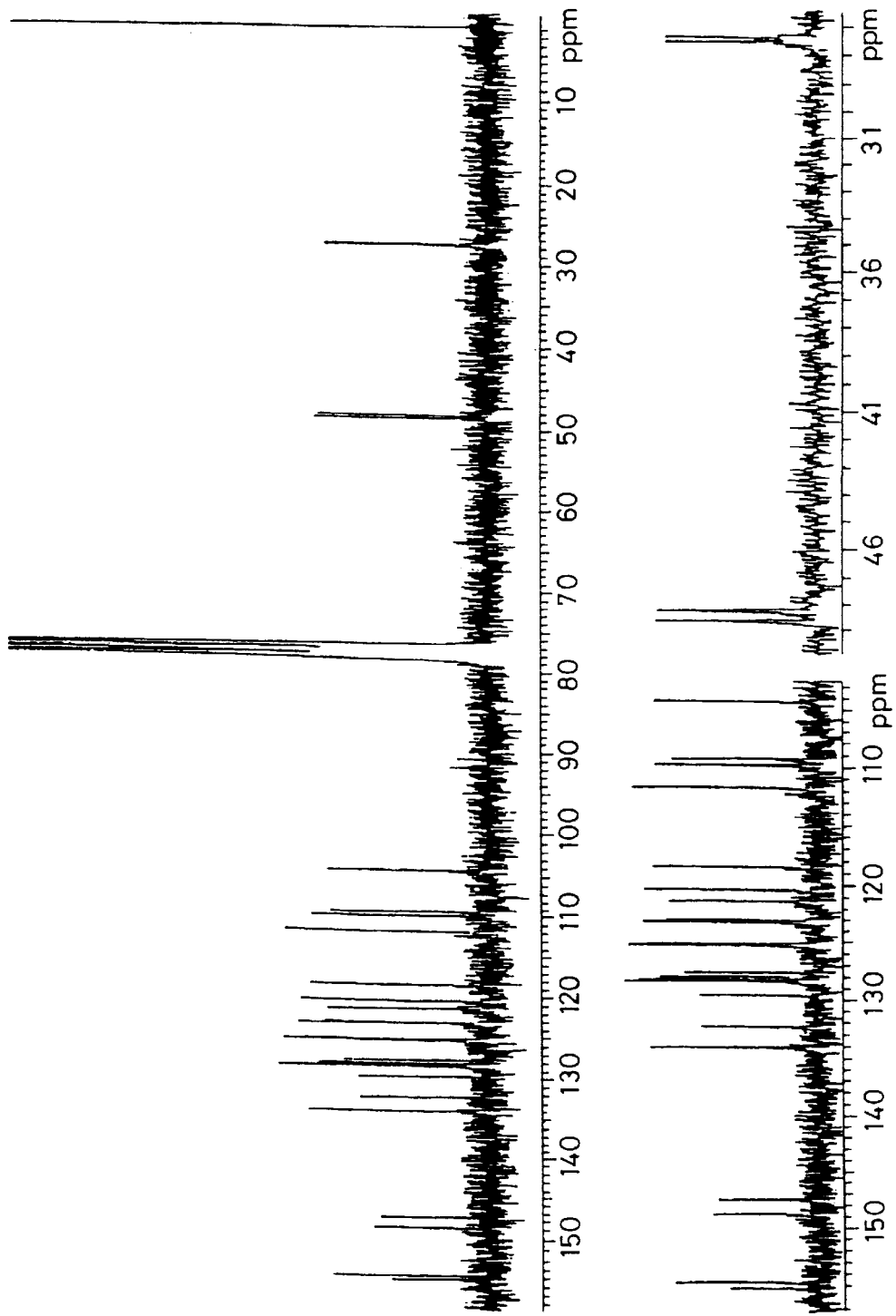
FIG. 28 is a DEPT135$^{13}$C-NMR spectrum of the example compound BB111.

The structure of the resulting bis-cyclic hydrazone compound (example compound BB111) was confirmed by measuring with $^1$H-NMR, normal $^{13}$C-NMR and DEPT135$^{13}$C-NMR. The measurement result of $^1$H-NMR is shown in FIG. 26, the measurement result of normal $^{13}$C-NMR is shown in FIG. 27, and the measurement result of DEPT135$^{13}$C-NMR is shown in FIG. 28. These NMR spectra well support the structure of the objective bis-cyclic hydrazone compound (example compound BB111).

Example 67

A polyester film having aluminum vapor deposited was used as a conductive support, and a solution obtained by dissolving of titanium oxide and copolymer nylon (CM8000 produced by Toray Corp.) in a mixed solvent comprising methyl alcohol and dichloroethane was coated thereon and dried to form an interlayer having a film thickness of 1 $\mu$m.

1 part by weight of the crystalline oxotitanylphthalocyanine obtained in Production Example 1 and 1 part by weight of polybutyral (Essrec BL-1 produced by Sekisui Chemical Co., Ltd.) were mixed with 70 parts by weight of methyl ethyl ketone, and was subjected to a dispersion treatment along with glass beads having a diameter of 2 mm in a paint conditioner apparatus (produced by Redlevel Corp.). The resulting solution was coated on the interlayer and dried to form a charge generating layer having a film thickness of 0.4 $\mu$m.

10 parts by weight of a benzofuran-bis-cyclic hydrazone compound of the example compound BB111 as a charge transporting substance, 8 parts by weight of the polycarbonate resin V1 and 2 parts by weight of the polyester resin represented by formula (X) as a binder, 0.2 part by weight of α-tocopherol as an antioxidant and 0.0002 part by weight of polydimethylsiloxane as a leveling agent were mixed, and a solution of 15% by weight was produced by using tetrahydrofuran as a solvent. The solution was coated on the charge generating layer to form a charge transporting layer having a dry film thickness of 20 $\mu$m.

Thus, a laminated type electrophotographic photoreceptor 8b shown in FIG. 2 comprising the charge generating layer and the charge transporting layer was obtained.

Example 68

A polyester film having aluminum vapor deposited was used as a conductive support, and the solution obtained by the dispersion treatment in Example 67 was directly coated thereon and dried to form a charge generating layer having a film thickness of 0.4 $\mu$m.

A charge transporting layer was formed on the charge generating layer in the same manner as in Example 67 except that a benzofuran-bis-cyclic hydrazone compound of the example compound BB122 was used as a charge transporting substance, and 0.5 part by weight of 2,6-di-t-butyl-4-methylphenol was used as an antioxidant, so as to obtain a laminated type electrophotographic photoreceptor 8a shown in FIG. 1 comprising the charge generating layer and the charge transporting layer.

Example 69

A laminated type electrophotographic photoreceptor 8b shown in FIG. 2 was obtained in the same manner as in Example 67 except that a copolymer resin of vinyl chloride and vinyl acetate (Essrec M-1 produced by Sekisui Chemical Co., Ltd.) was used as the resin of the charge generating layer, and a benzofuran-bis-cyclic hydrazone compound of the example compound BB134 was used as the charge transporting substance.

Example 70

A polyester film having aluminum vapor deposited was used as a conductive support, and a solution obtained by dissolving titanium oxide and copolymer nylon (CM8000 produced by Toray Corp.) in a mixed solvent comprising methyl alcohol and dichloroethane was coated thereon and dried to form an interlayer having a film thickness of 1 $\mu$m.

A charge generating layer having a film thickness of 0.4 $\mu$m was formed on the interlayer by coating a solution containing the crystalline oxotitanylphthalocyanine of the invention obtained in Production Example 2 on the interlayer and then dried.

10 parts by weight of a benzofuran-bis-cyclic hydrazone compound of the example compound BB111, 8 parts by weight of the polycarbonate resin V1 and 2 parts by weight of the polyester resin represented by formula (X) as a binder, 0.5 part by weight of 2,6-di-t-butyl-4-methylphenol as an antioxidant and 0.0002 part by weight of polydimethylsiloxane as a leveling agent were mixed, and a solution of 15% by weight was produced by using dichloromethane as a solvent. The solution was coated on the charge generating layer and dried to form a charge transporting layer having a film thickness of 25 µm.

Thus, a laminated type electrophotographic photoreceptor 8b shown in FIG. 2 comprising the charge generating layer and the charge transporting layer was obtained.

Example 71

A laminated type electrophotographic photoreceptor 8b was obtained in the same manner as in Example 70 except that a benzofuran-bis-cyclic hydrazone-styryl compound of the example compound BB146 was used as the charge transporting substance.

Example 72

A polyester film having aluminum vapor deposited was used as a conductive support, and a dispersion solution obtained by dissolving titanium oxide and copolymer nylon (CM8000 produced by Toray Corp.) in a mixed solvent comprising methyl alcohol and dichloroethane was coated thereon and dried to form an interlayer having a film thickness of 1 µm.

A charge generating layer having a film thickness of 0.4 µm was formed by coating a solution containing the crystalline oxotitanylphthalocyanine obtained in Production Example 3 on the interlayer and then dried.

10 parts by weight of a benzofuran-bis-cyclic hydrazone compound of the example compound BB111, 8 parts by weight of the polycarbonate resin V1 and 2 parts by weight of the polyester resin represented by formula (X) as a binder, 0.5 part by weight of 2,6-di-t-butyl-4-methylphenol as an antioxidant and 0.0002 part by weight of polydimethylsiloxane as a leveling agent were mixed, and a solution of 15% by weight was produced by using dichloromethane as a solvent. The solution was coated on the charge generating layer and dried to form a charge transporting layer having a film thickness of 25 µm.

Thus, a laminated type electrophotographic photoreceptor 8b shown in FIG. 2 comprising the charge generating layer and the charge transporting layer was obtained.

Example 73

A laminated type electrophotographic photoreceptor 8b was obtained in the same manner as in Example 72 except that an unsymmetrical benzofuran-bis-cyclic hydrazone-styryl compound of the example compound BB150 was used as the charge transporting substance.

Example 74

A polyester film having aluminum vapor deposited was used as a conductive support, and a solution obtained by dissolving titanium oxide and copolymer nylon (CM8000 produced by Toray Corp.) in a mixed solvent comprising methyl alcohol and dichloroethane was coated thereon and dried to form an interlayer having a film thickness of 1 µm.

1 part by weight of the crystalline oxotitanylphthalocyanine obtained in Production Example 1, 10 parts by weight of a benzofuran-bis-cyclic hydrazone compound of the example compound BB117, 8 parts by weight of the polycarbonate resin V1 and 2 parts by weight of the polyester resin represented by formula (X) as a binder, and 0.5 part by weight of 2,6-di-t-butyl-4-methylphenol as an antioxidant were mixed, and a solution of 15% by weight was produced by using dichloromethane as a solvent, which was dispersed along with glass beads having a diameter of 2 mm in a paint conditioner apparatus (produced by Redlevel Corp.). The solution resulting by the dispersion treatment was coated on the interlayer and dried to form a photosensitive layer having a film thickness of 25 µm.

Thus, a single-layer electrophotographic photoreceptor 8d shown in FIG. 4 having a charge generating layer having a charge generating substance dispersed therein was obtained.

Comparative Example 61

A laminated type electrophotographic photoreceptor 8b was obtained in the same manner as in Example 67 except that a crystal of Y type oxotitanylphthalocyanine having the X-ray diffraction pattern shown in FIG. 5 obtained during the Production Example 1 was used.

Comparative Example 62

A laminated type electrophotographic photoreceptor 8a was obtained in the same manner as in Example 68 except that a crystal of Y type oxotitanylphthalocyanine having the X-ray diffraction pattern shown in FIG. 5 obtained during the Production Example 1 was used.

Comparative Example 63

A laminated type electrophotographic photoreceptor 8b was obtained in the same manner as in Example 67 except that a 4-(diethylamino)-benzaldehyde-N,N-diphenylhydrazone compound, which was a known charge transporting substance, was used as a charge transporting substance.

Comparative Example 64

A laminated type electrophotographic photoreceptor 8b was obtained in the same manner as in Example 67 except that a polycarbonate resin comprising bisphenol A as a monomer component was used as a binder resin in the charge generating layer.

Comparative Example 65

A laminated type electrophotographic photoreceptor 8a was obtained in the same manner as in Example 68 except that α-tocopherol was not added to the charge generating layer.

Comparative Example 66

A laminated type electrophotographic photoreceptor 8b was obtained in the same manner as in Example 67 except that 2,6-di-t-butyl-4-methylphenol was not added to the charge generating layer.

Comparative Example 67

A laminated type photoreceptor 8b was produced in the same manner as in Example 67 except that the polydimethylsiloxane was not added to the charge generating layer.

However, in the photoreceptor 8b, unevenness was formed on the surface thereof, and a uniform coated film could not be obtained.

Comparative Example 68

A single-layer type electrophotographic photoreceptor 8d was obtained in the same manner as in Example 74 except that a crystal of Y type oxotitanylphthalocyanine having the X-ray diffraction pattern shown in FIG. 5 obtained during the Production Example 1 was used.

Comparative Example 69

A single-layer type photoreceptor 8d was obtained in the same manner as in Example 74 except that a 4-(dimethylamino)-benzaldehyde-N,N-diphenylhydrazone compound, which was known as a charge transporting substance, was used as a charge transporting substance.

Comparative Example 70

A single-layer type photoreceptor 8d was obtained in the same manner as in Example 74 except that a polycarbonate resin comprising bisphenol A as a monomer component was used as a binder resin.

Comparative Example 71

A single-layer type photoreceptor 8d was obtained in the same manner as in Example 74 except that 2,6-di-t-butyl-4-methylphenol was not added.

The electrophotographic photoreceptors produced in the Examples and Comparative Examples are shown in Table 42.

sity: 2 $\mu W/cm^2$) isolated with an interference filter required for attenuating from −500 V to −250 V and an initial potential $V_0$ (−V) were measured.

The single-layer type electrophotographic photoreceptors were measured by using the same testing apparatus for electrostatic recording paper under the conditions where the applied voltage was +6 kV and static was No. 3, and an exposure amount $E_{1/2}$ ($\mu J/cm^2$) of monochrome light of 780 nm (radiation intensity: 10 $\mu W/cm^2$) isolated with an interference filter required for attenuating from +500 V to +250 V and an initial potential $V_0$ (+V) were measured.

A commercially available digital duplicator (AR5130 produced by Sharp Corp.) was modified, and the photoreceptors were used as a drum part. Continuous blank copy was conducted for 30,000 times (non-copy aging), and the charging potential and $E_{1/2}$ were measured by using the testing apparatus for electrostatic recording paper before and after the continuous blank copy.

Furthermore, continuous blank copy was conducted for 30,000 times under a high temperature and high humidity

TABLE 42

| Example No. | Charge generating substance | Charge transporting substance[A] | Binder Resin | Antioxidant | Leveling Agent |
|---|---|---|---|---|---|
| Example 67 | Production Example 1 | BB111 | V1/X* | α-tocopherol | Contained |
| Example 68 | Production Example 1 | BB122 | V1/X* | DBMP[AA] | Contained |
| Example 69 | Production Example 1 | BB134 | V1/X* | α-tocopherol | Contained |
| Example 70 | Production Example 2 | BB111 | V1/X* | DBMP[AA] | Contained |
| Example 71 | Production Example 2 | BB146 | V1/X* | DBMP[AA] | Contained |
| Example 72 | Production Example 3 | BB111 | V1/X* | DBMP[AA] | Contained |
| Example 73 | Production Example 3 | BB150 | V1/X* | DBMP[AA] | Contained |
| Example 74 | Production Example 1 | BB117 | V1/X* | DBMP[AA] | Contained |
| Comparative Example 61 | Intermediate | BB111 | V1/X* | α-tocopherol | Contained |
| Comparative Example 62 | Intermediate | BB122 | V1/X* | DBMP[AA] | Contained |
| Comparative Example 63 | Production Example 1 | Conventional Compound | V1/X* | α-tocopherol | Contained |
| Comparative Example 64 | Production Example 1 | BB111 | Polycarbonate** | α-tocopherol | Contained |
| Comparative Example 65 | Production Example 1 | BB122 | V1/X* | Not Contained | Contained |
| Comparative Example 66 | Production Example 1 | BB111 | V1/X* | Not Contained | Contained |
| Comparative Example 67 | Production Example 1 | BB111 | V1/X* | α-tocopherol | Not Contained |
| Comparative Example 68 | Intermediate | BB117 | V1/X* | DBMP[AA] | Contained |
| Comparative Example 69 | Production Example 1 | Conventional Compound | V1/X* | α-tocopherol | Contained |
| Comparative Example 70 | Production Example 1 | BB117 | Polycarbonate** | DBMP[AA] | Contained |
| Comparative Example 71 | Production Example 1 | BB117 | V1/X* | Not Contained | Contained |

*V1/X: Resins of formulae (V1) and (X) were used at a mixing ratio of 8/2.
**Polycarbonate comprising bisphenol A as monomer component
***Polydimethylsiloxane was used as leveling agent.
[A]shown in terms of number of example compound
[AA]DBMP shows 2,6-di-t-butyl-4-methylphenol The electrophotographic photoreceptors thus produced were evaluated for electrophotographic characteristics by a testing apparatus for electrostatic recording paper (EPA-8200 produced by Kawaguchi Electric Works Co., Ltd.).

The measurement conditions were an applied voltage of −6 kV and static of No. 3, and an exposure amount $E_{1/2}$ ($\mu J/cm^2$) of monochrome light of 780 nm (radiation intencondition (35° C., 85%), and the residual potential was measured before and after the continuous blank copy.

The degree of decrease in film thickness of the photoreceptor was measured by a wear testing apparatus (produced by Suga Testing Machine Co., Ltd.). The measurement conditions were aluminum oxide #2000 as an abrasion material, a load of 200 g·f, and a number of abrasion of 10,000.

The results obtained are shown in Table 43.

TABLE 43

| Example No. | Charging potential (V) Initial | Charging potential (V) After 30,000 times | Half-value exposure amount (μJ/cm²) Initial | Half-value exposure amount (μJ/cm²) After repetition | Residual potential (V) Initial | Residual potential (V) After 30,000 times | Amount of Abrasion (mg) |
|---|---|---|---|---|---|---|---|
| Example 67 | −503 | −485 | 0.05 | 0.07 | −17 | −32 | 2.01 |
| Example 68 | −512 | −495 | 0.09 | 0.11 | −25 | −32 | 2.16 |
| Example 69 | −520 | −491 | 0.08 | 0.11 | −19 | −29 | 2.20 |
| Example 70 | −511 | −491 | 0.07 | 0.13 | −16 | −28 | 2.08 |
| Example 71 | −515 | −492 | 0.08 | 0.12 | −19 | −27 | 2.21 |
| Example 72 | −504 | −492 | 0.08 | 0.14 | −17 | −24 | 2.17 |
| Example 73 | −511 | −482 | 0.09 | 0.11 | −20 | −28 | 2.09 |
| Example 74 | 504 | 495 | 0.45 | 0.56 | 25 | 39 | 2.18 |
| Comparative Example 61 | −494 | −457 | 0.18 | 0.42 | −16 | −50 | 2.14 |
| Comparative Example 62 | −481 | −411 | 0.21 | 0.49 | −20 | −69 | 2.17 |
| Comparative Example 63 | −492 | −441 | 0.20 | 0.47 | −17 | −112 | 2.12 |
| Comparative Example 64 | −480 | −425 | 0.21 | 0.48 | −24 | −69 | 4.93 |
| Comparative Example 65 | −462 | −441 | 0.16 | 0.47 | −15 | −134 | 2.16 |
| Comparative Example 66 | −471 | −446 | 0.19 | 0.46 | −18 | −125 | 2.31 |
| Comparative Example 67 | −492 | — | 0.18 | — | −19 | — | 2.06 |
| Comparative Example 68 | 507 | 472 | 0.16 | 0.46 | 25 | 75 | 2.3 |
| Comparative Example 69 | 511 | 452 | 0.21 | 0.48 | 32 | 67 | 2.03 |
| Comparative Example 70 | 502 | 484 | 0.19 | 0.23 | 28 | 39 | 5.09 |
| Comparative Example 71 | 508 | 224 | 0.22 | 0.29 | 30 | 155 | 2.34 |

As shown in Table 43, all the photoreceptors of Examples 67 to 74 had potential deterioration of the charging potential after the durability test (30,000 times) that was sufficiently smaller than the conventional photoreceptors of Comparative Examples 61 to 71; had an initial sensitivity (half-value exposure amount) that was sufficiently higher than Comparative Examples; and exhibited small deterioration in sensitivity after the durability test.

Furthermore, the increase in residual potential after the durability test (30,000 times) under a high temperature and high humidity condition was sufficiently smaller than the conventional photoreceptors.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A crystalline oxotitanylphthalocyanine having major peaks in an X-ray diffraction spectrum at Bragg angles (2θ±0.2°) of 7.3°, 9.4°, 9.6°, 11.6°, 13.3°, 17.9°, 24.1° and 27.2°, wherein a peak bundle formed by overlapping the peaks at 9.4° and 9.6° is the largest peak, and the peak at 27.2° is the second largest peak.

2. The crystalline oxotitanylphthalocyanine of claim 1, wherein the peak intensity of the peak at 27.2° is 80% or less of the peak intensity of the peak bundle formed by overlapping the peaks at 9.4° and 9.6°.

3. The crystalline oxotitanylphthalocyanine of claim 1, wherein a peak bundle having a trapezoidal shape is exhibited at a Bragg angle (2θ±0.2°) of from 14.1° to 14.9° in an X-ray diffraction spectrum.

4. The crystalline oxotitanylphthalocyanine of claim 1, wherein a shoulder peak having a peak intensity about half the peak intensity of the peak bundle formed by overlapping the peaks at 9.4° and 9.6° is exhibited at a Bragg angle (2θ±0.2°) of 9.0° in an X-ray diffraction spectrum.

5. An electrophotographic photoreceptor comprising a photosensitive layer containing, as a charge generating substance, the crystalline oxotitanylphthalocyanine according to claim 1.

6. The electrophotographic photoreceptor of claim 5, wherein the photosensitive layer contains, as a charge transporting substance, a bisamine compound represented by formula (I-I):

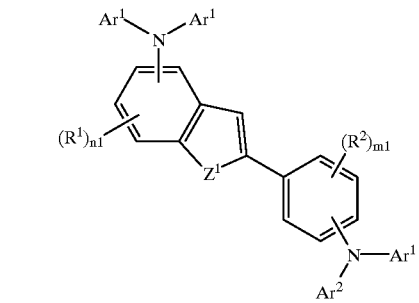

(I-I)

in which formula (I-I) $Ar^1$ and $Ar^2$ each represent an aryl group, which may have a substituent, a heterocyclic group, which may have a substituent, an aralkyl group, which may have a substituent or a heterocyclic-group-substituted alkyl group, which may have a substituent; $Z^1$ is an oxygen atom, a sulfur atom or a selenium atom; $R^1$ and $R^2$ each represent an alkyl group, which may have a substituent, an alkoxy group, which may have a substituent, a dialkylamino group, which may have a substituent, a halogen atom or a hydrogen atom; m1 is an integer of from 1 to 4; and n1 is an integer of from 1 to 3, provided that when m1 or n1 is 2 or more, groups represented by or $R^2$ may be the same or different and may form a ring.

7. The electrophotographic photoreceptor of claim 5, wherein the photosensitive layer contains, as a charge transporting substance, an N,N'-bisenamine compound represented by one formula selected from formulae (II-I), (II-II), (II-III) and (II-IV):

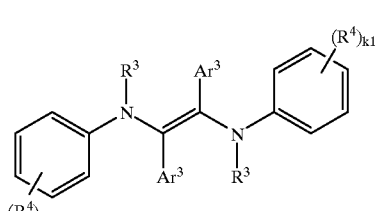

(II-I)

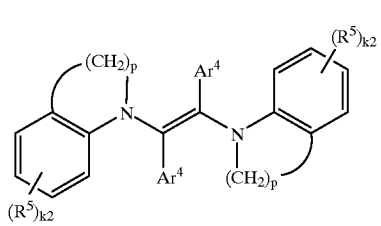

(II-II)

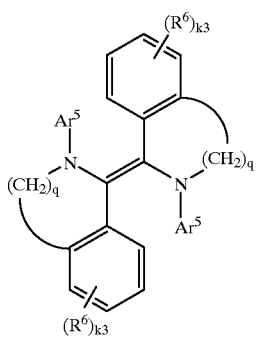

(II-III)

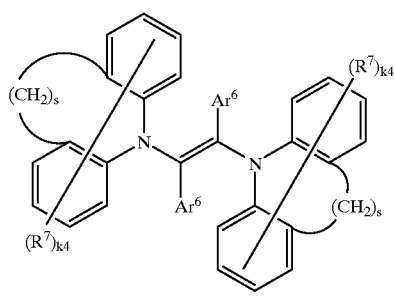

(II-IV)

in which formulae (II-I), (II-II), (II-III) and (II-IV), $Ar^3$ to $Ar^6$ each represent an aryl group, which may have a substituent, a heterocyclic group, which may have a substituent, or an aralkyl group, which may have a substituent; $R^3$ represents an aryl group, which may have a substituent, a heterocyclic group, which may have a substituent, an aralkyl group, which may have a substituent, or an alkyl group having from 1 to 4 carbon atoms, which may have a substituent; $R^4$ to $R^7$ each represent an alkyl group having from 1 to 3 carbon atoms, an alkoxy group having from 1 to 3 carbon atoms, a dialkylamino group having from 1 to 3 carbon atoms, a halogen atom or a hydrogen atom; k1 is an integer of from 1 to 5; k2 and k3 each are an integer of from 1 to 4; p is an integer of from 2 to 4; q is an integer of from 1 to 3; k4 is an integer of from 1 to 8; and s is an integer of from 0 to 2, provided that when k1 is 2 or more, plural groups represented by $R^4$ may be the same or different; when k2 is 2 or more, plural groups represented by $R^5$ may be the same or different; when k3 is 2 or more, plural groups represented by $R^6$ may be the same or different; and when k4 is 2 or more, plural groups represented by $R^7$ may be the same or different.

8. The electrophotographic photoreceptor of claim 5, wherein the photosensitive layer contains, as a charge transporting substance, a styryl compound represented by formula (III):

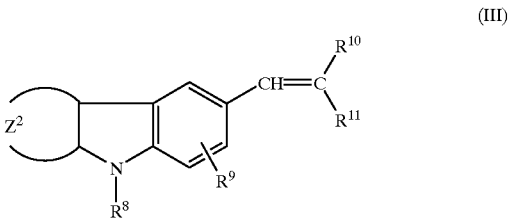

(III)

in which formula (III), $R^8$ to $R^{11}$ each represent a hydrogen atom, and an alkyl group, which may have a substituent, an aralkyl group, which may have a substituent, or an aryl group, which may have a substituent, provided that $R^{10}$ and $R^{11}$ may be combined to form a ring; and $Z^2$ represents an atomic group necessary for forming a saturated 5- to 8-membered ring with the two carbon atoms from the indoline ring.

9. The electrophotographic photoreceptor of claim 5, wherein the photosensitive layer contains, as a charge transporting substance, an amine-hydrazone compound represented by formula (IV-I):

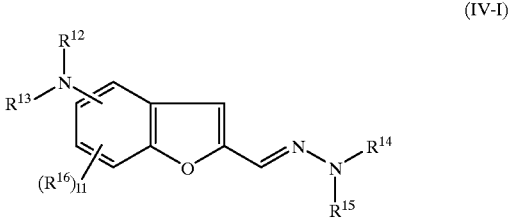

(IV-I)

in which formula (IV-I), $R^{12}$ to $R^{15}$ may be the same or different, and each represent a lower alkyl group, an aromatic hydrocarbon residual group, which may have a substituent, a heterocyclic ring residual group, which may have a substituent, or an aralkyl group, which may have a substituent; $R^{16}$ represents a hydrogen atom, a halogen atom, a lower alkyl group, a lower alkoxy group, a lower dialkylamino group, a trifluoromethyl group, or an aralkyl group, which may have a substituent; 11 is an integer of from 1 to 3.

10. The electrophotographic photoreceptor of claim 5, wherein the photosensitive layer contains, as a charge transporting substance, a benzofuran-bishydrazone compound represented by formula (V):

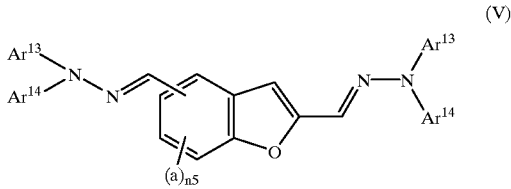

(V)

in which formula (V), $Ar^{13}$ and $Ar^{14}$ each represent an aryl group, which may have a substituent, an aralkyl group, which may have a substituent, a heterocyclic group, which may have a substituent, or an alkyl group having from 1 to 5 carbon atoms, which may have a substituent; a represents an alkyl group having from 1 to 3 carbon atoms, an alkoxy group having from 1 to 3 carbon atoms, a dialkylamino group having from 1 to 3 carbon atoms, a fluoroalkyl group, a halogen atom or a hydrogen atom; and n5 is an integer of from 1 to 3, provided that when n5 is 2 or more, plural groups represented by a may be the same or different.

11. The electrophotographic photoreceptor of claim 5, wherein the photosensitive layer contains, as a charge transporting substance, a bisenamine compound represented by a formula selected from formulae (VI-I) and (VI-II):

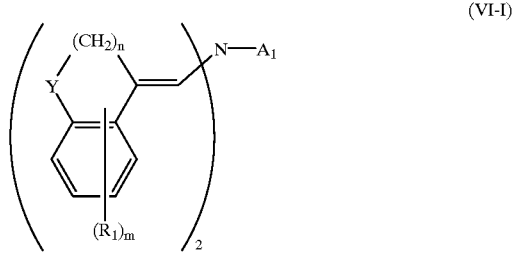

(VI-I)

in which formula (VI-I), $A_1$ represents an aryl group, which may have a substituent, an aralkyl group, which may have a substituent, a heterocyclic group, which may have a substituent, or a lower alkyl group, which may have a substituent; $R_1$ represents a lower alkyl group, which may have a substituent, a lower alkoxy group, which may have a substituent, a di-lower alkylamino group, which may have a substituent, a halogen atom or a hydrogen atom; Y represents an oxygen atom, a sulfur atom or a mono-substituted nitrogen atom; m is an integer of from 1 to 8; and n is an integer of from 1 to 3, provided that when m is 2 or more, plural groups represented by $R_1$ may be the same or different,

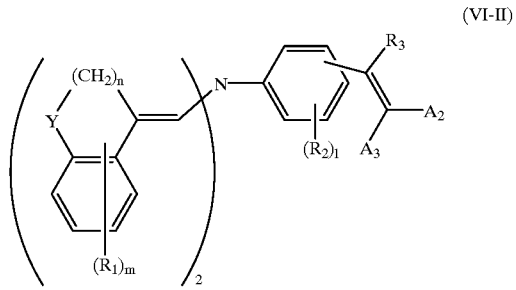

(VI-II)

in which formula (VI-II), $A_2$ and $A_3$ may be the same or different, and each represent an aryl group, which may have a substituent, an aralkyl group, which may have a substituent, a heterocyclic group, which may have a substituent, a lower alkyl group, which may have a substituent, or a hydrogen atom (provided that at least one of $A_2$ and $A_3$ represents an aryl group, which may have a substituent, an aralkyl group, which may have a substituent, a heterocyclic group, which may have a substituent, or a lower alkyl group, which may have a substituent); $R_2$ has the same meaning as $R_1$ in formula (VI-I) ; l is an integer of from 1 to 4 (provided that when l is 2 or more, plural groups represented by $R_2$ may be the same or different); $R_3$ represents an aryl group, which may have a substituent, an aralkyl group, which may have a substituent, a heterocyclic group, which may have a substituent, a lower alkyl group, which may have a substituent, or a hydrogen atom; and $R_1$, m, n and Y have the same meanings as in formula (VI-I).

12. The electrophotographic photoreceptor of claim 5, wherein the photosensitive layer contains, as a charge transporting substance, a benzofuran-bishydrazone compound represented by formula (VII):

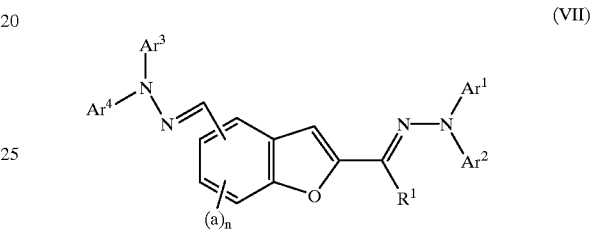

(VII)

in which formula (VII), $Ar^1$, $Ar^2$, $Ar^3$ and $Ar^4$ may be the same or different, and each represent an aryl group, which may have a substituent, a heterocyclic group, which may have a substituent, an aralkyl group, which may have a substituent, an alkyl group having from 1 to 5 carbon atoms, which may have a substituent, or a fluoroalkyl group having from 1 to 5 carbon atoms, which may have a substituent; $R^1$ represents an aryl group, which may have a substituent, a heterocyclic group, which may have a substituent, an aralkyl group, which may have a substituent, an alkyl group having from 1 to 5 carbon atoms, which may have a substituent, or a fluoroalkyl group having from 1 to 5 carbon atoms, which may have a substituent; a represents an alkyl group having from 1 to 3 carbon atoms, which may have a substituent, a fluoroalkyl group having from 1 to 5 carbon atoms, which may have a substituent, an alkoxy group having from 1 to 3 carbon atoms, which may have a substituent, a dialkylamino group having from 1 to 3 carbon atoms, which may have a substituent, a halogen atom or a hydrogen atom; and n is an integer of from 1 to 3, provided that when n is 2 or 3, plural groups represented by a may be the same or different.

13. The electrophotographic photoreceptor of claim 5, wherein the photosensitive layer contains, as a charge transporting substance, a benzofuran-bis-cyclic hydrazone compound represented by formula (VIII):

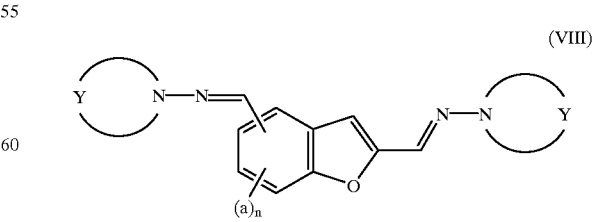

(VIII)

in which formula (VIII), Y represents an atomic group forming a heterocyclic group along with the nitrogen atom connected thereto, which may have a substituent and/or may be condensed; a represents an alkyl group having from 1 to 3 carbon atoms, which may have a substituent, a fluoroalkyl group having from 1 to 3 carbon atoms, which may have a substituent, an alkoxy group having from 1 to 3 carbon atoms, which may have a substituent, a dialkylamino group having from 1 to 3 carbon atoms, which may have a substituent, a halogen atom or a hydrogen atom; and n is an integer of from 1 to 3, provided that when n is 2 or 3, plural groups represented by a may be the same or different.

14. The electrophotographic photoreceptor of claim 5, wherein the photosensitive layer has a laminated structure comprising a charge generating layer containing a charge generating substance, and a charge transporting layer containing a charge transporting substance.

15. The electrophotographic photoreceptor of claim 5, wherein the photosensitive layer has a single-layer structure containing a charge generating substance and a charge transporting substance.

16. The electrophotographic photoreceptor of claim 5, further comprising an interlayer arranged between a conductive support and the photosensitive layer.

17. The electrophotographic photoreceptor of claim 7, wherein the photosensitive layer contains, as a binder resin, polycarbonate represented by formula (IX), or contains, as a binder resin, polyester represented by formula (X), in an amount of from 0.05 to 0.5 part by weight based on the total binder resin:

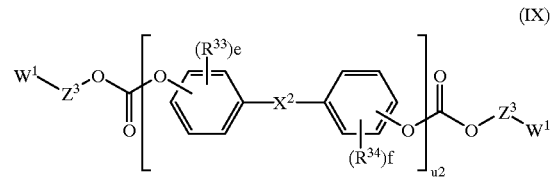

in which formula (IX), $R^{33}$ and $R^{34}$ each represent an alkyl group having from 1 to 5 carbon atoms, which may have a substituent, an aryl group having from 6 to 12 carbon atoms, which may have a substituent, an aralkyl group having from 7 to 17 carbon atoms, which may have a substituent, an alkenyl group having from 2 to 5 carbon atoms, which may have a substituent, an alkoxy group having from 1 to 5 carbon atoms, which may have a substituent, a halogen atom or a hydrogen atom; $x^2$ is directly bonded or represents an alkylene group having from 1 to 10 carbon atoms, which may have a substituent, a cyclic alkylidene group having from 1 to 10 carbon atoms, which may have a substituent, an arylene group having from 6 to 12 carbon atoms, which may have a substituent, a sulfonyl group or a carbonyl group; $Z^3$ represents an alkylene group having from 1 to 5 carbon atoms, which may have a substituent, an arylene group having from 6 to 12. carbon atoms, which may have a substituent, an arylenealkyl group having from 7 to 17 carbon atoms, which may have a substituent, or a halogen atom; $W^1$ represents an alkyl group having from 1 to 5 carbon atoms, which may have a substituent, an alkenyl group having from 2 to 5 carbon atoms, which may have a substituent, an alkoxy group having from 1 to 5 carbon atoms, which may have a substituent, an alkylester group having from 1 to 5 carbon atoms, which may have a substituent, an arylester group having from 6 to 12 carbon atoms, which may have a substituent, a carboxyl group, an aldehyde group, a hydroxyl group, a halogen atom or a hydrogen atom; e and f each are an integer of from 1 to 4; and u2 is an integer of from 10 to 200,

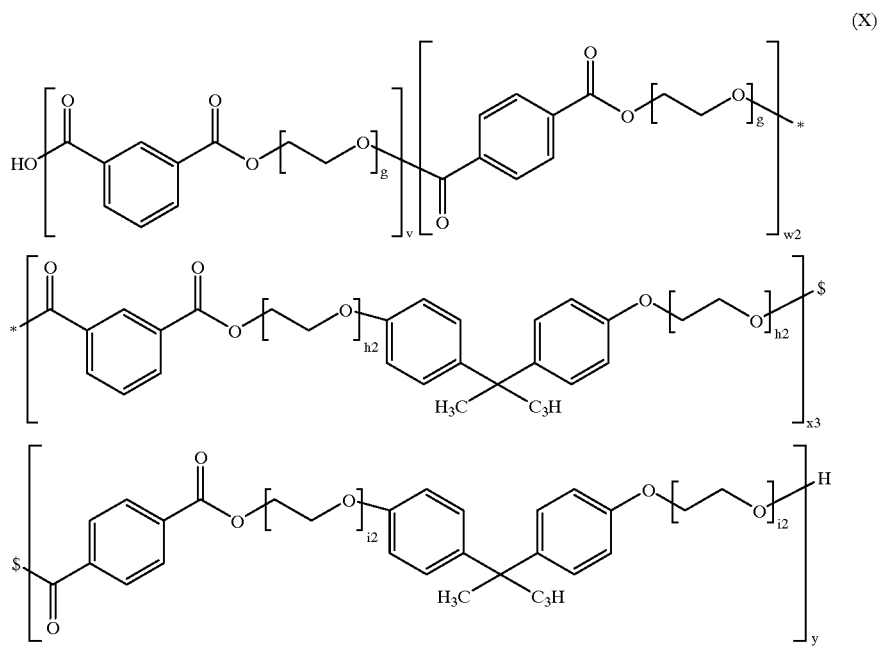

in which formula (X), g, h2 and i2 each are an integer of from 1 to 10; and v, w2, x3 and y each are an integer of from 10 to 1,000.

18. The electrophotographic photoreceptor of claim 11, wherein the photosensitive layer comprises a laminated layer comprising a conductive support having thereon at least two layers comprising a charge generating layer and a charge transporting layer, and the charge transporting layer contains at least one binder resin selected from the group consisting of a polymer of a vinyl compound, a copolymer thereof, polyester, polycarbonate, polyarylate, polysulfone, polyvinyl butyral, a phenoxy resin, a cellulose resin, an urethane resin, and an epoxy resin.

19. The electrophotographic photoreceptor of claim 11, wherein the photosensitive layer comprises a laminated layer comprising a conductive support having thereon at least two layers comprising a charge generating layer and a charge transporting layer, and the charge transporting layer contains, as a binder resin, at least one polycarbonate resin represented by formula (IX), or contains, as a binder resin, a polyester resin represented by formula (X), in an amount of from 5 to 50% by weight based on the total binder resin:

lower alkoxy group, which may have a substituent, a halogen atom or a hydrogen atom; X is directly bonded or represents an alkylene group having from 1 to 10 carbon atoms, which may have a substituent, a cyclic alkylidene group having from 1 to 10 carbon atoms, which may have a substituent, an arylene group, which may have a substituent, a sulfonyl group or a carbonyl group; Z represents a lower alkylene group, which may have a substituent, an arylene group, which may have a substituent, a alkylarylene group, which may have a substituent, or a halogen atom; W represents a lower alkyl group, which may have a substituent, a lower alkenyl group, which may have a substituent, a lower alkoxy group, which may have a substituent, a lower alkylester group, which may have a substituent, an arylester group, which may have a substituent, a carboxyl group, an aldehyde group, a hydroxyl group, a halogen atom or a hydrogen atom; e and f each are an integer of from 1 to 4; and u is an integer of from 10 to 200,

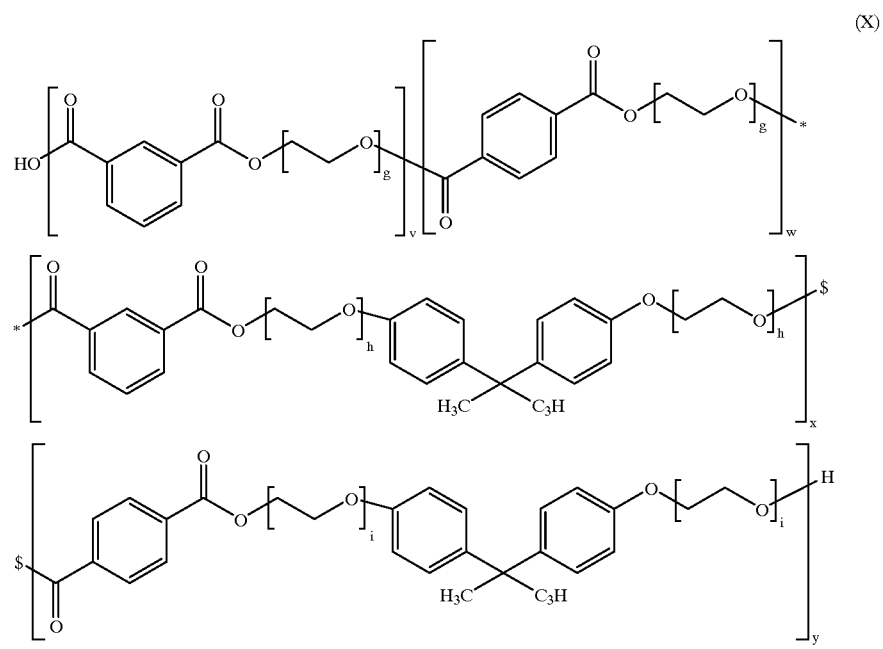

in which formula (X), g, h and i each are an integer of from 1 to 10; and v, w, x and y each are an integer of from 10 to 1000.

20. The electrophotographic photoreceptor of claim 7, wherein the photosensitive layer contains, as a antioxidant, α-tocopherol in an amount of from 0.1 to 5% by weight based on the charge transporting substance, or 2,6-di-t-butyl-4-methylphenol in an amount of from 0.1 to 10% by weight based on the charge transporting substance.

21. The electrophotographic photoreceptor of claim 11, wherein a surface layer of the photosensitive layer contains dimethylpolysiloxane, and a weight ratio of the dimethylpolysiloxane to the binder resin is from 0.001/100 to 5/100.

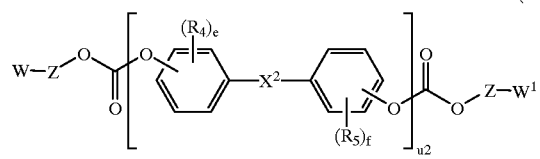

in which formula (IX), $R_4$ and $R_5$ may be the same or different, and each represent a lower alkyl group, which may have a substituent, an aryl group, which may have a substituent, an aralkyl group, which may have a substituent, a lower alkenyl group, which may have a substituent, a

* * * * *